(12) United States Patent
Li et al.

(10) Patent No.: US 10,200,179 B2
(45) Date of Patent: Feb. 5, 2019

(54) CONTROL INFORMATION FEEDBACK METHOD, USER EQUIPMENT, AND BASE STATION

(71) Applicant: Huawei Technologies Co., Ltd., Shenzhen (CN)

(72) Inventors: Chaojun Li, Beijing (CN); Bo Li, Beijing (CN); Yongxia Lyu, Beijing (CN); Yan Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 279 days.

(21) Appl. No.: 15/080,224

(22) Filed: Mar. 24, 2016

(65) Prior Publication Data

US 2016/0204924 A1  Jul. 14, 2016

Related U.S. Application Data

(63) Continuation of application No. PCT/CN2013/084316, filed on Sep. 26, 2013.

(51) Int. Cl.
*H04L 1/18* (2006.01)
*H04L 5/00* (2006.01)
(Continued)

(52) U.S. Cl.
CPC .......... *H04L 5/0055* (2013.01); *H04L 1/1635* (2013.01); *H04L 1/1861* (2013.01);
(Continued)

(58) Field of Classification Search
CPC ... H04L 1/1896; H04L 5/0051; H04L 5/0055; H04L 5/14
See application file for complete search history.

(56) References Cited

U.S. PATENT DOCUMENTS

2009/0110038 A1    4/2009  Montojo et al.
2012/0207109 A1*   8/2012  Pajukoski ............. H04L 1/0029
                                                     370/329
(Continued)

FOREIGN PATENT DOCUMENTS

CN    102651678 A    8/2012
CN    102904698 A    1/2013
(Continued)

OTHER PUBLICATIONS

3GPP TS 36.213 V11.4.0 (Sep. 2013); 3rd Generation Partnership Project; Technical Specification Group Radio Access Network; Evolved Universal Terrestrial Radio Access (E-UTRA); Physical layer procedures (Release 11).*
(Continued)

*Primary Examiner* — Andrew Lai
*Assistant Examiner* — Mahmudul Hasan
(74) *Attorney, Agent, or Firm* — Slater Matsil, LLP

(57) ABSTRACT

A control information feedback method (CIFM), a user equipment (UE) using the CIFM and a base station using the CIFM are disclosed. In an embodiment the method includes determining an uplink association index k' according to an uplink reference configuration an uplink grant (UL Grant) in a subframe n−k', wherein the UL Grant is used to indicate physical uplink shared channel (PUSCH) transmission in a subframe n, n being an integer and k' being the uplink association index, determining a hybrid automatic repeat request acknowledgment (HARQ-ACK) information according to a downlink reference configuration, wherein the downlink reference configuration is used to determine a downlink association set $\{k_0, k_1, \ldots k_{M_c-1}\}$ and transmitting the HARQ-ACK information by a PUSCH in the subframe n, wherein the terminal device is configured with a TDD uplink-downlink configuration, and wherein the uplink ref-
(Continued)

erence configuration is different from the downlink reference configuration.

20 Claims, 16 Drawing Sheets

(51) Int. Cl.
H04L 1/16 (2006.01)
H04L 5/14 (2006.01)
(52) U.S. Cl.
CPC .......... *H04L 1/1896* (2013.01); *H04L 5/0051* (2013.01); *H04L 5/0053* (2013.01); *H04L 5/0094* (2013.01); *H04L 5/14* (2013.01)

(56) References Cited

U.S. PATENT DOCUMENTS

| | | | |
|---|---|---|---|
| 2013/0083737 A1 | 4/2013 | Earnshaw et al. | |
| 2013/0336160 A1* | 12/2013 | Yin | H04L 1/1854 370/254 |
| 2013/0343312 A1* | 12/2013 | Lv | H04L 1/1607 370/329 |
| 2014/0003381 A1* | 1/2014 | Lee | H04L 1/0026 370/329 |
| 2014/0112219 A1 | 4/2014 | Li et al. | |
| 2014/0301336 A1* | 10/2014 | Kim | H04L 5/001 370/329 |
| 2014/0321408 A1* | 10/2014 | Kim | H04L 5/001 370/329 |
| 2015/0016315 A1* | 1/2015 | Yang | H04J 3/00 370/280 |
| 2015/0023228 A1* | 1/2015 | Yin | H04L 5/001 370/280 |
| 2015/0043394 A1 | 2/2015 | Lin et al. | |
| 2015/0055519 A1 | 2/2015 | Lin et al. | |
| 2015/0146643 A1* | 5/2015 | Fu | H04L 1/1607 370/329 |
| 2015/0230238 A1 | 8/2015 | Kim et al. | |
| 2015/0358994 A1* | 12/2015 | Guo | H04L 1/1861 370/280 |

FOREIGN PATENT DOCUMENTS

| | | |
|---|---|---|
| CN | 103096494 A | 5/2013 |
| CN | 103312470 A | 9/2013 |
| CN | 103326806 A | 9/2013 |
| RU | 2451404 C2 | 10/2008 |
| WO | 2011041623 A1 | 4/2011 |
| WO | 2011112004 A2 | 9/2011 |
| WO | 2013048841 A1 | 4/2013 |

OTHER PUBLICATIONS

"3rd Generation Partnership Project; Technical Specification Group Radio Access Network; Evolved Universal Terrestrial Radio Access (E-UTRA); Multiplexing and channel coding (Release 11)," 3GPP TS 36.212 V11.3.0, Jun. 2013, 84 pages.

"3rd Generation Partnership Project; Technical Specification Group Radio Access Network; Evolved Universal Terrestrial Radio Access (E-UTRA); Physical layer procedures (Release 11)," 3GPP TS 36.213 V11.4.0, Sep. 2013, 182 pages.

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.5.0, Sep. 2013, 347 pages.

NEC Group, "UL & DL Timing Coupling Issue for TDD eIMTA System", 3GPP Draft; R1-133341, 3rd Generation Partnership Project (3GPP) TSG RAN WG1 Meeting #74, Barcelona, Spain, Aug. 19-23, 2013, 4 pages.

NEC Group, "HARQ Design for eIMTA", 3GPP Draft; R1-133451, 3rd Generation Partnership Project (3GPP) TSG RAN WG1 Meeting #74, Barcelona, Spain, Aug. 19-23, 2013, 7 pages.

Huawei et al, "Way forward on PUSCH A/N codebook size in Rel-10 TDD," R1-111180, Feb. 25, 2011, 2 pages.

HTC, "On HARQ Timing Issues in TDD eIMTA Systems," R1-133253, Aug. 10, 2013, 6 pages.

* cited by examiner

CONTROL INFORMATION FEEDBACK METHOD, USER EQUIPMENT, AND BASE STATION

This application is a continuation of International Application No. PCT/CN2013/084316, filed on Sep. 26, 2013, which is hereby incorporated by reference in its entirety.

TECHNICAL FIELD

The present invention relates to information transmission technologies, and in particular, to a control information feedback method, a user equipment that uses the control information feedback method, and a base station that uses the control information feedback method.

BACKGROUND

In a Long Term Evolution (LTE) time division duplexing (TDD) system in the prior art, downlink transmission supports the hybrid automatic repeat request (HARQ) technology.

A base station transmits a PDSCH (physical downlink shared channel) or downlink semi-persistent scheduling release (SPS Release) signaling to a UE (user equipment) in a subframe n−k, and the UE transmits HARQ acknowledge (HARK-ACK) information of the PDSCH or the downlink SPS release signaling to the base station in an uplink subframe n, where k∈K, K is referred to as a downlink association set, K is a downlink association set $\{k_0, k_1, \ldots, k_{M_c-1}\}$ that includes M elements, and a downlink subframe set $\{n-k_0, n-k_1, \ldots, n-k_{M-1}\}$ is referred to as an HARQ-ACK bundling subframe set. Specific values are shown in Table 1.

TABLE 1

| Uplink-downlink configuration | Downlink association set Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

After receiving the HARQ-ACK information, the base station may learn whether the UE has correctly received the PDSCH or the downlink SPS release signaling. On the other hand, the base station transmits an uplink grant (UL Grant) to the UE in a subframe n−k', where the UL Grant is used to indicate physical uplink shared channel (PUSCH) transmission in the uplink subframe n, where k' is referred to as an uplink association index. Specific values are shown in Table 2.

TABLE 2

| Uplink-downlink configuration | Uplink association index Subframe number n | | | | | | | | | |
|---|---|---|---|---|---|---|---|---|---|---|
| | 0 | 1 | 2 | 3 | 4 | 5 | 6 | 7 | 8 | 9 |
| 1 | | | 6 | 4 | | | | 6 | 4 | |
| 2 | | | 4 | | | | | 4 | | |
| 3 | | | | 4 | 4 | 4 | | | | |
| 4 | | | | 4 | 4 | | | | | |
| 5 | | | | 4 | | | | | | |
| 6 | | | | 7 | 7 | 5 | | | 7 | 7 |

In the prior-art system, values of k' and $\{k_0, k_1, \ldots, k_{M_c-1}\}$ and are separately defined in each uplink-downlink configuration. For any uplink-downlink configuration, a value of k' is not greater than a value of $k_{M-1}$, that is, the UL Grant is transmitted in the last subframe in the HARQ-ACK bundling subframe set, or the UL Grant is transmitted after the last subframe in the HARQ-ACK bundling subframe set. For example, when the uplink-downlink configuration is 2, the UL Grant is transmitted in a subframe 8, where the subframe 8 is the last subframe in an HARQ-ACK bundling subframe set {4, 5, 6, 8}. If the UE needs to transmit a PUSCH in the uplink subframe n, HARQ feedback information is carried on the PUSCH; otherwise, the HARQ feedback information is carried on a PUCCH (physical uplink control channel).

However, in a later release of the LTE TDD system, a base station can dynamically configure an uplink-downlink configuration, for example, it changes an uplink-downlink configuration every 10 ms to 40 ms. In this case, timing between the UL Grant and the PUSCH is determined according to an uplink reference uplink-downlink configuration, and downlink HARQ timing is determined according to a downlink reference uplink-downlink configuration, where the uplink reference uplink-downlink configuration and the downlink reference uplink-downlink configuration may be different. In this case, the UL Grant may be transmitted prior to the last subframe in the HARQ-ACK bundling subframe set.

For example, the uplink reference uplink-downlink configuration is 1, and the downlink reference uplink-downlink configuration is 2, the UL Grant is transmitted in a subframe 6, where the subframe 6 is located before the last subframe in the HARQ-ACK bundling subframe set {4, 5, 6, 8}.

It should be noted that, in the prior art, an HARQ-ACK information bit carried on a PUSCH scheduled by a UL Grant is determined according to a value of a downlink assignment index (DAI) carried by the UL Grant, where the DAI indicates the total number of PDSCHs and downlink SPS release signaling that are transmitted in the HARQ-ACK bundling subframe set. As a result, when the UL Grant is transmitted prior to the last subframe in the HARQ-ACK bundling subframe set, the DAI carried by the UL Grant may not indicate the total number of PDSCHs and downlink SPS release signaling that are transmitted in the HARQ-ACK bundling subframe set, causing the UE to feedback an incorrect HARQ-ACK information bit.

It can be easily learned that, in a case of dynamically configured uplink-downlink configuration, when a UL Grant is transmitted prior to the last subframe in an HARQ-ACK bundling subframe set, a DAI carried by the UL Grant may not indicate the total number of PDSCHs and downlink SPS release signaling that are transmitted in the HARQ-ACK bundling subframe set, thereby causing a UE to feedback incorrect HARQ-ACK information.

SUMMARY

Embodiments of the present invention provide a control information feedback method, a user equipment, and a base station, so as to determine HARQ-ACK information in a new manner, thereby avoiding feedback of incorrect HARQ-ACK information.

A first aspect of the embodiments of the present invention provides a control information feedback method, and the method includes: receiving, by a UE, an uplink grant UL Grant in a subframe n−k', where the UL Grant is used to physical uplink shared channel PUSCH transmission in a subframe n, n is an integer, and k' is an uplink association index; determining hybrid automatic repeat request acknowledgment HARQ-ACK information according to a downlink reference configuration, where the downlink reference configuration is used to determine a downlink association set $\{k_0, k_1, \ldots, k_{M_c-1}\}$ and/or determine downlink HARQ timing, and the HARQ-ACK information is carried on the PUSCH; and transmitting the PUSCH in the subframe n.

A second aspect of the embodiments of the present invention provides a user equipment UE, and the user equipment includes: a receiving module, configured to receive an uplink grant UL Grant in a subframe n−k', where the UL Grant is used to indicate physical uplink shared channel PUSCH transmission in a subframe n, n is an integer, and k' is an uplink association index; a processing and feedback module, configured to determine hybrid automatic repeat request acknowledgment HARQ-ACK information according to a downlink reference configuration, where the downlink reference configuration is used to determine a downlink association set $\{k_0, k_1, \ldots, k_{M_c-1}\}$ and/or determine downlink HARQ timing, and the HARQ-ACK information is carried on the PUSCH; and a transmitting module, configured to transmit the PUSCH in the subframe n.

A third aspect of the embodiments of the present invention provides a user equipment UE, and the user equipment includes: a receiver, configured to receive an uplink grant UL Grant in a subframe n−k', where the UL Grant is used to physical uplink shared channel PUSCH transmission in a subframe n, n is an integer, and k' is an uplink association index; a processor, configured to determine hybrid automatic repeat request acknowledgment HARQ-ACK information according to a downlink reference configuration, where the downlink reference configuration is used to determine a downlink association set $\{k_0, k_1, \ldots, k_{M_c-1}\}$ and/or determine downlink HARQ timing, and the HARQ-ACK information is carried on the PUSCH; and a transmitter, configured to transmit the PUSCH in the subframe n.

A fifth aspect of the embodiments of the present invention provides a base station, and the base station includes: a transmitting module, configured to transmit an uplink grant UL Grant in a subframe n−k', where the UL Grant is used to indicate physical uplink shared channel PUSCH transmission in a subframe n, n is an integer, and k' is an uplink association index; a receiving module, configured to receive, in the subframe n, the PUSCH transmitted by the UE; and a feedback determining module, configured to determine hybrid automatic repeat request acknowledgment HARQ-ACK information according to a downlink reference configuration, where the downlink reference configuration is used to determine a downlink association set $\{k_0, k_1, \ldots, k_{M_c-1}\}$ and/or determine downlink HARQ timing, and the HARQ-ACK information is carried on the PUSCH.

In embodiments of the present invention, a downlink reference configuration is used to determine a downlink association set $\{k_0, k_1, \ldots, k_{M_c-1}\}$ and the like, so that HARQ-ACK information is determined according to the downlink association set $\{k_0, k_1, \ldots, k_{M_c-1}\}$ and the like. This is different from the prior art in which the HARQ-ACK information is determined according to a value (the total number of PDSCHs and downlink SPS release signaling) indicated by a DAI carried by a UL Grant. Therefore, the following technical problem is effectively avoided: when the UL Grant is transmitted prior to the last subframe in an HARQ-ACK bundling subframe set, for example, in a scenario in which an uplink-downlink configuration is dynamically configured, the DAI carried by the UL Grant may not indicate the total number of PDSCHs and the downlink SPS release signaling that are transmitted in the HARQ-ACK bundling subframe set, thereby causing a UE to feedback incorrect HARQ-ACK information.

DETAILED DESCRIPTION OF ILLUSTRATIVE EMBODIMENTS

Figure 1:
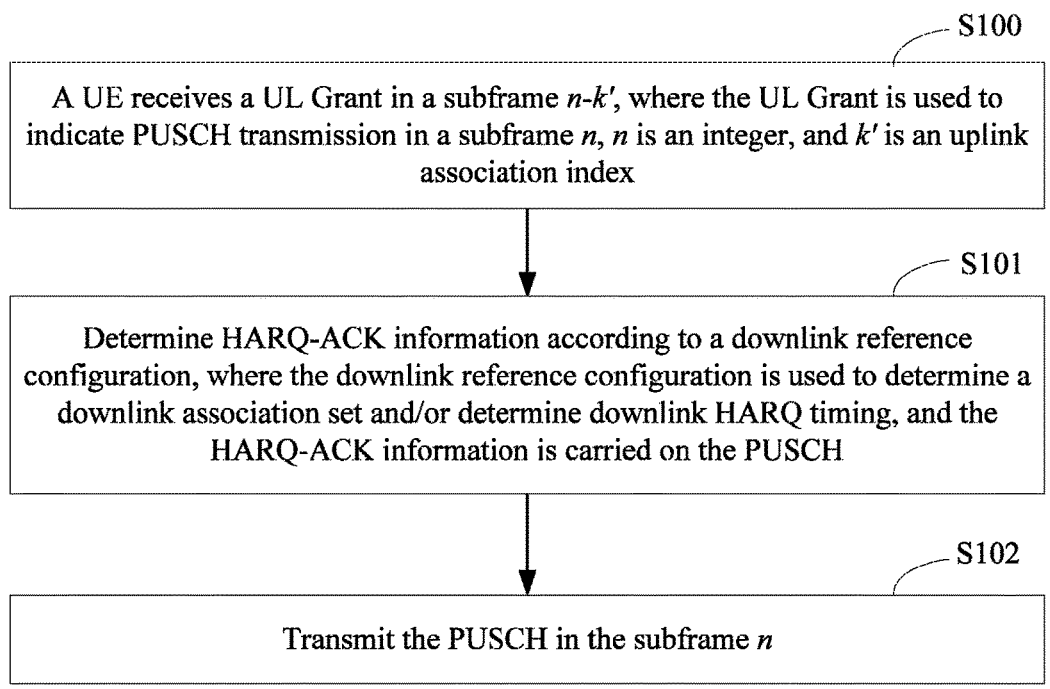
FIG. 1 is a schematic flowchart illustrating a first embodiment of a control information feedback method according to the present invention.

In the following description, by way of illustration, and not by way of limitation, numerous specific details such as a specific system structure, an interface and a technology are set forth to provide a thorough understanding of the embodiments of the present invention. However, it should be understood by a person skilled in the art that the present invention may still be implemented in other embodiments without these specific details. In other instances, a well-known apparatus, circuit and method have not been described in detail so as not to unnecessarily obscure description of the present invention.

Technologies described in this specification may apply to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term Evolution (LTE) system, and other communications systems.

Various aspects are described in this specification with reference to a user equipment and/or a base station and/or a base station controller.

The user equipment may be a wireless terminal or a wired terminal. The wireless terminal may refer to a device that provides a user with voice and/or data connectivity, a handheld device with a wireless connection function, or another processing device connected to a wireless modem. A wireless terminal may communicate with one or more core networks through a radio access network (for example, RAN). The user equipment may be a mobile terminal, such as a mobile phone (or referred to as a "cellular" phone), a computer that has a mobile terminal, for example, a portable, pocket-sized, handheld, computer built-in, or in-vehicle mobile apparatus, which exchanges a voice and/or data with a radio access network. For example, the wireless terminal may be a device such as a personal communication service (PCS) telephone, a cordless telephone, a Session Initiation Protocol (SIP) telephone, a wireless local loop (WLL) station, or a personal digital assistant (PDA). The wireless terminal may also be referred to as a system, a subscriber unit, a subscriber station, a mobile station, a mobile, a remote station, an access point, a remote terminal, an access terminal, a user terminal, a user agent, a user device, or a user equipment.

The base station (for example, an access point) may refer to an apparatus in communication with a wireless terminal via one or more sectors at an air interface on an access network. The base station may be configured to perform conversion between a received over-the-air frame and an IP packet and serve as a router between the wireless terminal and a rest portion of the access network, where the rest portion of the access network may include an Internet Protocol (IP) network. The base station may also coordinate attribute management of the air interface.

For example, the base station may be a base station controller (BSC) on a 2G network, a radio network controller (RNC) on a 3G network, or an evolved NodeB (eNodeB) on an LTE network. For example, the base station may be a base transceiver station (BTS) in GSM or CDMA, may also be a NodeB in WCDMA, and may be further an evolved NodeB (NodeB, eNB, or e-NodeB) in LTE, which is not limited in the present invention.

The base station controller may be a base station controller (BSC) in GSM or CDMA, or a radio network controller (RNC) in WCDMA, which is not limited in the present invention.

In addition, the term "system" and "network" may be used interchangeably herein. The term "and/or" herein merely describes an association relationship between associated objects and represent that three types of relationships may exist. For example, A and/or B may represent three cases: only A exists, both A and B exist, and only B exists. In addition, the character"/" in this specification generally indicates an "or" relationship between the associated objects.

To make the present invention more comprehensible, a brief description is provided first:

In this technical field, a time domain of a system generally consists of radio frames; a radio frame is identified by an SFN (system frame number) $n_f$, where SFNs are cyclically selected to identify radio frames. For example, an SFN is represented by 10 bits, and $n_f$=0, 1, 2, . . . , 1023. That is, radio frames are numbered from 0 to 1023, and then from 0 again. Each radio frame consists of 10 subframes each of which is 1 ms (millisecond) in length, a subframe in each radio frame is identified by a subframe number $n_{sbf}$, where $n_{sbf}$=0, 1, 2, . . . 9. In other words, all subframes (including uplink subframes and downlink subframes) mentioned in the present invention are each identified and distinguished by a system frame number $n_f$ plus a subframe number $n_{sbf}$ in each radio frame.

The existing TDD system supports 7 uplink-downlink configurations; specific configuration manners of each uplink-downlink configuration are shown in Table 3.

TABLE 3

| Uplink-downlink | Subframe number | | | | | | | | | |
|---|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |

TABLE 3-continued

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

U indicates an uplink subframe, D indicates a downlink subframe, and S indicates a special subframe. A special subframe includes a DwPTS (downlink pilot time slot) that may be used for downlink data transmission; therefore, in the present invention, the special subframe and the downlink subframe are collectively referred to as downlink subframes. In addition, for a special subframe that has a normal downlink cyclic prefix (normal DL CP) and has a special subframe configuration 0 and 5, or a special subframe that has an extended downlink cyclic prefix (extended DL CP) and has a special subframe configuration 0 and 4, a length of the DwPTS is 3 OFDM (orthogonal frequency division multiplexing) symbols; in the present invention, special subframes of this type are collectively referred to as downlink special mini-subframes.

In a working process, a UE receives a PDSCH or downlink SPS release signaling of a serving cell c in a subframe n−k, and transmits HARQ-ACK information of the PDSCH or the downlink SPS release signaling to a base station in an uplink subframe n, where $k \in K_c$, $K_c$ is a set $\{k_0, k_1, \ldots, k_{M_c-1}\}$ that includes $M_c$ elements, and is referred to as a downlink association set. In addition, a downlink subframe set $\{n-k_0, n-k_1, \ldots, n-k_{M_c-1}\}$ is referred to as an HARQ-ACK bundling subframe set, and c is an identifier of a serving cell, where c≥0. When only one serving cell is configured for the UE or the UE does not support multiple serving cells, the serving cell c may be ignored. For example, a downlink association set K is $\{k_0, k_1, \ldots, k_{M-1}\}$, an HARQ-ACK bundling subframe set is $\{n-k_0, n-k_1, \ldots, n-k_{M-1}\}$, and the number of elements of the downlink association set is M. Downlink SPS release signaling is carried on a PDCCH (physical downlink control channel)/ePDCCH (enhanced PDCCH). A subframe n is a $k^{th}$ subframe that follows the subframe n−k.

In this technical field, HARQ-ACK information indicates a receive status of a PDSCH or downlink SPS release signaling, and includes an ACK (acknowledgment)/NACK (non-acknowledgment) information, or further includes DTX (discontinuous transmission), where the ACK indicates correct reception, NACK indicates incorrect reception, and DTX indicates that no PDSCH or downlink SPS release signaling is received. The HARQ-ACK information may also be referred to as HARQ-ACK feedback (response) information.

Further, for a UE that does not support multiple serving cells, there are two HARQ-ACK feedback modes: HARQ-ACK bundling and HARQ-ACK multiplexing; for a UE that supports multiple serving cells, there are three HARQ-ACK feedback modes: HARQ-ACK bundling, PUCCH format 1b with channel selection, and PUCCH format 3. During working, a base station configures an HARQ-ACK feedback mode first, and then notifies the UE by using higher layer signaling; in a carrier aggregation (CA) system, a serving cell is also referred to as a CC (component carrier).

A UL Grant is used to indicate a UE to transmit uplink data, and includes downlink control information format 4 (DCI format 4) and DCI format 0. When one of the uplink-downlink configurations 1 to 6 is in use, the UL Grant includes a 2-bit DAI. A downlink assignment DL Assignment is used to indicate a UE to receive downlink data, and includes DCI formats 1/1A/1B/1D/2/2A/2B/2C/2D; the downlink data includes a PDSCH or downlink SPS release signaling; that is, the DL Assignment is used to carry scheduling information of the PDSCH or downlink SPS release signaling. The DL Assignment includes a 2-bit DAI. The UL Grant and the DL Assignment are carried on a PDCCH or an ePDCCH.

It should be noted that, the embodiments included in the present invention are not limited to an application scenario/case of a dynamic TDD uplink-downlink configuration, and are also applicable to inter-band TDD carrier aggregation (inter-band TDD CA) and TDD-FDD CA (that is, TDD component carrier and FDD component carrier aggregation). Similar implementation principles or processes are within a scope of understanding by a person skilled in the art by reference are not described herein again.

The following provides a detailed description with reference to different embodiments and accompanying drawings of the present invention.

Referring to FIG. 1, FIG. 1 is a schematic flowchart illustrating a first embodiment of a control information feedback method according to the present invention. The control information feedback method according to this embodiment includes but is not limited to the following steps:

Step S100: A UE receives a UL Grant in a subframe n−k', where the UL Grant is used to indicate PUSCH transmission in a subframe n, n is an integer, and k' is an uplink association index.

Step S101: Determine HARQ-ACK information according to a downlink reference configuration, where the downlink reference configuration is used to determine a downlink association set $\{k_0, k_1, \ldots, k_{M_c-1}\}$ and/or determine downlink HARQ timing, and the HARQ-ACK information is carried on the PUSCH.

In step S101, $M_c$ is a natural number greater than or equal to 1. The UE may, according to a default setting, set the downlink reference configuration, for example, in a case in which an uplink-downlink configuration is dynamically configured, or learn the downlink reference configuration by receiving higher-layer signaling, which is not limited herein.

In this embodiment, the UE determines the downlink association set $\{k_0, k_1, \ldots, k_{M_c-1}\}$ or an HARQ-ACK bundling subframe set $\{n-k_0, n-k_1, \ldots, n-k_{M_c-1}\}$ according to the downlink reference configuration; the downlink reference configuration is an "uplink-downlink configuration" that is referenced by the UE when determining the downlink association set $\{k_0, k_1, \ldots, k_{M_c-1}\}$ or the HARQ-ACK bundling subframe set $\{n-k_0, n-k_1, \ldots, n-k_{M_c-1}\}$. In this embodiment, the UE determines the downlink HARQ timing according to the downlink reference configuration; the downlink reference configuration is an "uplink-downlink configuration" that is referenced by the UE when determining the downlink HARQ timing. The HARQ timing refers to a sequence between a time for transmitting a PDSCH/downlink SPS release signaling and a time for transmitting the HARQ-ACK information.

It should be noted that, in this embodiment, the downlink association set $\{k_0, k_1, \ldots, k_{M_c-1}\}$ or the HARQ-ACK bundling subframe set $\{n-k_0, n-k_1, \ldots, n-k_{M_c-1}\}$ or both are preferably used to determine the HARQ-ACK information. Apparently, if the UL Grant is transmitted in the last subframe of the HARQ-ACK bundling subframe set, the HARQ-ACK information may also be determined according to a DAI in the UL Grant, which is not described in detail in this embodiment.

Step S102: Transmit the PUSCH in the subframe n.

It can be easily understood that, in this embodiment, the downlink reference configuration is used to determine the downlink association set $\{k_0, k_1, \ldots, k_{M_c-1}\}$, the downlink HARQ timing, or an HARQ-ACK bundling subframe set $\{n-k_0, n-k_1, \ldots, n-k_{M_c-1}\}$, or the like, so that HARQ-ACK information is jointly determined according to the downlink association set $\{k_0, k_1, \ldots, k_{M_c-1}\}$, the downlink HARQ timing, and/or the HARQ-ACK bundling subframe set. This is different from the prior art in which a UE must determine, when receiving a UL Grant, the HARQ-ACK information according to a value (the total number of PDSCHs and downlink SPS release signaling) indicated by a DAI carried by the UL Grant. The method according to this embodiment effectively avoids the following technical problem: when the UL Grant is transmitted prior to the last subframe in the HARQ-ACK bundling subframe set, for example, in a scenario in which an uplink-downlink configuration is dynamically configured, the DAI carried by the UL Grant may not indicate the total number of PDSCHs and downlink SPS release signaling that are transmitted in the HARQ-ACK bundling subframe set, thereby causing the UE to feedback incorrect HARQ-ACK information. In addition, by practicing the method according to this embodiment, another problem is avoided: when an uplink reference configuration is the uplink-downlink configuration 0, the UL Grant does not include a 2-bit DAI; therefore, the UL Grant cannot indicate the total number of PDSCHs and downlink SPS release signaling that are transmitted in the HARQ-ACK bundling subframe set. In this embodiment, the HARQ-ACK information may be determined by selecting and applying different conditions according to different situations, which provides more options in determining the HARQ-ACK information, and can effectively prevent a feedback error.

With reference to different specific embodiments, the following provides a description of determining HARQ-ACK information according to different conditions.

Figure 2:
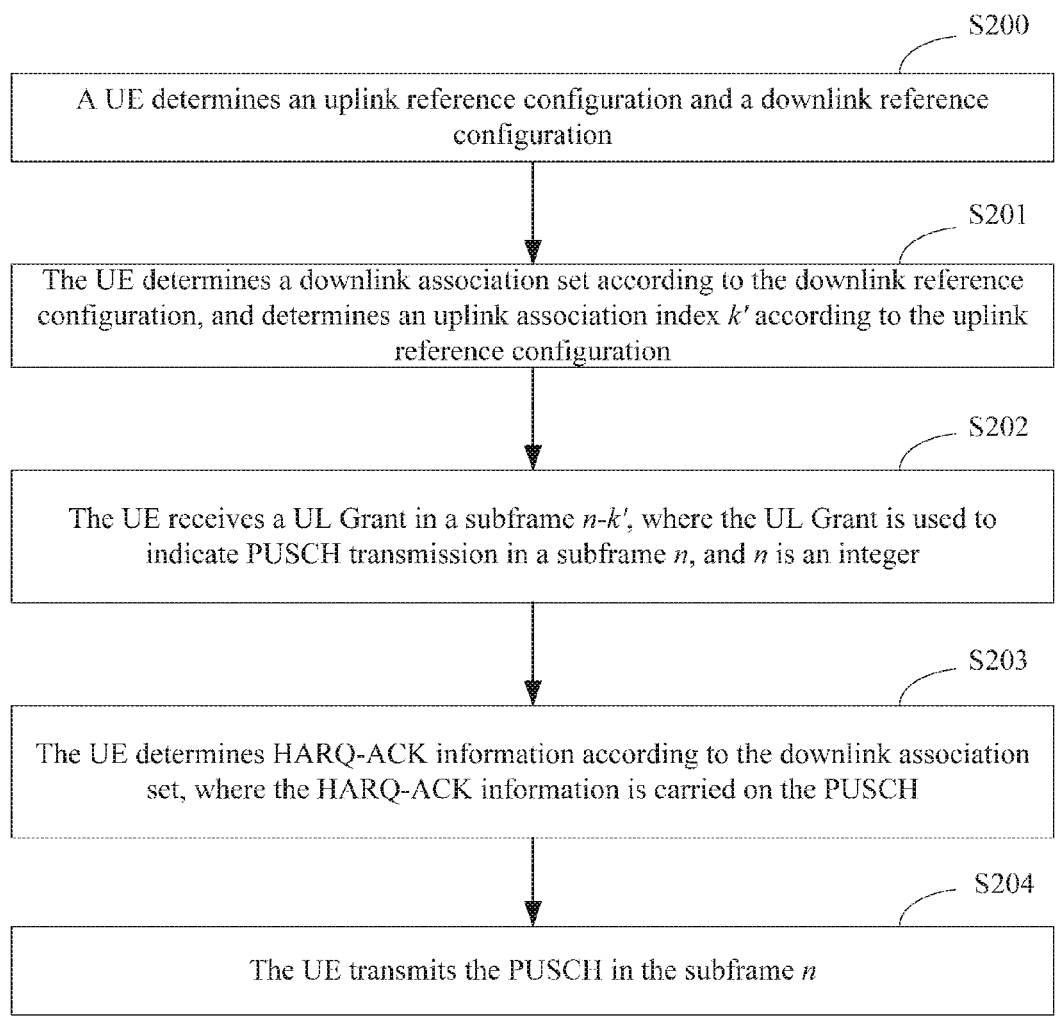
FIG. 2 is a schematic flowchart illustrating a first specific embodiment of a control information feedback method according to the present invention.

Then, referring to FIG. 2, FIG. 2 is a schematic flowchart illustrating a first specific embodiment of a control information feedback method according to the present invention. The control information feedback method according to this embodiment includes but is not limited to the following steps:

Step S200: A UE determines an uplink reference configuration and a downlink reference configuration.

In step S200, only a serving cell c or multiple serving cells may be configured for the UE, that is, the serving cell c is one serving cell among the multiple serving cells configured for the UE. The step in which "a UE determines an uplink reference configuration and a downlink reference configuration" is specifically that "the UE determines an uplink reference configuration and a downlink reference configuration of the serving cell c". It should be noted that, when multiple serving cells are configured for the UE, the UE further needs to determine uplink reference configurations and downlink reference configurations of other serving cells, in addition to the uplink reference configuration and the downlink reference configuration of the serving cell c. For example, the serving cell c and a serving cell d are configured for the UE; accordingly, the UE further needs to determine an uplink reference configuration and downlink reference configuration of the serving cell d, in addition to the uplink reference configuration and the downlink reference configuration of the serving cell c.

It should be noted that, in an application scenario of a dynamic TDD uplink-downlink configuration, preferably, an uplink reference configuration is different from a downlink reference configuration. For example, the uplink reference configuration is the uplink-downlink configuration 0 or the uplink-downlink configuration 1, and the downlink reference configuration is the uplink-downlink configuration 5 or the uplink-downlink configuration 2. When the uplink reference configuration is the uplink-downlink configuration 0, a UL Grant includes no DAI.

In other words, on one hand, to avoid a technical problem in which a dynamic change in an uplink-downlink configuration causes a failure to transmit HARQ-ACK information or causes feedback of incorrect HARQ-ACK information, a downlink reference uplink-downlink configuration (DL-reference UP/DL configuration) is used in this embodiment, and the downlink reference uplink-downlink configuration is referred to as a downlink reference configuration for ease of description. Therefore, even if the uplink-downlink configuration changes, the UE may still determine HARQ timing and the like according to the downlink reference configuration. The downlink reference configuration may be one of the 7 uplink-downlink configurations 0, 1, 2, . . . defined in Table 3. Preferably, the downlink reference configuration may merely be a configuration with a large number of downlink subframes, for example, the uplink-downlink configuration 5 or the uplink-downlink configuration 2. As mentioned above, the UE may achieve the downlink reference configuration by receiving higher-layer signaling, where the higher-layer signaling is from higher layer and transmitted at lower frequency relative to physical layer signaling, and includes RRC signaling, media access control (MAC) signaling, and the like.

On the other hand, to avoid a problem that a dynamic change in an uplink-downlink configuration causes a failure to transmit a PUSCH, an uplink reference uplink-downlink configuration (UL-reference UL/DL configuration) is introduced, which is referred to as an uplink reference configuration for ease of description. Likewise, even if the uplink-downlink configuration changes, the UE may still determine uplink scheduling timing according to the uplink reference configuration. The uplink reference configuration may be one of the 7 uplink-downlink configurations 0 to 6 defined in Table 3. Preferably, the uplink reference configuration is a configuration with a large number of uplink subframes, for example, the uplink-downlink configuration 0 or the uplink-downlink configuration 1; the UE may also achieve the uplink reference configuration by receiving higher-layer signaling (for example, RRC signaling).

In addition, for inter-band TDD CA and TDD-FDD CA, when the serving cell c is a secondary cell (SCell), the UE also needs to determine the uplink reference configuration and the downlink reference configuration of the serving cell c.

Step S201: The UE determines a downlink association set $\{k_0, k_1, \ldots, k_{M_c-1}\}$ according to the downlink reference configuration, and determines an uplink association index k' according to the uplink reference configuration.

The downlink association set $\{k_0, k_1, \ldots, k_{M_c-1}\}$ is a downlink association set of a subframe n of the serving cell c. Specifically, the UE determines the downlink association set $\{k_0, k_1, \ldots, k_{M_c-1}\}$ of the serving cell c according to the downlink reference configuration of the serving cell c. It should be noted that, when multiple serving cells are configured for the UE, the UE further needs to determine downlink association sets of other serving cells according to downlink reference configurations of the other serving cells, in addition to the downlink association set of the serving cell c according to the downlink reference configuration of the serving cell c. For example, the serving cell c and the serving cell d are configured for the UE; accordingly, the UE needs to determine a downlink association set of the serving cell d according to a downlink reference configuration of the serving cell d, in addition to the downlink association set of the serving cell c according to the downlink reference configuration of the serving cell c. It should be noted that, unlike in the prior art, the UE in this embodiment determines the downlink association set $\{k_0, k_1, \ldots, k_{M_c-1}\}$ or an HARQ-ACK bundling subframe set $\{n-k_0, n-k_1, \ldots, n-k_{M_c-1}\}$ according to the downlink reference configuration; the downlink reference configuration is an "uplink-downlink configuration" that is referenced by the UE when determining the downlink association set or the HARQ-ACK bundling subframe set. In other words, in this embodiment, the UE determines downlink HARQ timing according to the downlink reference configuration; the downlink reference configuration is an "uplink-downlink configuration" that is referenced by the UE when determining the downlink HARQ timing. The HARQ timing refers to a sequence between a time for transmitting a PDSCH/downlink SPS release signaling and a time for transmitting the HARQ-ACK information. The downlink association set $\{k_0, k_1, \ldots, k_{M_c-1}\}$ is the downlink association set of the subframe n of the serving cell c.

Likewise, in this embodiment, the UE determines the uplink association index k' according to the uplink reference configuration; that is, the uplink reference configuration is an "uplink-downlink configuration" that is referenced by the UE when determining the uplink association index. In other words, the UE determines uplink scheduling timing according to the uplink reference configuration; the uplink reference configuration is an "uplink-downlink configuration" that is referenced by the UE when determining the uplink scheduling timing. The uplink scheduling timing refers to a sequence between a time for transmitting a UL Grant and a time for transmitting a PUSCH.

Step S202: The UE receives a UL Grant in a subframe n-k', where the UL Grant is used to indicate PUSCH transmission in a subframe n, and n is an integer.

It is worth noting that, in this embodiment, the UE receives downlink data of the serving cell c in a subframe n-k, where the downlink data includes a PDSCH or downlink SPS release signaling, where $k \in \{k_0, k_1, \ldots, k_{M_c-1}\}$, and $M_c$ is a natural number greater than or equal to 1, and is specifically the number of elements of the downlink association set $\{k_0, k_1, \ldots, k_{M_c-1}\}$. In other words, the UE receives the downlink data of the serving cell c in a subframe within the HARQ-ACK bundling subframe set $\{n-k_0, n-k_1, \ldots, n-k_{M_c-1}\}$, where the downlink data includes the PDSCH or the downlink SPS release signaling.

Step S203: The UE determines HARQ-ACK information according to the downlink association set $\{k_0, k_1, \ldots, k_{M_c-1}\}$, where the HARQ-ACK information is carried on the PUSCH.

As mentioned above, in this embodiment, the UE is preferably a UE that has a dynamic TDD uplink-downlink configuration capability, or a UE that is configured with a dynamic TDD uplink-downlink configuration, or a UE of a later version in the technical field; different UEs may be used according to understanding of a person skilled in the art, which is not limited herein. In this embodiment, the HARQ-ACK information in the subframe n is used to indicate a receive status of a PDSCH or downlink SPS release signaling received in the HARQ-ACK bundling subframe set $\{n-k_0, n-k_1, \ldots, n-k_{M_c-1}\}$. In addition, when multiple serving cells are configured for the UE, the HARQ-ACK information carried on the PUSCH includes HARQ-ACK information of the multiple serving cells.

It should be noted that, for different HARQ-ACK feedback modes, the UE may determine the HARQ-ACK information by using different methods. Therefore, before the UE determines the HARQ-ACK information, the UE further needs to determine an HARQ-ACK feedback mode. For example, HARQ-ACK bundling is to perform a logical AND operation on the HARQ-ACK information in multiple downlink subframes, that is, to compress the HARQ-ACK information, which, however, causes a loss in the HARQ-ACK information. In an application scenario of a dynamic TDD uplink-downlink configuration, because different subframes are exposed to different types of main interference and greatly vary in performance, performance deterioration is caused if the Logical AND operation is performed. Therefore, in the application scenario of a dynamic TDD uplink-downlink configuration, HARQ-ACK bundling may not be supported; that is, the UE determines that the HARQ-ACK feedback mode does not include HARQ-ACK bundling.

It should be specially pointed out that, in other embodiments, if the UE supports HARQ-ACK bundling, processing may be performed by using the following solution A and solution B of this embodiment.

Correspondingly, step S203 includes the solution A and the solution B.

Solution A

The UE determines, according to the downlink association set $\{k_0, k_1, \ldots, k_{M_c-1}\}$, the HARQ-ACK information carried on the PUSCH, which may specifically include three sub-solutions A-1, A-2, and A-3.

Sub-Solution A-1

The UE determines that the number of bits of the HARQ-ACK information of the serving cell c is $O^{ACK}$, where the following two methods are used to determine $O^{ACK}$. Method 1: The UE directly determines that $O^{ACK}=M_c$. Method 2: The UE determines the HARQ-ACK bundling subframe set $\{n-k_0, n-k_1, \ldots, n-k_{M_c-1}\}$ according to the downlink association set $\{k_0, k_1, \ldots, k_{M_c-1}\}$; when the HARQ-ACK bundling subframe set $\{n-k_0, n-k_1, \ldots, n-k_{M_c-1}\}$ includes no downlink special mini-subframe, the UE determines that $O^{ACK}=M_c$; or when the HARQ-ACK bundling subframe set $\{n-k_0, n-k_1, \ldots, n-k_{M_c-1}\}$ includes a downlink special mini-subframe, the UE determines that $O^{ACK}=M_c-1$.

It should be noted that, in this embodiment, the HARQ-ACK information bit is $o_n^{ACK}$, $n=0, \ldots O^{ACK}-1$, where $o_i^{ACK}$ indicates HARQ-ACK information of a subframe n-$k_i$, and $k_i \in \{k_0, k_1, \ldots, k_{M_c-1}\}$. When the UE determines that a PDSCH or downlink SPS release signaling in the subframe n-$k_i$ is correctly received, $o_i^{ACK}$ indicates an ACK; when the UE determines that the PDSCH or the downlink SPS release signaling in the subframe n-$k_i$ is incorrectly received, $o_i^{ACK}$ indicates an NACK; or when the UE receives no PDSCH or downlink SPS release signaling in the subframe n-$k_i$, $o_i^{ACK}$ indicates an NACK. In addition, when the PDSCH in the subframe n-$k_i$ includes multiple codewords, $o_i^{ACK}$ is information on which spatial HARQ-ACK bundling is performed by the UE, that is, a logical AND operation is performed on HARQ-ACK information corresponding to all codewords in a same subframe. When the UE receives no PDSCH or downlink SPS release signaling in any subframe in the HARQ-ACK bundling subframe set {n-k$_0$, n-k$_1$, . . . , n-k$_{M_c-1}$}, the UE does not feedback the HARQ-ACK information in the subframe n.

It is worth mentioning that the sub-solution A-1 is applicable to a case in which only one serving cell is configured for the UE. For example, if the UE determines that an HARQ-ACK feedback mode of the serving cell c is HARQ-ACK bundling or HARQ-ACK multiplexing, the UE may execute the sub-solution A-1.

It should be specially noted that, in the prior art, when the HARQ-ACK feedback mode is HARQ-ACK bundling, the UE performs a logical AND operation on the HARQ-ACK information in multiple downlink subframes, and ultimately obtains the HARQ-ACK information which is 1 or 2 bits. Inaccurate DAI information in the UL Grant may cause the UE to feedback incorrect HARQ-ACK information. Likewise, when the HARQ-ACK information is determined according to DAI information of a DL Assignment, the UE may also feedback incorrect HARQ-ACK information because of missed detection of the DL Assignment. In this embodiment, the sub-solution A-1 is employed to avoid a problem of an HARQ-ACK information loss due to a logical AND operation in HARQ-ACK bundling, and also avoid a technical problem due to inaccurate DAI information of a UL Grant and missed detection of DL Assignment.

Sub-Solution A-2

N$_{cell}$ serving cells are configured for the UE, where N$_{cell}$>0, and the serving cell c is one serving cell among the N$_{cell}$ serving cells. The HARQ-ACK information includes HARQ-ACK information of the N$_{cell}$ serving cells.

The UE determines that the number of bits of the HARQ-ACK information of the serving cell c is $O_c^{ACK}$, where HARQ information bits are $o_{c,0}^{ACK}$, $o_{c,1}^{ACK}$, . . . , $o_{c,O_c^{ACK}-1}^{ACK}$. The UE determines a transmission mode of the serving cell c; if the transmission mode of the serving cell c supports one transport block (TB, Transport Block) or uses spatial HARQ-ACK bundling, the UE determines that $O_c^{ACK}=B_c^{DL}$; or if the transmission mode of the serving cell c supports two transport blocks and does not use spatial HARQ-ACK bundling, the UE determines that $O_c^{ACK}=2B_c^{DL}$. $B_c^{DL}$ is the number of downlink subframes for which the HARQ-ACK information needs to be fed back on the serving cell c. In this embodiment, $B_c^{DL}$ may be determined by using two methods. Method 1: The UE directly determines that $B_c^{DL}=M_c$. Method 2: The UE determines whether the HARQ-ACK bundling subframe set {n-k$_0$, n-k$_1$, . . . , n-k$_{M_c-1}$} includes a downlink special mini-subframe; when the downlink association set {k$_0$, k$_1$, . . . , k$_{M_c-1}$} includes no downlink special mini-subframe, $B_c^{DL}=M_c$; or when the downlink association set {k$_0$, k$_1$, . . . , k$_{M_c-1}$} includes a downlink special mini-subframe, $B_c^{DL}=M_c-1$, that is, HARQ-ACK information bits do not include HARQ-ACK information of the downlink special mini-subframe. When the UE receives no PDSCH or downlink SPS release signaling in any subframe in the HARQ-ACK bundling subframe set {n-k$_0$, n-k$_1$, . . . , n-k$_{M_c-1}$}, the UE does not feedback the HARQ-ACK information of the serving cell c in the subframe n.

The sub-solution A-2 in this embodiment is applicable to all HARQ-ACK feedback modes. Preferably, if the UE determines that the HARQ-ACK feedback mode of the serving cell c is PUCCH format 3, the UE executes the sub-solution A-2. In addition, if two serving cells are configured for the UE and if the UE determines that the HARQ-ACK feedback mode of the serving cell c is PUCCH format 1b with channel selection, the UE may also execute the sub-solution A-2.

Sub-Solution A-3

Two serving cells are configured for the UE, where the serving cell c is one serving cell among the two serving cells. The HARQ-ACK information indicates HARQ-ACK information of the two serving cells.

When downlink reference configurations of the two serving cells are the same, an operation is performed according to the following method:

when M$_c$=1 or 2, the UE determines that the number of bits of the HARQ-ACK information is A, where A is 2, 3, or 4; or when M$_c$=3 or 4, the UE determines that the number of bits of the HARQ-ACK information is 4.

When downlink reference configurations of the two serving cells (including the serving cell c and a serving cell d) are different, an operation is performed according to the following method:

when M=1 or 2, the UE determines that the number of bits of the HARQ-ACK information is A, where A is 2, 3, or 4; or when M=3 or 4, the UE determines that the number of bits of the HARQ-ACK information is 4.

M=max(M$_c$, M$_d$), M$_d$ is the number of elements of a downlink association set of a subframe n of the serving cell d, and M$_c$ is the number of elements in a downlink association set of a subframe n of the serving cell c.

It is worth noting that, if two serving cells are configured for the UE and if the UE determines that the HARQ-ACK feedback mode of the serving cell c is PUCCH format 1b with channel selection, the UE may also execute the sub-solution A-3.

In the solution A, HARQ-ACK information is determined according to a downlink association set {k$_0$, k$_1$, . . . , k$_{M_c-1}$}. This is different from the prior art in which a UE must determine, when receiving a UL Grant, the HARQ-ACK information according to a value indicated by a DAI carried by the UL Grant. The solution A effectively avoids the following technical problem: when the UL Grant is transmitted prior to the last subframe in an HARQ-ACK bundling subframe set, for example, in a scenario in which an uplink-downlink configuration is dynamically configured, the DAI carried by the UL Grant may not indicate the total number of PDSCHs and downlink SPS release signaling that are transmitted in the HARQ-ACK bundling subframe set, thereby causing the UE to feedback incorrect HARQ-ACK information. In addition, by practicing the methods in the solution A, another problem is avoided: when an uplink reference configuration is the uplink-downlink configuration 0, the UL Grant does not include a 2-bit DAI; therefore, the UL Grant cannot indicate the total number of PDSCHs and downlink SPS release signaling that are transmitted in the HARQ-ACK bundling subframe set.

Solution B

The step in which the UE determines, according to the downlink association set {k$_0$, k$_1$, . . . , k$_{M_c-1}$}, the HARQ-ACK information carried on the PUSCH may be specifically: determining, by the UE according to the downlink association set {k$_0$, k$_1$, . . . , k$_{M_c-1}$} and uplink-downlink configuration information, the HARQ-ACK information carried on the PUSCH. The uplink-downlink configuration information is information carried on a physical layer channel; preferably, the physical layer channel is a PDCCH/ePDCCH.

It should be noted that, in an application scenario of a dynamic TDD uplink-downlink configuration, uplink-downlink configuration information carried on a PDCCH or ePDCCH is a current uplink-downlink configuration used to indicate uplink and downlink subframe assignment. Specifically, a base station carries the uplink-downlink configuration information on the PDCCH/ePDCCH, and transmits the PDCCH/ePDCCH to the UE. The base station instructs, by using the uplink-downlink configuration information, the UE to detect the PDCCH/ePDCCH in a downlink subframe indicated by the uplink-downlink configuration information.

In this embodiment, the solution B specifically includes but is not limited to the following substeps:

Substep 2031: The UE determines an HARQ-ACK bundling subframe set $\{n-k_0, n-k_1, \ldots, n-k_{M_c-1}\}$ according to the downlink association set $\{k_0, k_1, \ldots, k_{M_c-1}\}$.

Substep 2032: The UE determines, according to uplink-downlink configuration information, the number $N_c^{DL}$ of downlink subframes in the HARQ-ACK bundling subframe set $\{n-k_0, n-k_1, \ldots, n-k_{M_c-1}\}$, where $N_c^{DL} \geq 0$, and the uplink-downlink configuration information is information carried on a physical layer channel.

Before substep 2032, preferably, in this embodiment, the UE receives physical layer signaling, where the physical layer signaling indicates the uplink-downlink configuration information. In an application scenario of a dynamic TDD uplink-downlink configuration, uplink-downlink configuration information carried by the physical layer signaling is a current uplink-downlink configuration used to indicate uplink and downlink subframe assignment. The UE may transmit uplink data in an uplink subframe indicated by the uplink-downlink configuration information, and the UE may receive downlink data in a downlink subframe indicated by the uplink-downlink configuration information. The UE detects a PDCCH/ePDCCH in the downlink subframe indicated by the uplink-downlink configuration information. The physical layer signaling is signaling carried on a physical layer channel; that is, the uplink-downlink configuration information is carried on the physical layer channel, and preferably, carried on the PDCCH or ePDCCH.

Substep 2033: The UE determines the HARQ-ACK information. Specifically, when $N_c^{DL} > 0$, the UE determines the HARQ-ACK information according to the following sub-solutions B-1, B-2, or B-3; or when $N_c^{DL} = 0$, the UE does not need to feedback HARQ-ACK information of the serving cell c; that is, the UE does not need to determine the HARQ-ACK information of the serving cell c.

Sub-Solution B-1

The UE determines that the number of bits of the HARQ-ACK information of the serving cell c is $O^{ACK}$, an HARQ-ACK information bit is $o_n^{ACK}$, $n=0, \ldots, O^{ACK}-1$, where $o_i^{ACK}$ indicates HARQ-ACK information of the subframe $n-k_i$. This embodiment is executed according to the following methods. Method 1: The UE determines that $O^{ACK}=N_c^{DL}$, where the subframe $n-k_i$ belongs to a first downlink subframe set, and the first downlink subframe set consists of $N_c^{DL}$ downlink subframes. Method 2: When the first downlink subframe set includes no downlink special mini-subframe, the UE determines that $O^{ACK}=N_c^{DL}$; or when the first downlink subframe set includes a downlink special mini-subframe, the UE determines that $O^{ACK}=N_c^{DL}-1$. It should be noted that, the subframe $n-k_i$ belongs to the first downlink subframe set; when the first downlink subframe set includes no downlink special mini-subframe, the first downlink subframe set consists of $N_c^{DL}$ downlink subframes; otherwise, the first downlink subframe set consists of $N_c^{DL}-1$ downlink subframes, except the downlink special mini-subframe, among the $N_c^{DL}$ downlink subframes.

The sub-solution B-1 in this embodiment is applicable to a case in which only one serving cell is configured for the UE. For example, if the UE determines that an HARQ-ACK feedback mode of the serving cell c is HARQ-ACK bundling or HARQ-ACK multiplexing, the UE may execute the sub-solution B-1.

Similar to the solution A-1, when the HARQ-ACK feedback mode is HARQ-ACK bundling, the solution B-1 in this embodiment is used to avoid a problem of an HARQ-ACK information loss caused by a logical AND operation, and also to avoid a technical problem caused by inaccurate DAI information of a UL Grant and missed detection of a DL Assignment. Further, compared with the solution A-1, the solution B-1 reduces the number of bits of HARQ-ACK information that is fed back.

Sub-Solution B-2

The UE determines that the number of bits of the HARQ-ACK information of the serving cell c is $O_c^{ACK}$, where HARQ information bits are $o_{c,0}^{ACK}, o_{c,1}^{ACK}, \ldots, o_{c,O_c^{ACK}-1}^{ACK}$. The UE determines a transmission mode of the serving cell c; if the transmission mode of the serving cell c supports one transport block or uses spatial HARQ-ACK bundling, the UE determines that $O_c^{ACK}=B_c^{DL}$; otherwise, the UE determines that $O_c^{ACK}=2B_c^{DL}$. As mentioned above, $B_c^{DL}$ is the number of downlink subframes on the serving cell c that require HARQ-ACK information. Likewise, in this embodiment, $B_c^{DL}$ may be determined by using two methods. Method 1: The UE directly determines that $B_c^{DL}=N_c^{DL}$. Method 2: The UE determines whether the $N_c^{DL}$ downlink subframes include a downlink special mini-subframe; when the $N_c^{DL}$ downlink subframes include no downlink special mini-subframe, determines that $B_c^{DL}=N_c^{DL}$; otherwise, determines that $B_c^{DL}=N_c^{DL}-1$, that is, HARQ-ACK information bits do not include HARQ-ACK information of the downlink special mini-subframe.

The sub-solution B-2 in this embodiment is applicable to all HARQ-ACK feedback modes. Preferably, if the UE determines that the HARQ-ACK feedback mode of the serving cell c is PUCCH format 3, the UE executes the sub-solution B-2. In addition, if two serving cells are configured for the UE and if the UE determines that the HARQ-ACK feedback mode of the serving cell c is PUCCH format 1b with channel selection, the UE may execute the sub-solution B-2.

Sub-Solution B-3

Two serving cells are configured for the UE, where the serving cell c is one serving cell among the two serving cells. The HARQ-ACK information is HARQ-ACK information corresponding to the two serving cells.

Scenario 1: When downlink reference configurations of the two serving cells are the same, an operation is performed according to the following method:

when $N_c^{DL}=1$ or 2, the UE determines that the number of bits of the HARQ-ACK information is A, where A is 2, 3, or 4; or when $N_c^{DL}=3$ or 4, the UE determines that the number of bits of the HARQ-ACK information is 4.

Scenario 2: When downlink reference configurations of the two serving cells (including the serving cell c and a serving cell d) are different, an operation is performed according to the following method:

when $N^{DL}=1$ or 2, the UE determines that the number of bits of the HARQ-ACK information is A, where A is 2, 3, or 4; or when $N^{DL}=3$ or 4, the UE determines that the number of bits of the HARQ-ACK information is 4.

$N^{DL}=\max(N_c^{DL}, N_d^{DL})$, $N_d^{DL}$ is the number of downlink subframes in an HARQ-ACK bundling subframe set of a subframe n of the serving cell d, and $N_c^{DL}$ is the number of downlink subframes in an HARQ-ACK bundling subframe set of a subframe n of the serving cell c. The UE determines the HARQ-ACK bundling subframe set of the subframe n of the serving cell c according to the downlink reference configuration of the serving cell c, and the UE determines the HARQ-ACK bundling subframe set of the subframe n of the serving cell d according to the downlink reference configuration of the serving cell d. The UE determines the number of downlink subframes in the HARQ-ACK bundling subframe set of the subframe n of the serving cell c according to first uplink-downlink configuration information, and the UE determines the number of downlink subframes in the HARQ-ACK bundling subframe set of the subframe n of the serving cell d according to second uplink-downlink configuration information, where the first uplink-downlink configuration information and the second uplink-downlink configuration information are information carried on a same physical layer channel or different physical layer channels. For the scenario 2, the uplink-downlink configuration information mentioned in substep 2032 is the first uplink-downlink configuration information.

It should be noted that, if two serving cells are configured for the UE and if the UE determines that the HARQ-ACK feedback mode of the serving cell c is PUCCH format 1b with channel selection, the UE may execute the sub-solution B-3.

In the solution A, HARQ-ACK information of each subframe in the HARQ-ACK bundling subframe set $\{n-k_0, n-k_1, \ldots, n-k_{M_c-1}\}$ needs to be fed back. However, in an application scenario of dynamic TDD uplink-downlink configuration, subframes in the HARQ-ACK bundling subframe set $\{n-k_0, n-k_1, \ldots, n-k_{M_c-1}\}$ may be uplink subframes, and HARQ-ACK information corresponding to these uplink subframes is invalid. If the invalid HARQ-ACK information is also fed back to a base station, performance of other data carried on a PUSCH may be deteriorated. Compared with the solution A, in the solution B, HARQ-ACK information of only downlink subframes in the HARQ-ACK bundling subframe set $\{n-k_0, n-k_1, \ldots, n-k_{M_c-1}\}$ is fed back, thereby reducing the number of bits of the HARQ-ACK information that is fed back, and having little impact on performance of other data carried on a PUSCH.

Step S204: The UE transmits the PUSCH in the subframe n.

In step S204, in the subframe n, the UE carries the HARQ-ACK information on the PUSCH, and transmits the PUSCH to a base station.

Figure 3:
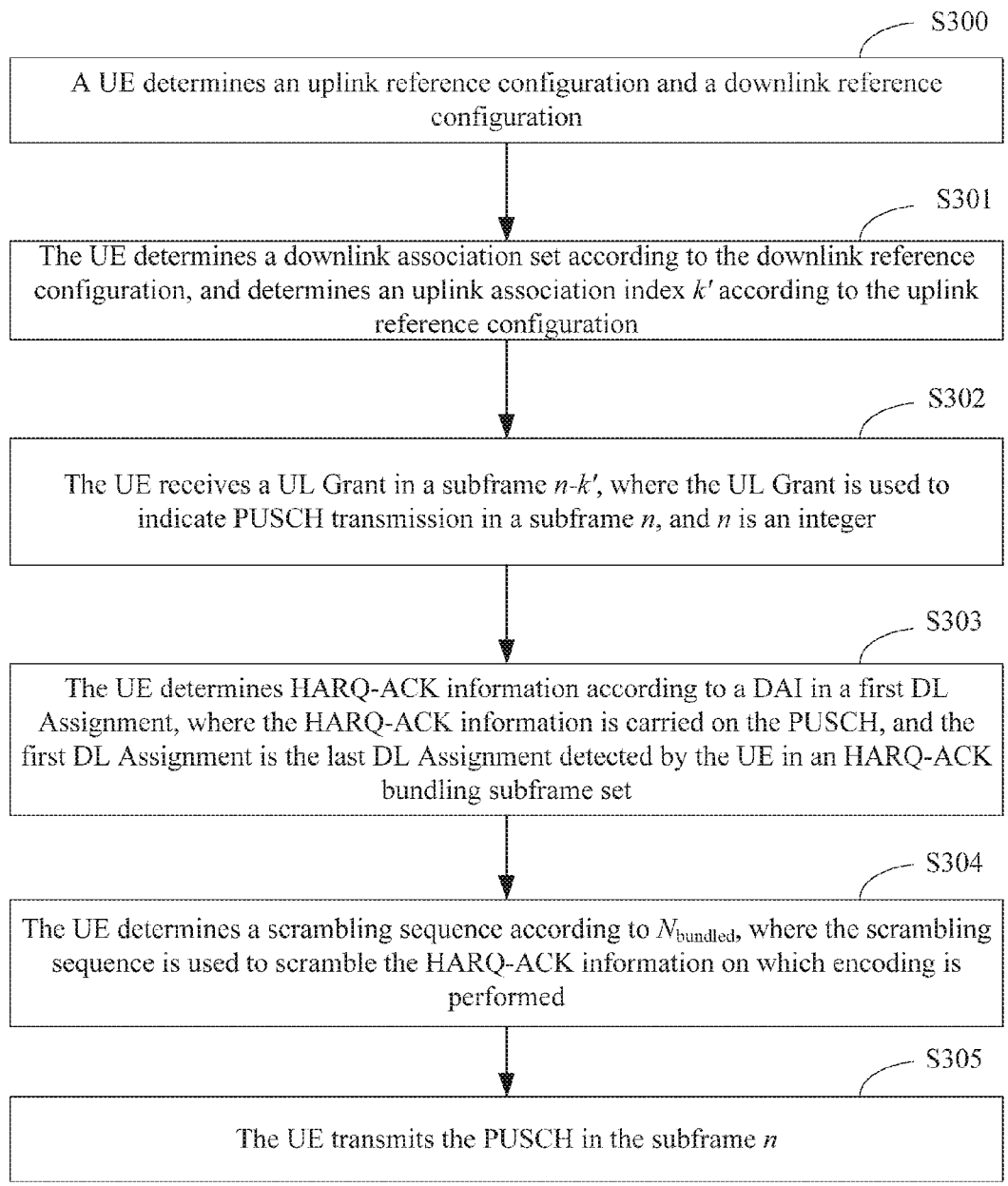
FIG. 3 is a schematic flowchart illustrating a second specific embodiment of a control information feedback method according to the present invention.

Then, referring to FIG. 3, FIG. 3 is a schematic flowchart illustrating a second specific embodiment of a control information feedback method according to the present invention. Preferably, in this embodiment, an HARQ-ACK feedback mode of a UE is HARQ-ACK bundling; the control information feedback method according to this embodiment includes but is not limited to the following steps:

Step S300: The UE determines an uplink reference configuration and a downlink reference configuration.

In step S300, preferably, the uplink reference configuration is different from the downlink reference configuration. In addition, for a specific process of implementing the step S300, refer to the related description of step S200, which is within a scope of understanding by a person skilled in the art by reference and is not repeatedly described.

Step S301: The UE determines a downlink association set $\{k_0, k_1, \ldots, k_{M_c-1}\}$, according to the downlink reference configuration, and determines an uplink association index k' according to the uplink reference configuration.

Step S301 is similar to step S201 of the foregoing embodiment, which is within a scope of understanding by a person skilled in the art and is not repeatedly described.

Step S302: The UE receives a UL Grant in a subframe n-k', where the UL Grant is used to indicate PUSCH transmission in a subframe n, and n is an integer.

Likewise, for a specific description of step S302, refer to step S202, which is not repeatedly described herein.

Step S303: The UE determines HARQ-ACK information according to a DAI in a first DL Assignment, where the HARQ-ACK information is carried on the PUSCH, and the first DL Assignment is the last DL Assignment detected by the UE in an HARQ-ACK bundling subframe set $\{n-k_0, n-k_1, \ldots, n-k_{M_c-1}\}$.

Specifically, a solution in step S303 is referred to as a solution C, which includes two sub-solutions C-1 and C-2.

Sub-Solution C-1

The UE determines the HARQ-ACK information according to the DAI in the first DL Assignment, which specifically includes the following substeps:

Substep C-10: The UE determines the HARQ-ACK bundling subframe set $\{n-k_0, n-k_1, \ldots, n-k_{M_c-1}\}$ according to the downlink association set $\{k_0, k_1, \ldots, k_{M_c-1}\}$.

Substep C-11: The UE determines the number $U_{DAI,c}$ of DL Assignments received in the HARQ-ACK bundling subframe set $\{n-k_0, n-k_1, \ldots, n-k_{M_c-1}\}$, where the first DL Assignment is the last DL Assignment among the $U_{DAI,c}$ DL Assignments.

Substep C-12: The UE determines $V_{DAI,c}^{DL}$, where $V_{DAI,c}^{DL}$ is a value indicated by the DAI in the first DL Assignment.

Substep C-13: The UE determines the HARQ-ACK information according to $U_{DAI,c}$ and $V_{DAI,c}^{DL}$.

It should be noted that, if the UE determines that $U_{DAI,c}>0$ and $V_{DAI,c}^{DL} \neq (U_{DAI,c}-1)\bmod 4+1$, the UE concludes that the HARQ-ACK information indicates an NACK, that is, HARQ-ACK information corresponding to all codewords is an NACK; if the UE determines that $U_{DAI,c}>0$ and $V_{DAI,c}^{DL} = (U_{DAI,c}-1)\bmod 4+1$, the UE concludes a receive status of a PDSCH or downlink SPS release signaling in the HARQ-ACK bundling subframe set $\{n-k_0, n-k_1, \ldots, n-k_{M_c-1}\}$, and performs a logical AND operation on all receive statuses, where a specific process is within a scope of understanding by a person skilled in the art and is not described in detail.

Sub-Solution C-2

The step in which the UE determines HARQ-ACK information according to a DAI in a first DL Assignment is specifically that: the UE determines the HARQ-ACK information according to the DAI in the first DL Assignment and a DAI in the UL Grant, which may specifically include the following substeps:

Substep C-20: The UE determines the HARQ-ACK bundling subframe set $\{n-k_0, n-k_1, \ldots, n-k_{M_c-1}\}$ according to the downlink association set $\{k_0, k_1, \ldots, k_{M_c-1}\}$.

Substep C-21: The UE determines that $U_{DAI,c}$ DL Assignments are received in the HARQ-ACK bundling subframe set $\{n-k_0, n-k_1, \ldots, n-k_{M_c-1}\}$, where the first DL Assignment is the last DL Assignment among the $U_{DAI,c}$ DL Assignments.

Substep C-22: The UE determines that $N_{SPS}$ PDSCHs not scheduled by using the DL Assignment are received in the HARQ-ACK bundling subframe set $\{n-k_0, n-k_1, \ldots, n-k_{M_c-1}\}$, that is, these PDSCHs have no corresponding DL Assignments.

Substep C-23: The UE determines $V_{DAI,c}^{DL}$, where $V_{DAI,c}^{DL}$ is a value indicated by the DAI in the first DL Assignment.

Substep C-24: The UE determines $V_{DAI}^{UL}$, where $V_{DAI}^{UL}$ is a value indicated by the DAI in the UL Grant.

Substep C-25: The UE determines the HARQ-ACK information according to $U_{DAI,c}$, $N_{SPS}$, $V_{DAI,c}^{DL}$, and $V_{DAI}^{UL}$.

It should be noted that, if the UE determines that $U_{DAI,c}>0$ and $V_{DAI,c}^{DL} \neq (U_{DAI,c}-1) \bmod 4+1$, or if the UE determines that $V_{DAI}^{UL}>(U_{DAI}+N_{SPS}-1) \bmod 4+1$, the UE concludes that the HARQ-ACK information indicates an NACK, that is, HARQ-ACK information corresponding to all codewords is an NACK; otherwise, the UE determines a receive status of a PDSCH or downlink SPS release signaling in the HARQ-ACK bundling subframe set $\{n-k_0, n-k_1, \ldots, n-k_{M_c-1}\}$, and performs a logical AND operation on all receive statuses.

Alternatively, Sub-Solution C-2

The step in which the UE determines HARQ-ACK information according to a DAI in a first DL Assignment is specifically that: the UE determines the HARQ-ACK information according to the DAI in the first DL Assignment and a DAI in the UL Grant, which may specifically include the following substeps:

Substep C-20: The UE determines the HARQ-ACK bundling subframe set $\{n-k_0, n-k_1, \ldots, n-k_{M_c-1}\}$ according to the downlink association set $\{k_0, k_1, \ldots, k_{M_c-1}\}$.

Substep C-21: The UE determines that $U_{DAI,c}$ DL Assignments are received in the HARQ-ACK bundling subframe set $\{n-k_0, n-k_1, \ldots, n-k_{M_c-1}\}$, where the first DL Assignment is the last DL Assignment among the $U_{DAI,c}$ DL Assignments.

Substep C-22: The UE determines that $N_{SPS}$ PDSCHs not scheduled by using the DL Assignment are received in the HARQ-ACK bundling subframe set $\{n-k_0, n-k_1, \ldots, n-k_{M_c-1}\}$, that is, these PDSCHs have no corresponding DL Assignments.

Substep C-23: The UE determines $V_{DAI,c}^{DL}$, where $V_{DAI,c}^{DL}$ is a value indicated by the DAI in the first DL Assignment.

Substep C-24: The UE determines K, where K is the number of subframes indicated by the DAI in the UL Grant, that is, the total number of subframes with PDSCH transmission and with downlink SPS release signaling transmission.

Substep C-25: The UE determines the HARQ-ACK information according to $U_{DAI,c}$, $N_{SPS}$, $V_{DAI,c}^{DL}$, and K.

It should be noted that, if the UE determines that $U_{DAI,c}>0$ and $V_{DAI,c}^{DL} \neq (U_{DAI,c}-1) \bmod 4+1$, or if the UE determines that $K>U_{DAI,c}+N_{SPS}$, the UE concludes that the HARQ-ACK information indicates an NACK, that is, HARQ-ACK information corresponding to all codewords is an NACK; otherwise, the UE determines a receive status of a PDSCH or downlink SPS release signaling in the HARQ-ACK bundling subframe set $\{n-k_0, n-k_1, \ldots, n-k_{M_c-1}\}$, and performs a logical AND operation on all receive statuses.

It is worth mentioning that the sub-solutions C-1 and C-2 (including the foregoing two different C-2 sub-solutions) are applicable to a case in which only one serving cell is configured for the UE. For example, if the UE determines that an HARQ-ACK feedback mode of the serving cell c is HARQ-ACK bundling, the UE may execute the sub-solutions C-1 or C-2.

Step S304: The UE determines a scrambling sequence according to $N_{bundled}$, where the scrambling sequence is used to scramble the HARQ-ACK information on which encoding is performed.

Before determining the scrambling sequence (scrambling sequence), the UE determines $N_{bundled}=(U_{DAI,c}+N_{SPS})$. For a method for determining $U_{DAI,c}$ and $N_{SPS}$, refer to the related description of the foregoing embodiment.

It is worth noting that, in the prior art, $N_{bundled}=1$ when the uplink-downlink configuration 0 is in use. In this embodiment, even when the uplink reference configuration is the uplink-downlink configuration 0 or the UL Grant includes no DAI, the UE still determines that $N_{bundled}=(U_{DAI,c}+N_{SPS})$, that is, $N_{bundled}$ may still be used to indicate the total number of PDSCHs and downlink SPS release signaling that are received by the UE.

The step in which the UE determines a scrambling sequence according to $N_{bundled}$ may include the following substeps:

Substep 3041: The UE determines a scrambling sequence index $i=(N_{bundled}-1) \bmod 4$.

Substep 3042: The UE selects the scrambling sequence according to the scrambling sequence index.

Step S305: The UE transmits the PUSCH in the subframe n.

In step S305, in the subframe n, the UE carries the HARQ-ACK information on the PUSCH, and transmits the PUSCH to a base station.

In this embodiment, HARQ-ACK information is determined according to a DAI in a first DL Assignment. This is different from the prior art in which in the case of an HARQ-ACK feedback mode being HARQ-ACK bundling, a UE must determine, when receiving a UL Grant, the HARQ-ACK information according to a value indicated by a DAI carried by the UL Grant. The method according to this embodiment effectively avoids the following technical problem: when the UL Grant is transmitted prior to the last subframe in an HARQ-ACK bundling subframe set, for example, in a scenario in which an uplink-downlink configuration is dynamically configured, the DAI carried by the UL Grant may not indicate the total number of PDSCHs and downlink SPS release signaling that are transmitted in an HARQ-ACK bundling subframe set, thereby causing the UE to feedback incorrect HARQ-ACK information. In addition, by practicing the method according to the solution C-1 in this embodiment, another problem is avoided: when an uplink reference configuration is the uplink-downlink configuration 0, the UL Grant does not include a 2-bit DAI; therefore, the UL Grant cannot indicate the total number of PDSCHs and downlink SPS release signaling that are transmitted in the HARQ-ACK bundling subframe set.

Figure 4:
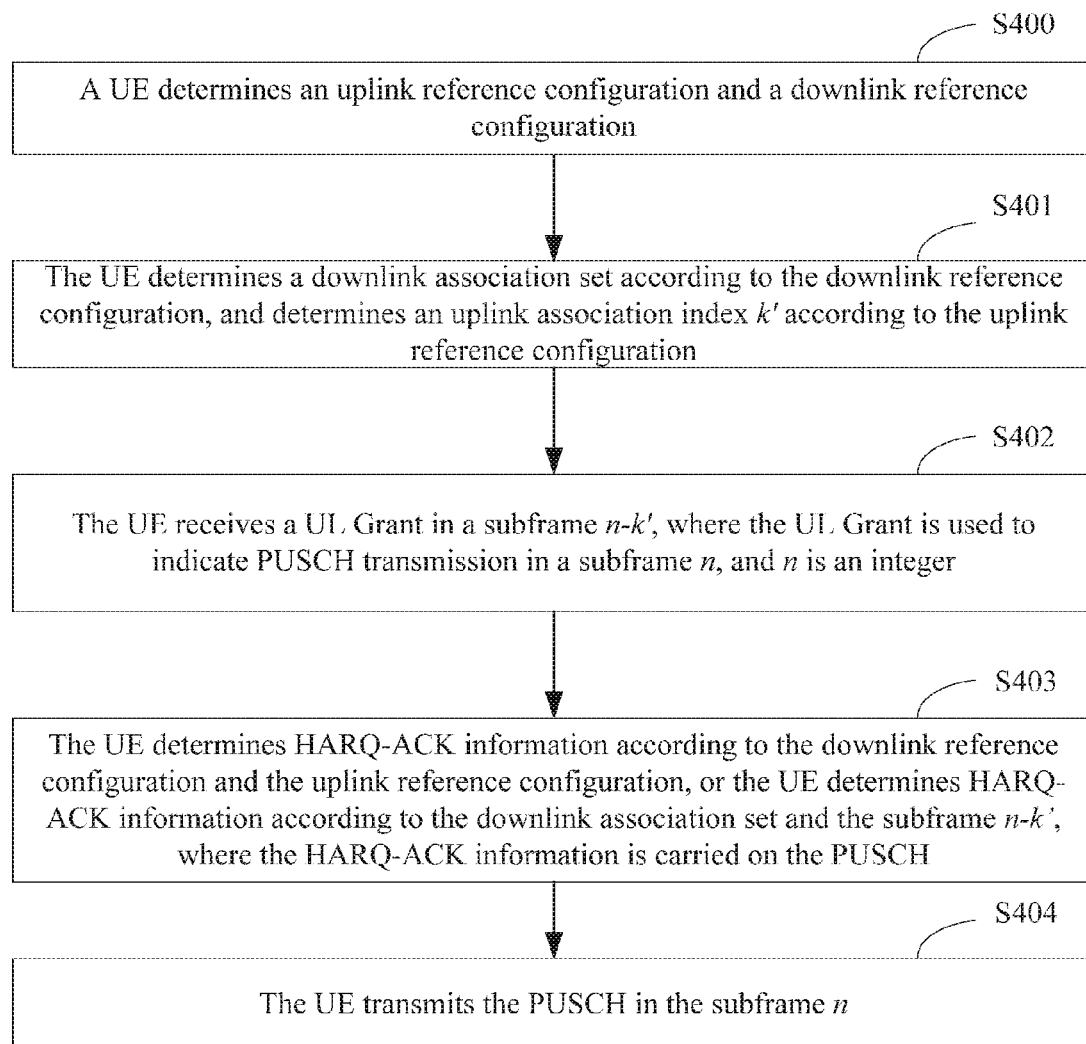
FIG. 4 is a schematic flowchart illustrating a third specific embodiment of a control information feedback method according to the present invention.

Then, referring to FIG. 4, FIG. 4 is a schematic flowchart illustrating a third specific embodiment of a control information feedback method according to the present invention. The control information feedback method according to this embodiment includes but is not limited to the following steps:

Step S400: A UE determines an uplink reference configuration and a downlink reference configuration.

In step S400, preferably, the uplink reference configuration is different from the downlink reference configuration. For a specific implementation principle and effect of step S400, refer to the related description of step S200, and details are not repeatedly described herein.

Step S401: The UE determines a downlink association set $\{k_0, k_1, \ldots, k_{M_c-1}\}$ according to the downlink reference configuration, and determines an uplink association index k' according to the uplink reference configuration.

Likewise, for a specific implementation principle and effect of step S401, refer to the related description of step S201, and details are not repeatedly described herein.

Step S402: The UE receives a UL Grant in a subframe n-k', where the UL Grant is used to indicate PUSCH transmission in a subframe n, and n is an integer.

For a specific implementation principle and effect of step S402 in this embodiment, refer to the related description of step S202, and details are not repeatedly described herein.

Step S403 may specifically be step S403' or step S403".

Step S403': The UE determines, according to the downlink reference configuration and the uplink reference configuration, HARQ-ACK information.

The UE may determine, according to the downlink reference configuration and the uplink reference configuration, the HARQ-ACK information. For example, a specific implementation process thereof may include the following:

When the UE determines that the uplink reference configuration is the uplink-downlink configuration 1 and the downlink reference configuration is the uplink-downlink configuration 2 or 5, or determines that the uplink reference configuration is the uplink-downlink configuration 6 and the downlink reference configuration is the uplink-downlink configuration 1, 2, 3, 4, or 5, or determines that the uplink reference configuration is the uplink-downlink configuration 0, the UE determines the HARQ-ACK information according to the downlink association set $\{k_0, k_1, \ldots, k_{M_c-1}\}$ (for details, refer to the solution A or the solution B in the foregoing embodiment, which are not repeatedly described herein), or the UE determines the HARQ-ACK information according to a DAI in a first DL Assignment (for details on determining the HARQ-ACK information, refer to the solution C in the foregoing embodiment, which are not repeatedly described herein).

When the UE determines that the uplink reference configuration and the downlink reference configuration are not among the combinations listed above, the UE determines the HARQ-ACK information according to a DAI in the UL Grant.

It should be noted that, when the uplink reference configuration is the uplink-downlink configuration 0, the UL Grant has no DAI. When the UE determines that the uplink reference configuration is the uplink-downlink configuration 1 and the downlink reference configuration is the uplink-downlink configuration 2 or 5, or determines that the uplink reference configuration is the uplink-downlink configuration 6 and the downlink reference configuration is the uplink-downlink configuration 1, 2, 3, 4, or 5, the subframe n–k' is a subframe prior to a subframe n–$k_{M_c-1}$; otherwise, the subframe n–k' is the subframe m–$k_{M_c-1}$ or a subframe after the subframe n–$k_{M_c-1}$. Therefore, step S403 may also be the method described below.

Alternatively, step S403": The UE determines, according to the downlink association set $\{k_0, k_1, \ldots, k_{M_c-1}\}$ and the subframe n–k', HARQ-ACK information, where the HARQ-ACK information is carried on the PUSCH.

Specifically, the step S403" may use the following two implementation mechanisms.

Implementation Mechanism 1

Substep 11: The UE determines an HARQ-ACK bundling subframe set $\{n-k_0, n-k_1, \ldots, n-k_{M_c-1}\}$ according to the downlink association set $\{k_0, k_1, \ldots, k_{M_c-1}\}$.

Substep 12: The UE determines a timing relationship between the subframe n–k' and subframes in the HARQ-ACK bundling subframe set $\{n-k_0, n-k_1, \ldots, n-k_{M_c-1}\}$.

Substep 13: The UE determines the HARQ-ACK information according to the timing relationship.

It should be noted that, if the UE determines that the subframe n–k' is the subframe n–$k_{M_c-1}$ or a subframe after the subframe n–$k_{M_c-1}$, the UE determines the HARQ-ACK information according to a DAI in the UL Grant. The subframe n–$k_{M_c-1}$ is the last subframe in the HARQ-ACK bundling subframe set $\{n-k_0, n-k_1, \ldots, n-k_{M_c-1}\}$.

If the UE determines that the subframe n–k' is a subframe prior to the subframe n–$k_{M_c-1}$, the UE determines the HARQ-ACK information according to the downlink association set $\{k_0, k_1, \ldots, k_{M_c-1}\}$. For details, refer to the solution A (including the sub-solution A-1, A-2, or A-3) or the solution B (including the sub-solution B-1, B-2, or B-3) in the foregoing embodiment, and details are not repeatedly described herein. Or, if the UE determines that the subframe n–k' is a subframe prior to the subframe n–$k_{M_c-1}$, the UE determines the HARQ-ACK information according to a DAI in a first DL Assignment. For details on determining the HARQ-ACK information, refer to the solution C (including the sub-solution C-1 or C-2) in the foregoing embodiment, and details are not repeatedly described herein.

Implementation Mechanism 2

It is worth noting that, in this embodiment, the HARQ-ACK information may include first HARQ-ACK information and second HARQ-ACK information. During an implementation process, the following substeps are included:

Substep 21: The UE determines a HARQ-ACK bundling subframe set $\{n-k_0, n-k_1, \ldots, n-k_{M_c-1}\}$ according to the downlink association set $\{k_0, k_1, \ldots, k_{M_c-1}\}$.

Substep 22: The UE determines a first subframe set and a second subframe set according to the subframe n–k' and the HARQ-ACK bundling subframe set $\{n-k_0, n-k_1, \ldots, n-k_{M_c-1}\}$, where the HARQ-ACK bundling subframe set $\{n-k_0, n-k_1, \ldots, n-k_{M_c-1}\}$ includes the first subframe set and the second subframe set, the last subframe in the first subframe set is the subframe n–k' or a subframe prior to the subframe n–k' (that is, no subframe in the first subframe set is later than the subframe n–k'), and the first subframe in the second subframe set is a subframe after the subframe n–k' (that is, all subframes in the second subframe set are later than the subframe n–k').

Substep 23: The UE determines the first HARQ-ACK information according to the DAI in the UL Grant, where the first HARQ-ACK information corresponds to the first subframe set. Substep 23 specifically includes sub-solutions D-1, D-2, and D-3.

Sub-Solution D-1

The UE determines the number $U_{DAI,c}^1$ of DL Assignments received in the first subframe set.

The UE determines the number $N_{SPS}^1$ of PDSCHs received in the first subframe set, where the PDSCH has no corresponding DL Assignment.

The UE determines $V_{DAI}^{UL,1}$, where $V_{DAI}^{UL,1}$ is a value indicated by the DAI in the UL Grant.

The UE determines the first HARQ-ACK information according to $U_{DAI,c}^1$, $N_{SPS}^1$, and $V_{DAI}^{UL,1}$.

It is worth noting that, if the UE determines that $V_{DAI}^{UL,1} \neq (U_{DAI,c}^1 + N_{SPS}^1 - 1) \bmod 4 + 1$, the UE concludes that the first HARQ-ACK information indicates an NACK, that is, first HARQ-ACK information corresponding to all codewords is an NACK; otherwise, the UE determines a receive status of the PDSCH or downlink SPS release signaling in the first subframe set, and performs a logical AND operation on all receive statuses.

The sub-solution D-1 is applicable to a case in which only one serving cell is configured for the UE. For example, if the UE determines that an HARQ-ACK feedback mode of a serving cell c is HARQ-ACK bundling, the UE may execute the sub-solution D-1.

Sub-Solution D-2

The UE determines the number $V_{DAI}^{UL,1}$ of bits of the first HARQ-ACK information of a serving cell c, where $V_{DAI}^{UL,1}$ is a value indicated by the DAI in the UL Grant. When $V_{DAI}^{UL,1}=4$ and the UE detects no PDSCH or downlink SPS release signaling in the first subframe set of the serving cell c, the UE concludes that the number of bits in the first HARQ-ACK information is 0.

The sub-solution D-2 is applicable to a case in which only one serving cell is configured for the UE. For example, if the UE determines that an HARQ-ACK feedback mode of the serving cell c is HARQ-ACK bundling or HARQ-ACK multiplexing, the UE may execute the sub-solution D-2.

Sub-Solution D-3

$N_{cell}$ serving cells are configured for the UE, where $N_{cell}>0$, and a serving cell c is one serving cell among the $N_{cell}$ serving cells.

The UE determines that the number of bits of the first HARQ-ACK information of the serving cell c is $O_c^{ACK,1}$. The UE determines a transmission mode of the serving cell c; when the transmission mode of the serving cell c supports one transport block or uses spatial HARQ-ACK bundling, the UE determines that the number of bits of the HARQ-ACK information of the serving cell c is $B_c^{DL,1}$; or when the transmission mode of the serving cell c supports two transport blocks and does not use spatial HARQ-ACK bundling, the UE determines that the number of bits of the HARQ-ACK information of the serving cell c is $2B_c^{DL,1}$.

In addition, that the UE determines $B_c^{DL,1}$ according to the DAI in the UL Grant includes the following:

Scenario 1: The $N_{cell}$ serving cells have a same downlink reference configuration, or uplink-downlink configuration information carried on a physical layer channel indicates that the $N_{cell}$ serving cells have a same uplink-downlink configuration.

When the downlink reference configuration is 1, 2, 3, 4, or 6, or when the uplink-downlink configuration information carried on a physical layer channel indicates the uplink-downlink configuration 1, 2, 3, 4, or 6, the UE determines that $B_c^{DL,1}=W_{DAI}^{UL,1}$; or when the downlink reference configuration is the uplink-downlink configuration 5 or the uplink-downlink configuration information carried on a physical layer channel indicates the uplink-downlink configuration 5, the UE determines that $B_c^{DL,1}=W_{DAI}^{UL,1}+4\lceil(U-W_{DAI}^{UL,1})/4\rceil$, where $W_{DAI}^{UL,1}$ is a value indicated by the DAI in the UL Grant.

Scenario 2: At least two serving cells among the $N_{cell}$ serving cells have different downlink reference configurations, or uplink-downlink configuration information carried on a physical layer channel indicates that at least two serving cells have different uplink-downlink configurations.

When none of downlink reference configurations of the $N_{cell}$ serving cells is the uplink-downlink configuration 5 or no uplink-downlink configuration indicated by the uplink-downlink configuration information carried on a physical layer channel is the uplink-downlink configuration 5, the UE determines that $B_c^{DL,1}=\min(W_{DAI}^{UL,1}, M_c^1)$, where $W_{DAI}^{UL,1}$ is a value indicated by the DAI in the UL Grant; or when a downlink reference configuration of at least one serving cell among the $N_{cell}$ serving cells is the uplink-downlink configuration 5 or the uplink-downlink configuration information carried on a physical layer channel indicates the uplink-downlink configuration 5, the UE determines that $B_c^{DL,1}=\min(W_{DAI}^{UL,1}+4\lceil(U-W_{DAI}^{UL,1})/4\rceil, M_c^1)$, where min( ) is a function for obtaining a minimum value, $M_c^1$ is the number of subframes in the first subframe set, $W_{DAI}^{UL,1}$ is a value indicated by the DAI in the UL Grant, U is a maximum $U_i$ value of the $N_{cell}$ serving cells, $U_i$ indicates a sum of the number of DL Assignments received in the first subframe set of an $i^{th}$ serving cell and the number of PDSCHs not scheduled by using the DL Assignment, and $0 \le i < N_{cell}$.

The sub-solution D-3 is applicable to all HARQ-ACK feedback modes. Preferably, if the UE determines that the HARQ-ACK feedback mode of the serving cell c is PUCCH format 3, the UE executes the sub-solution D-3. In addition, if two serving cells are configured for the UE and if the UE determines that the HARQ-ACK feedback mode of the serving cell c is PUCCH format 1b with channel selection, the UE executes the sub-solution D-3.

Substep 24: The UE determines the second HARQ-ACK information, where the second HARQ-ACK information corresponds to the second subframe set.

Substep 24 specifically includes sub-solutions E-1, E-2, and E-3.

Sub-Solution E-1

The UE determines the number $U_{DAI,c}^2$ of DL Assignments received in the second subframe set.

The UE determines $V_{DAI,c}^{DL,2}$, where $V_{DAI,c}^{DL,2}$ is a value indicated by a DAI in a second DL Assignment, and the second DL Assignment is the last DL Assignment detected by the UE in the second subframe set.

The UE determines the second HARQ-ACK information according to $U_{DAI,c}^2$ and $V_{DAI,c}^{DL,2}$.

It should be noted that, if the UE determines that $U_{DAI,c}^2>0$ and $V_{DAI,c}^{DL,2} \ne (U_{DAI,c}^2-1)\mod 4+1$, the UE concludes that the second HARQ-ACK information indicates an NACK, that is, HARQ-ACK information corresponding to all codewords is an NACK; if the UE determines that $U_{DAI,c}^2>0$ and $V_{DAI,c}^{DL,2}=(U_{DAI,c}^2-1)\mod 4+1$, the UE determines a receive status of a PDSCH or downlink SPS release signaling in the second subframe set, and performs a logical AND operation on all receive statuses; and if the UE determines that $U_{DAI,c}^2+N_{SPS}^2=0$, the UE concludes that the number of bits of the second HARQ-ACK information is 0.

The sub-solution E-1 is applicable to a case in which only one serving cell is configured for the UE. For example, if the UE determines that an HARQ-ACK feedback mode of a serving cell c is HARQ-ACK bundling, the UE executes the sub-solution E-1.

Sub-Solution E-2

The UE determines the number $O_c^{ACK,2}$ of bits of the second HARQ-ACK information of a serving cell c. The following four methods may be used to determine the $O_c^{ACK,2}$:

Method 1: The UE directly determines that $O_c^{ACK,2}=M_c^2$, where $M_c^2$ is the number of subframes in the second subframe set.

Method 2: The UE determines whether the second subframe set includes a downlink special mini-subframe; when the second subframe set includes no downlink special mini-subframe, $O_c^{ACK,2}=M_c^2$; otherwise, $O_c^{ACK,2}=M_c^2-1$.

Method 3: The UE determines the number $N_c^{DL,2}$ of downlink subframes in the second subframe set according to uplink-downlink configuration information, where the uplink-downlink configuration information is information carried on a physical layer channel; and the UE determines that $O_c^{ACK,2}=N_c^{DL,2}$.

Method 4: The UE determines the number $N_c^{DL,2}$ of downlink subframes in the second subframe set according to uplink-downlink configuration information, where the uplink-downlink configuration information is information carried on a physical layer channel; the UE determines whether the $N_c^{DL,2}$ downlink subframes include a downlink special mini-subframe; and when the $N_c^{DL,2}$ downlink subframes include no downlink special mini-subframe, the UE determines that $O_c^{ACK,2}=N_c^{DL,2}$; otherwise, $O_c^{ACK,2}=N_c^{DL,2}-1$.

The sub-solution E-2 is applicable to a case in which only one serving cell is configured for the UE. For example, if the UE determines that an HARQ-ACK feedback mode of the serving cell c is HARQ-ACK bundling or HARQ-ACK multiplexing, the UE executes the sub-solution E-2.

Sub-Solution E-3

$N_{cell}$ serving cells are configured for the UE, where $N_{cell}>0$, and a serving cell c is one serving cell among the $N_{cell}$ serving cells.

The UE determines that the number of bits of the second HARQ-ACK information of the serving cell c is $O_c^{ACK,2}$, and determines a transmission mode of the serving cell c. If the transmission mode of the serving cell c supports one transport block or uses spatial HARQ-ACK bundling, the UE determines that $O_c^{ACK,2}=B_c^{DL,2}$; otherwise, the UE determines that $O_c^{ACK,2}=2B_c^{DL,2}$. $B_c^{DL,2}$ is the number of downlink subframes for which the HARQ-ACK information needs to be fed back in the second subframe set on the serving cell c, where the following four methods may be used to determine $B_c^{DL,2}$:

Method 1: The UE determines that $B_c^{DL,2}=M_c^2$, where $M_c^2$ is the number of subframes in the second subframe set.

Method 2: The UE determines whether the second subframe set includes a downlink special mini-subframe; when the second subframe set includes no downlink special mini-subframe, $B_c^{DL,2}=M_c^2$; otherwise, $B_c^{DL,2}=M_c^2-1$.

Method 3: The UE determines the number $N_c^{DL,2}$ of downlink subframes in the second subframe set according to uplink-downlink configuration information, where the uplink-downlink configuration information is information carried on a physical layer channel; and the UE determines that $B_c^{DL,2}=N_c^{DL,2}$.

Method 4: The UE determines the number $N_c^{DL,2}$ of downlink subframes in the second subframe set according to uplink-downlink configuration information, where the uplink-downlink configuration information is information carried on a physical layer channel; and determines whether the $N_c^{DL,2}$ downlink subframes include a downlink special mini-subframe; when the $N_c^{DL,2}$ downlink subframes include no downlink special mini-subframe, the UE determines that $B_c^{DL,2}=N_c^{DL,2}$; otherwise, $B_c^{DL,2}=N_c^{DL,2}-1$.

It is worth noting that the sub-solution E-3 is applicable to all HARQ-ACK feedback modes. Preferably, if the UE determines that the HARQ-ACK feedback mode of the serving cell c is PUCCH format 3, the UE executes the sub-solution E-3. In addition, if two serving cells are configured for the UE and if the UE determines that the HARQ-ACK feedback mode of the serving cell c is PUCCH format 1b with channel selection, the UE executes the sub-solution E-3.

It should be noted that, the sub-solution C-1 or C-2 in the implementation mechanism 1, if used, or the sub-solution D-1 or E-1 in the implementation mechanism 2, may further include that: The UE determines $N_{bundled}$ according to a timing relationship, and determines a scrambling sequence according to $N_{bundled}$, where the scrambling sequence is used to scramble the HARQ-ACK information on which encoding is performed.

In this embodiment, the practice of determining, by the UE, $N_{bundled}$ according to a timing relationship includes:

If the UE determines that the subframe n-k' is a subframe n-$k_{M_c-1}$ or a subframe after the subframe n-$k_{M_c-1}$, the UE determines $N_{bundled}$ according to the DAI in the UL Grant. When the UE detects a DL Assignment loss in the HARQ-ACK bundling subframe set {n-$k_0$, n-$k_1$, . . . , n-$k_{M_c-1}$}, $N_{bundled}=V_{DAI}^{UL}+2$; conversely, when the UE detects no DL Assignment loss in the HARQ-ACK bundling subframe set {n-$k_0$, n-$k_1$, . . . , n-$k_{M_c-1}$}, $N_{bundled}=V_{DAI}^{UL}$.

In addition, if the UE determines that the subframe n-k' is a subframe prior to the subframe n-$k_{M_c-1}$, the UE may determine $N_{bundled}$ according to the solution provided in step S304 in the foregoing embodiment (corresponding to the solution C-1 or C-2), and details are not repeatedly described herein.

Step S404: The UE transmits the PUSCH in the subframe n.

As mentioned above, in the subframe n, the UE carries the HARQ-ACK information on the PUSCH, and transmits the PUSCH to a base station.

In this embodiment, a timing relationship between a UL Grant and an HARQ-ACK bundling subframe set is compared; when the UL Grant is valid, HARQ-ACK information is determined according to a DAI in the UL Grant; otherwise, HARQ-ACK information is determined according to a downlink association set {$k_0$, $k_1$, . . . , $k_{M_c-1}$} or a DAI in a DL Assignment. The DAI in the UL Grant may indicate the number of downlink subframe for which the HARQ-ACK information needs to be actually fed back; in this embodiment, the UL Grant is used whenever possible, so that in this embodiment, benefits of all the foregoing embodiments may be obtained, and the number of bits of the HARQ-ACK information may be further reduced.

Figure 5:
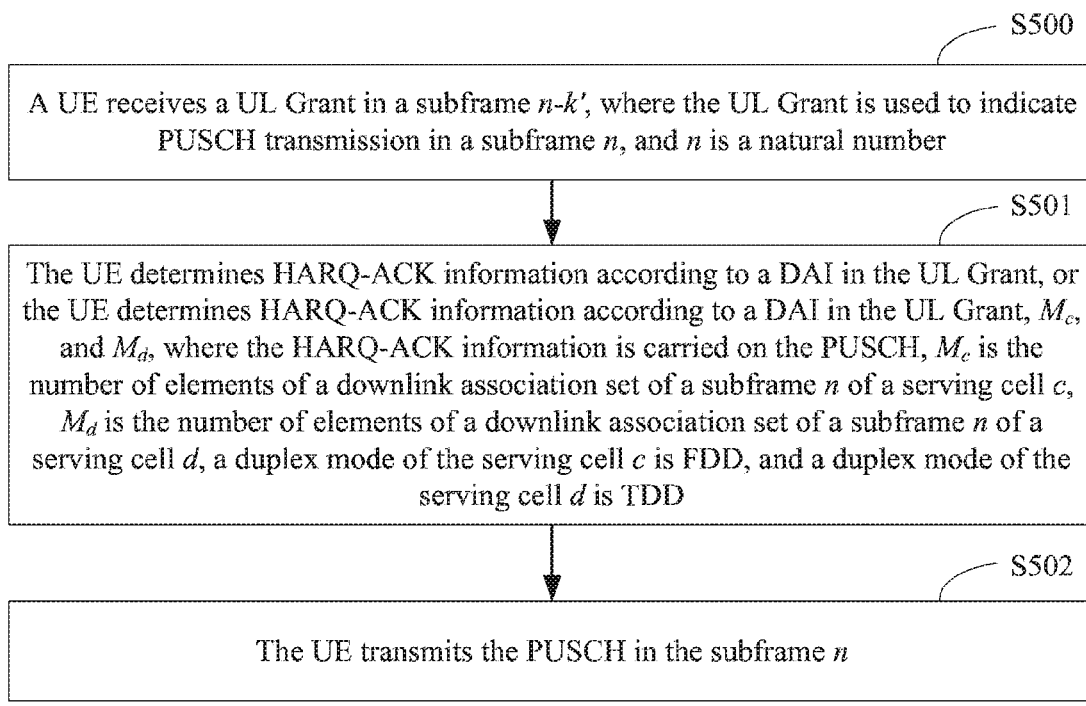
FIG. 5 is a schematic flowchart illustrating a fourth specific embodiment of a control information feedback method according to the present invention.

Referring to FIG. 5, FIG. 5 is a schematic flowchart illustrating a fourth specific embodiment of a control information feedback method according to the present invention. It should be noted that, in a TDD-FDD CA system, a serving cell c is a secondary cell, and a duplex mode of the serving cell c is FDD (frequency division duplex); a serving cell d is a primary cell (PCell, Primary Cell), and a duplex mode of the serving cell d is TDD. When HARQ-ACK information of the serving cell c is carried on a PUSCH of the serving cell d, a UE may determine the HARQ-ACK information according to this embodiment.

Step S500: The UE receives a UL Grant in a subframe n-k', where the UL Grant is used to indicate PUSCH transmission in a subframe n, and n is a natural number.

Step S501: The UE determines the HARQ-ACK information according to a DAI in the UL Grant, or the UE determines the HARQ-ACK information according to a DAI in the UL Grant, $M_c$, and $M_d$, where the HARQ-ACK information is carried on the PUSCH, $M_c$ is the number of elements of a downlink association set of a subframe n of the serving cell c, $M_d$ is the number of elements of a downlink association set of a subframe n of the serving cell d, a duplex mode of the serving cell c is FDD, and a duplex mode of the serving cell d is TDD.

In this embodiment, the UE determines an uplink association index k' according to an uplink reference configuration, and determines a downlink association set according to a downlink reference configuration.

When the uplink reference configuration is the uplink-downlink configuration 1 or the uplink-downlink configuration 6, and the downlink reference configuration of the serving cell c is the uplink-downlink configuration 1 or the uplink-downlink configuration 6, the UE determines that the number of bits of the HARQ-ACK information of the serving cell c is $O_c^{ACK}$, and HARQ information bits are $o_{c,0}^{ACK}, o_{c,1}^{ACK}, \ldots, o_{c,O_c^{ACK}-1}^{ACK}$. If a transmission mode of the serving cell c supports one transport block or uses spatial HARQ-ACK bundling, the UE determines that $O_c^{ACK}=B_c^{DL}$; otherwise, the UE determines that $O_c^{ACL}=2B_c^{DL}$. $B_c^{DL}$ is the number of downlink subframes for which the HARQ-ACK information needs to be fed back on the serving cell c. In this embodiment, $B_c^{DL}$ may be determined by using the following two methods:

Method 1: The UE determines that $B_c^{DL}=W_{DAI}^{UL}+1$, where $W_{DAI}^{UL}$ is a value indicated by the DAI in the UL Grant.

Method 2: The UE determines that $B_c^{DL}=W_{DAI}^{UL}+M_c-M_d$, where $M_c$ is the number of elements of the downlink association set of the subframe n of the serving cell c, and $M_d$ is the number of elements of the downlink association set of the subframe n of the serving cell d.

Step S502: The UE transmits the PUSCH in the subframe n.

Specifically, in the subframe n, the UE carries the HARQ-ACK information on the PUSCH, and transmits the PUSCH to a base station.

The foregoing one or more embodiments mainly describe specific processes of implementing the control information feedback method on the UE side; the following describes the UE with reference to the foregoing embodiments.

Figure 6:
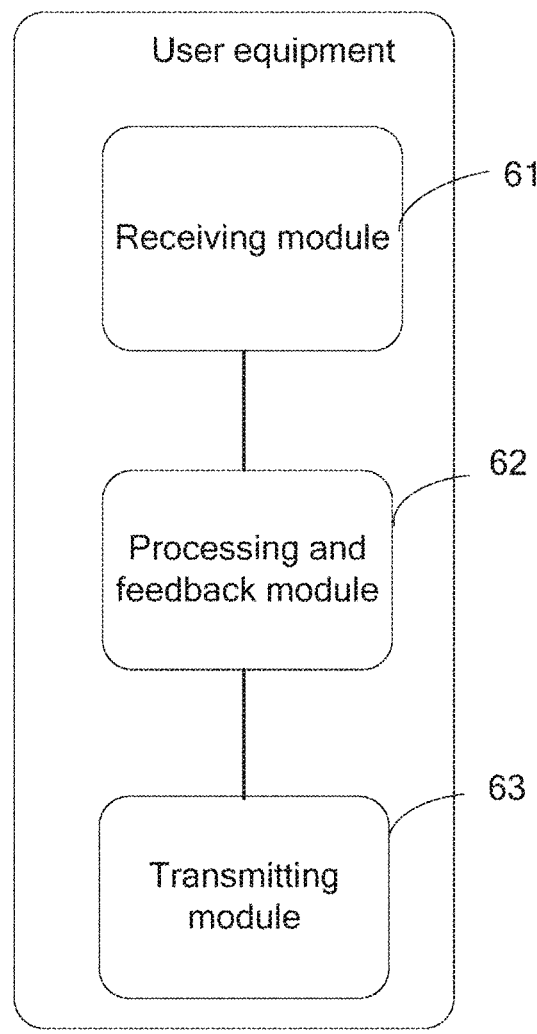
FIG. 6 is a block diagram illustrating modules of a first embodiment of a user equipment according to the present invention.

Referring to FIG. 6, FIG. 6 is a block diagram illustrating modules of a first embodiment of a user equipment according to the present invention. The UE according to this embodiment includes but is not limited to a receiving module 61, a processing and feedback module 62, and a transmitting module 63.

In this embodiment, the receiving module 61 is configured to receive an uplink grant UL Grant in a subframe n−k', where the UL Grant is used to indicate physical uplink shared channel PUSCH transmission in a subframe n, n is an integer, and k' is an uplink association index.

The processing and feedback module 62 is configured to determine hybrid automatic repeat request acknowledgment HARQ-ACK information according to a downlink reference configuration, where the downlink reference configuration is used to determine a downlink association set $\{k_0, k_1, \ldots, k_{M_c-1}\}$ and/or determine downlink HARQ timing, and the HARQ-ACK information is carried on the PUSCH.

The transmitting module 63 is configured to transmit the PUSCH in the subframe n.

It should be noted that, the user equipment may further include a parameter determining module 60, configured to determine the uplink association index k' according to an uplink reference configuration before the receiving module 61 receives the UL Grant in the subframe n−k'.

It should be noted that, in this embodiment, the downlink association set $\{k_0, k_1, \ldots, k_{M_c-1}\}$ or an HARQ-ACK bundling subframe set $\{n-k_0, n-k_1, \ldots, n-k_{M_c-1}\}$ or both are preferably used to determine the HARQ-ACK information. Apparently, if the UL Grant is transmitted in the last subframe of the HARQ-ACK bundling subframe set, the HARQ-ACK information may also be determined according to a value indicated by a DAI, which is not described in detail herein.

It can be easily understood that, in this embodiment, a downlink reference configuration is used to determine a downlink association set $\{k_0, k_1, \ldots, k_{M_c-1}\}$ and the like, so that HARQ-ACK information is jointly determined according to the downlink association set $\{k_0, k_1, \ldots, k_{M_c-1}\}$ and the like. This is different from the prior art in which a UE must determine, when receiving a UL Grant, the HARQ-ACK information according to a value (the total number of PDSCHs and downlink SPS release signaling) indicated by a DAI carried by the UL Grant. The user equipment according to this embodiment effectively avoids the following technical problem: when the UL Grant is transmitted prior to the last subframe in an HARQ-ACK bundling subframe set, for example, in a scenario in which an uplink-downlink configuration is dynamically configured, the DAI carried by the UL Grant may not indicate the total number of PDSCHs and downlink SPS release signaling that are transmitted in the HARQ-ACK bundling subframe set, thereby causing the UE to feedback incorrect HARQ-ACK information. In addition, by using the user equipment according to this embodiment, another problem is avoided: when an uplink reference configuration is the uplink-downlink configuration 0, the UL Grant does not include a 2-bit DAI; therefore, the UL Grant cannot indicate the total number of PDSCHs and the downlink SPS release signaling that are transmitted in the HARQ-ACK bundling subframe set. In this embodiment, the HARQ-ACK information may be determined by selecting and applying different conditions according to different situations, which provides more options in determining the HARQ-ACK information, and can effectively prevent a feedback error.

Figure 7:
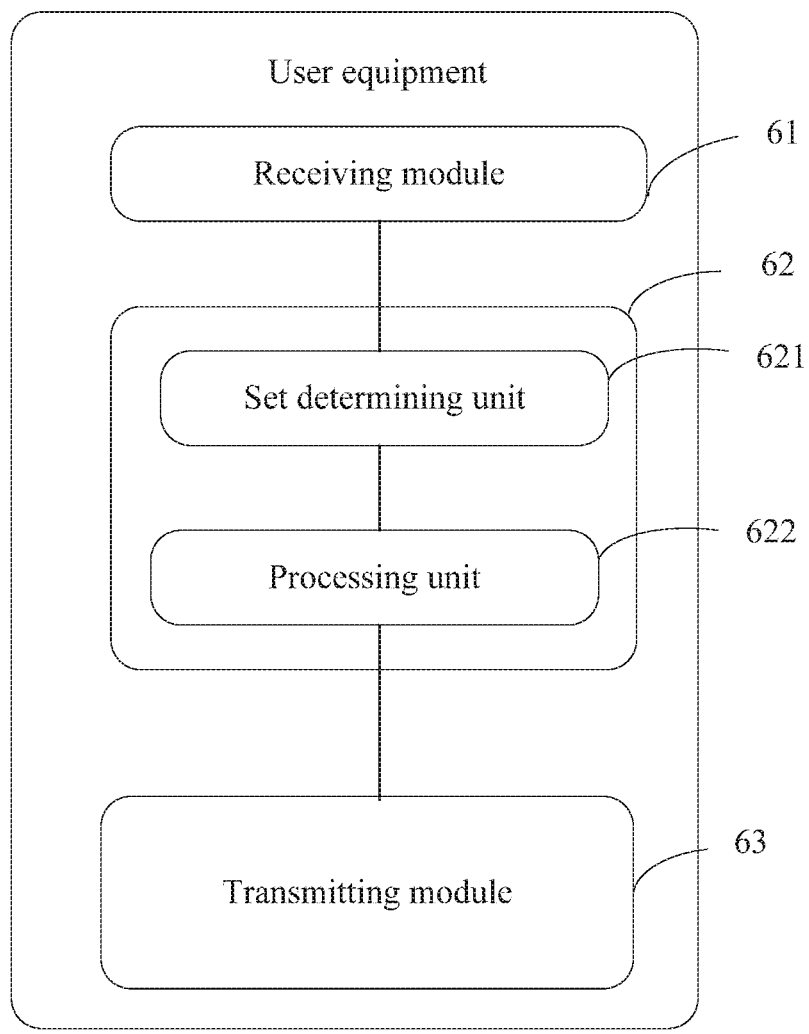
FIG. 7 is a block diagram illustrating modules of a second embodiment of a user equipment according to the present invention.

Referring to FIG. 7 with reference to FIG. 6 and the related description of the embodiment shown in FIG. 6, FIG. 7 is a block diagram illustrating modules of a second embodiment of a user equipment according to the present invention.

In this embodiment, the processing and feedback module 62 may specifically include a set determining unit 621 and a processing unit 622.

The set determining unit 621 is configured to determine the downlink association set $\{k_0, k_1, \ldots, k_{M_c-1}\}$ of the subframe n according to the downlink reference configuration. The processing unit 622 is configured to determine the HARQ-ACK information according to the downlink association set $\{k_0, k_1, \ldots, k_{M_c-1}\}$ determined by the set determining unit 621.

In an exemplary embodiment, the processing and feedback module 62 is specifically configured to determine, according to the downlink reference configuration and the uplink reference configuration, the HARQ-ACK information. In this case, the processing and feedback module 62 may correspondingly further include: a configuration determining unit 620, configured to determine that the uplink reference configuration is the uplink-downlink configuration 1 and the downlink reference configuration is the uplink-downlink configuration 2 or 5, or determine that the uplink reference configuration is the uplink-downlink configuration 6 and the downlink reference configuration is the uplink-downlink configuration 1, 2, 3, 4, or 5; then, the set determining unit 621 is configured to determine the downlink association set $\{k_0, k_1, \ldots, k_{M_c-1}\}$ of the subframe n according to the downlink reference configuration; and the processing unit 622 is configured to determine the HARQ-ACK information according to the downlink association set $\{k_0, k_1, \ldots, k_{M_c-1}\}$ determined by the set determining unit 621.

It should be noted that, the set determining unit 621 is further configured to determine the downlink association set $\{k_0, k_1, \ldots, k_{M_c-1}\}$ of the subframe n according to the downlink reference configuration, and determine the HARQ-ACK bundling subframe set $\{n-k_0, n-k_1, \ldots, n-k_{M_c-1}\}$ according to the downlink association set $\{k_0, k_1, \ldots, k_{M_c-1}\}$. The processing unit 622 is further configured to determine a timing relationship between the subframe n−k' and subframes in the HARQ-ACK bundling subframe set $\{n-k_0, n-k_1, \ldots, n-k_{M_c-1}\}$, and determine the HARQ-ACK information according to the timing relationship.

It should be pointed out that the processing unit 622 is specifically configured to determine the HARQ-ACK information according to a downlink assignment index DAI in the UL Grant when the determined timing relationship indicates that the subframe n−k' is the subframe n−$k_{M_c-1}$ or the subframe n−k' is a subframe after the subframe n−$k_{M_c-1}$, where the subframe n−$k_{M_c-1}$ is the last subframe in the HARQ-ACK bundling subframe set {n−$k_0$, n−$k_1$, . . . , n−$k_{M_c-1}$}. The processing unit 622 is further configured to determine the HARQ-ACK information according to the downlink association set {$k_0$, $k_1$, . . . , $k_{M_c-1}$} when the determined timing relationship indicates that the subframe n−k' is a subframe prior to the subframe n−$k_{M_c-1}$.

As mentioned above, only one serving cell c is configured for the UE, and the processing unit 622 is specifically configured to determine, according to the number of elements of the downlink association set {$k_0$, $k_1$, . . . , $k_{M_c-1}$}, that the number of bits of the HARQ-ACK information is $M_c$, where $M_c$ is the number of elements of the downlink association set {$k_0$, $k_1$, . . . , $k_{M_c-1}$}.

In a further implementation process of this embodiment, the processing unit 622 may specifically include a subframe determining unit, a first processing unit, and a second processing unit.

The subframe determining unit is configured to determine, after the set determining unit 621 determines the HARQ-ACK bundling subframe set in {n−$k_0$, n−$k_1$, . . . , n−$k_{M_c-1}$} according to the downlink association set {$k_0$, $k_1$, . . . , $k_{M_c-1}$}, a first subframe set and a second subframe set according to the subframe n−k' and the set {n−$k_0$, n−$k_1$, . . . , n−$k_{M_c-1}$}.

The first processing unit is configured to determine first HARQ-ACK information according to downlink control information DAI in the UL Grant.

The second processing unit is configured to determine second HARQ-ACK information.

It should be noted that, the HARQ-ACK bundling subframe set {n−$k_0$, n−$k_1$, . . . , n−$k_{M_c-1}$} includes the first subframe set and the second subframe set, the last subframe in the first subframe set is the subframe n−k' or a subframe prior to the subframe n−k', the first subframe in the second subframe set is a subframe after the subframe n−k', the first HARQ-ACK information corresponds to the first subframe set, the second HARQ-ACK information corresponds to the second subframe set, and the HARQ-ACK information includes the first HARQ-ACK information and the second HARQ-ACK information.

The first processing unit is specifically configured to conclude, when it is determined that $V_{DAI}^{UL,1} \neq (U_{DAI,c}^1 + N_{SPS}^1 - 1) \mod 4 + 1$, that the first HARQ-ACK information indicates an NACK indicative of incorrect reception.

As mentioned above, if only one serving cell c is configured for the UE, the first processing unit is specifically configured to determine that the number of bits of the first HARQ-ACK information is $V_{DAI}^{UL,1}$, where $V_{DAI}^{UL,1}$ is a value indicated by the DAI in the UL Grant.

In addition, only one serving cell c is configured for the UE, and the second processing unit is specifically configured to determine the second HARQ-ACK information according to a value indicated by a DAI in a downlink assignment DL Assignment received in the second subframe set.

Preferably, only one serving cell c is configured for the UE, and the second processing unit is specifically configured to determine that the number of bits of the second HARQ-ACK information is $M_c^2$, where $M_c^2$ is the number of subframes in the second subframe set.

In addition, the second processing unit is specifically configured to determine, according to uplink-downlink configuration information, the number $N_c^{DL,2}$ of downlink subframes included in the second subframe set, where the uplink-downlink configuration information is information carried on a physical layer channel. When the $N_c^{DL,2}$ downlink subframes include no downlink special mini-subframe, the second processing unit determines that $B_c^{DL,2} = N_c^{DL,2}$; when the $N_c^{DL,2}$ downlink subframes include a downlink special mini-subframe, the second processing unit determines that $B_c^{DL,2} = N_c^{DL,2} - 1$.

In another embodiment, only one serving cell c is configured for the UE, and the processing unit 622 is specifically configured to determine, after the set determining unit 621 determines the HARQ-ACK bundling subframe set {n−$k_0$, n−$k_1$, . . . , n−$k_{M_c-1}$} according to the downlink association set {$k_0$, $k_1$, . . . , $k_{M_c-1}$}, a first DL Assignment, where the first DL Assignment is the last DL Assignment detected in the HARQ-ACK bundling subframe set {n−$k_0$, n−$k_1$, . . . , n−$k_{M_c-1}$}; and determine the HARQ-ACK information according to a downlink assignment index DAI in the first DL Assignment. Correspondingly, the processing unit 622 is specifically configured to determine the number $U_{DAI,c}$ of DL Assignments received in the HARQ-ACK bundling subframe set {n−$k_0$, n−$k_1$, . . . , n−$k_{M_c-1}$}, and determine a value $V_{DAI,c}^{DL}$ indicated by the DAI in the first DL Assignment, so as to determine the HARQ-ACK information according to $U_{DAI,c}$ and $V_{DAI,c}^{DL}$, where the first DL Assignment is specifically the last DL Assignment among $U_{DAI,c}$ DL Assignments. Further, the processing unit 622 is specifically configured to conclude, when it is determined that $U_{DAI,c} > 0$ and $V_{DAI,c}^{DL} \neq (U_{DAI,c} - 1) \mod 4 + 1$, that the HARQ-ACK information indicates an NACK indicative of incorrect reception.

For a DL Assignment, in this embodiment, the processing unit 622 is specifically configured to determine the number $U_{DAI,c}$ of DL Assignments received in the HARQ-ACK bundling subframe set {n−$k_0$, n−$k_1$, . . . , n−$k_{M_c-1}$}; determine the number $N_{SPS}$ of physical downlink shared channels PDSCHs received in the HARQ-ACK bundling subframe set {n−$k_0$, n−$k_1$, . . . , n−$k_{M_c-1}$}, where the PDSCH has no corresponding DL Assignment; determine a value $V_{DAI,c}^{DL}$ indicated by the DAI in the first DL Assignment; and determine a value $V_{DAI}^{UL}$ indicated by the DAI in the UL Grant, so as to determine the HARQ-ACK information according to $U_{DAI,c}$, $N_{SPS}$, $V_{DAI,c}^{DL}$, and $V_{DAI}^{UL}$. Specifically, the processing unit 622 is configured to conclude, when it is determined that $U_{DAI,c} > 0$ and $V_{DAI,c}^{DL} \neq (U_{DAI,c} - 1) \mod 4 + 1$, or when it is determined that $V_{DAI}^{UL} > (U_{DAI} + N_{SPS} - 1) \mod 4 + 1$, that the HARQ-ACK information indicates an NACK indicative of incorrect reception.

In the foregoing process of performing corresponding processing according to the DL Assignment, only one serving cell c is configured for the UE, and the processing unit 622 is further configured to determine that $N_{bundled} = (U_{DAI,c} + N_{SPS})$ after determining the HARQ-ACK information according to the DAI in the first DL Assignment, so as to determine a scrambling sequence according to $N_{bundled}$, where $U_{DAI,c}$ is the number, which is determined by the processing unit 622, of DL Assignments received in the HARQ-ACK bundling subframe set {n−$k_0$, n−$k_1$, . . . , n−$k_{M_c-1}$}, $N_{SPS}$ is the number, which is determined by the processing unit 622, of physical downlink shared channels PDSCHs received in the HARQ-ACK bundling subframe set {n−$k_0$, n−$k_1$, . . . , n−$k_{M_c-1}$}, where the PDSCH has no corresponding DL Assignment, and the scrambling sequence is used to scramble the HARQ-ACK information on which encoding is performed.

It should be specially pointed out that, in an exemplary embodiment, an HARQ-ACK feedback mode of the UE is the PUCCH format 1b with channel selection, and two serving cells are configured for the UE, where the two serving cells include a serving cell c, and the processing unit 622 is specifically configured to: when $M_c=1$ or 2, determine that the number of bits of the HARQ-ACK information is A, where A is 2, 3, or 4; or when $M_c=3$ or 4, determine that the number of bits of the HARQ-ACK information is 4; where $M_c$ is the number of elements of the downlink association set $\{k_0, k_1, \ldots, k_{M_c-1}\}$.

Figure 8:
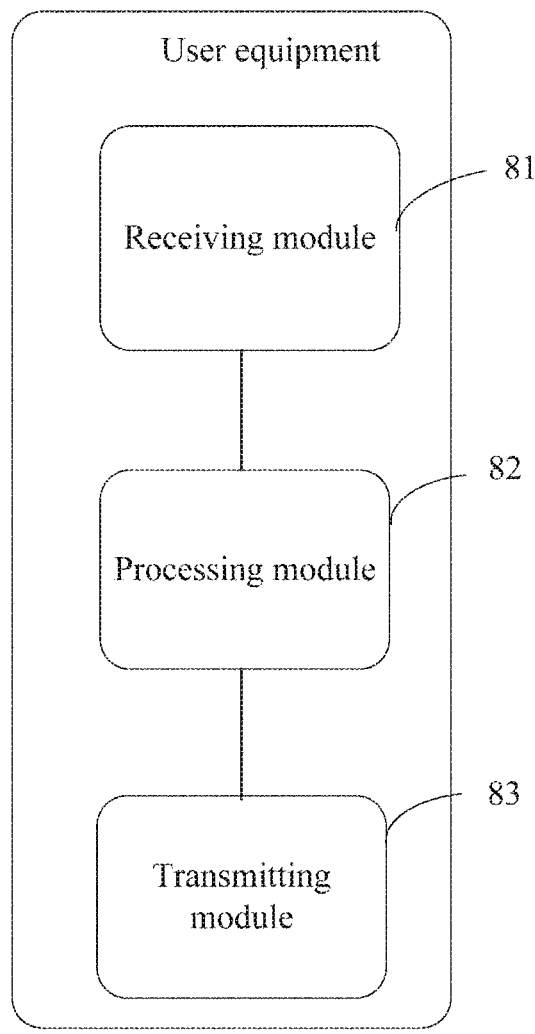
FIG. 8 is a block diagram illustrating modules of a third embodiment of a user equipment according to the present invention.

Referring to FIG. 8, FIG. 8 is a block diagram illustrating modules of a third embodiment of a user equipment according to the present invention. The user equipment according to this embodiment includes but is not limited to a receiving module 81, a processing module 82, and a transmitting module 83.

As mentioned above, in a TDD-FDD CA system, a serving cell c is a secondary cell, and a duplex mode of the serving cell c is FDD (frequency division duplex); a serving cell d is a primary cell (PCell, Primary Cell), and a duplex mode of the serving cell d is TDD. When HARQ-ACK information of the serving cell c is carried on a PUSCH of the serving cell d, a UE may determine the HARQ-ACK information according to this embodiment.

The receiving module 81 is configured to receive a UL Grant in a subframe n–k' where the UL Grant is used to indicate PUSCH transmission in a subframe n–k', and n is a natural number.

The processing module 82 is configured to determine the HARQ-ACK information according to a DAI in the UL Grant, or determine the HARQ-ACK information according to a DAI in the UL Grant, $M_c$, and $M_d$, where the HARQ-ACK information is carried on the PUSCH, $M_c$ is the number of elements of a downlink association set of a subframe n of the serving cell c, $M_d$ is the number of elements of a downlink association set of a subframe n of the serving cell d, the duplex mode of the serving cell c is FDD, and the duplex mode of the serving cell d is TDD.

In this embodiment, the processing module 82 determines an uplink association index k' according to an uplink reference configuration, and determines a downlink association set according to a downlink reference configuration.

When the uplink reference configuration is the uplink-downlink configuration 1 or the uplink-downlink configuration 6 and the downlink reference configuration of the serving cell c is the uplink-downlink configuration 1 or the uplink-downlink configuration 6, the processing module 82 determines that the number of bits of the HARQ-ACK information of the serving cell c is $O_c^{ACK}$, and HARQ information bits are $o_{c,0}^{ACK} o_{c,1}^{ACK}, \ldots, o_{c,O_c^{ACK}-1}^{ACK}$. If a transmission mode of the serving cell c supports one transport block or uses spatial HARQ-ACK bundling, the processing module 82 determines that $O_c^{ACK}=B_c^{DL}$; otherwise, the processing module 82 determines that $O_c^{ACK}=2B_c^{DL}$. $B_c^{DL}$ is the number of downlink subframes for which the HARQ-ACK information needs to be fed back on the serving cell c. In this embodiment, $B_c^{DL}$ may be determined by using the following two methods:

Method 1: The processing module 82 determines that $B_c^{DL}=W_{DAI}^{UL}+1$, where $W_{DAI}^{UL}$ is a value indicated by the DAI in the UL Grant.

Method 2: The processing module 82 determines that $B_c^{DL}=W_{DAI}^{UL}+M_c-M_d$, where $M_c$ is the number of elements of the downlink association set of the subframe n of the serving cell c, and $M_d$ is the number of elements of the downlink association set of the subframe n of the serving cell d.

The transmitting module 83 is configured to transmit the PUSCH in the subframe n.

Specifically, in the subframe n, the transmitting module 83 carries the HARQ-ACK information on the PUSCH, and transmits the PUSCH to a base station.

Figure 9:
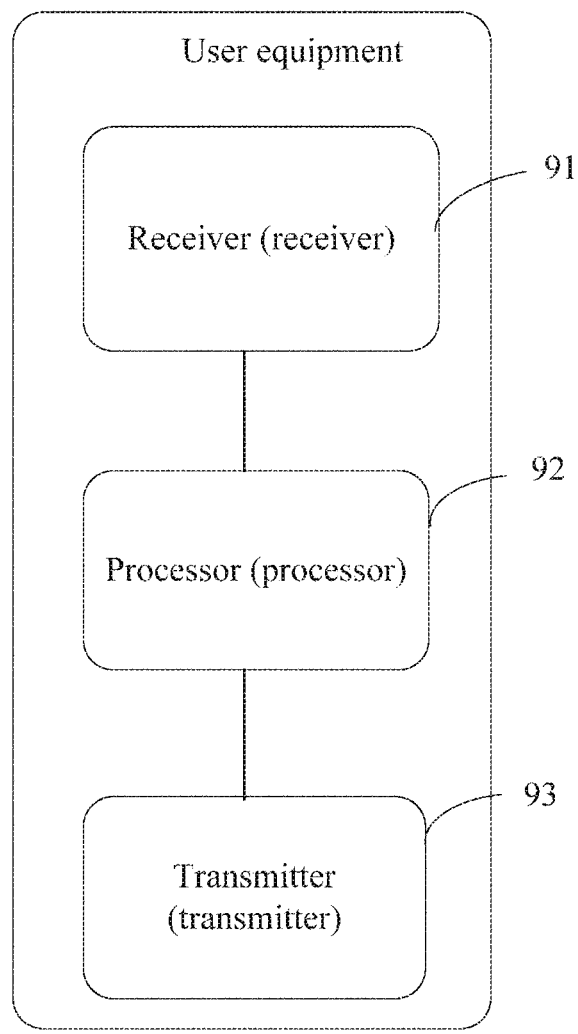
FIG. 9 is a block diagram illustrating modules of a fourth embodiment of a user equipment according to the present invention.

Referring to FIG. 9, FIG. 9 is a block diagram illustrating modules of a fourth embodiment of a user equipment according to the present invention. The UE according to this embodiment includes but is not limited to a receiver 91, a processor 92, and a transmitter 93.

In this embodiment, the receiver 91 is configured to receive an uplink grant UL Grant in a subframe n–k', where the UL Grant is used to indicate physical uplink shared channel PUSCH transmission in a subframe n, n is an integer, and k' is an uplink association index.

The processor 92 is configured to determine hybrid automatic repeat request acknowledgment HARQ-ACK information according to a downlink reference configuration, where the downlink reference configuration is used to determine a downlink association set $\{k_0, k_1, \ldots, k_{M_c-1}\}$ and/or determine downlink HARQ timing, and the HARQ-ACK information is carried on the PUSCH. It should be noted that, in this embodiment, the processor 92 may be further configured to determine the uplink association index k' according to an uplink reference configuration before the receiver 91 receives the UL Grant in the subframe n–k'.

The transmitter 93 is configured to transmit the PUSCH in the subframe n.

It should be noted that, in this embodiment, the downlink association set $\{k_0, k_1, \ldots, k_{M_c-1}\}$ or the HARQ-ACK bundling subframe set $\{n-k_0, n-k_1, \ldots, n-k_{M_c-1}\}$ or both are preferably used to determine the HARQ-ACK information. Apparently, if the UL Grant is transmitted in the last subframe of the HARQ-ACK bundling subframe set, the HARQ-ACK information may also be determined according to a value indicated by a DAI, which is not described in detail herein.

It can be easily understood that, in this embodiment, a downlink reference configuration is used to determine a downlink association set $\{k_0, k_1, \ldots, k_{M_c-1}\}$ and the like, so that HARQ-ACK information is jointly determined according to the downlink association set $\{k_0, k_1, \ldots, k_{M_c-1}\}$ and the like. This is different from the prior art in which a UE must determine, when receiving a UL Grant, the HARQ-ACK information according to a value (the total number of PDSCHs and downlink SPS release signaling) indicated by a DAI carried by the UL Grant. The user equipment according to this embodiment effectively avoids the following technical problem: when the UL Grant is transmitted prior to the last subframe in an HARQ-ACK bundling subframe set, for example, in a case in which an uplink-downlink configuration is dynamically configured, the DAI carried by the UL Grant may not indicate the total number of PDSCHs and downlink SPS release signaling that are transmitted in the HARQ-ACK bundling subframe set, thereby causing a UE to feedback incorrect HARQ-ACK information. In addition, by using the user equipment according to this embodiment, another problem is avoided: when an uplink reference configuration is the uplink-downlink configuration 0, the UL Grant does not include a 2-bit DAI; therefore, the UL Grant cannot indicate the total number of PDSCHs and the downlink SPS release signaling that are transmitted in the HARQ-ACK bundling subframe set. In this embodiment, the HARQ-ACK information may be determined by selecting and applying different conditions according to different situations, which provides more options in determining the HARQ-ACK information, and can effectively prevent a feedback error.

In a specific embodiment, the processor 92 is further configured to determine the downlink association set $\{k_0, k_1, \ldots, k_{M_c-1}\}$ of the subframe n according to the downlink reference configuration, so as to determine the HARQ-ACK information according to the determined downlink association set $\{k_0, k_1, \ldots, k_{M_c-1}\}$.

In an exemplary embodiment, the processor 92 is specifically configured to determine, according to the downlink reference configuration and the uplink reference configuration, the HARQ-ACK information. The processor 92 is configured to determine that the uplink reference configuration is the uplink-downlink configuration 1 and the downlink reference configuration is the uplink-downlink configuration 2 or 5, or is configured to determine that the uplink reference configuration is the uplink-downlink configuration 6 and the downlink reference configuration is the uplink-downlink configuration 1, 2, 3, 4, or 5. Then, the processor 92 determines the downlink association set $\{k_0, k_1, \ldots, k_{M_c-1}\}$ of the subframe n according to the downlink reference configuration. Finally, the processor 92 determines the HARQ-ACK information according to the downlink association set $\{k_0, k_1, \ldots, k_{M_c-1}\}$.

It should be noted that, the processor 92 is further configured to determine the downlink association set $\{k_0, k_1, \ldots, k_{M_c-1}\}$ of the subframe n according to the downlink reference configuration, and determine the HARQ-ACK bundling subframe set $\{n-k_0, n-k_1, \ldots, n-k_{M_c-1}\}$ according to the downlink association set $\{k_0, k_1, \ldots, k_{M_c-1}\}$. Then, the processor 92 determines a timing relationship between the subframe n-k' and subframes in the HARQ-ACK bundling subframe set $\{n-k_0, n-k_1, \ldots, n-k_{M_c-1}\}$, and determines the HARQ-ACK information according to the timing relationship.

Specifically, when the determined timing relationship indicates that the subframe n-k' is a subframe n-$k_{M_c-1}$ or the subframe n-k' is a subframe after the subframe n-$k_{M_c-1}$, the processor 92 determines the HARQ-ACK information according to a downlink assignment index DAI in the UL Grant, where the subframe n-$k_{M_c-1}$ is the last subframe in the HARQ-ACK bundling subframe set $\{n-k_0, n-k_1, \ldots, n-k_{M_c-1}\}$. In addition, the processor 92 determines the HARQ-ACK information according to the downlink association set $\{k_0, k_1, \ldots, k_{M_c-1}\}$ when the determined timing relationship indicates that the subframe n-k' is a subframe prior to the subframe n-$k_{M_c-1}$.

As mentioned above, only one serving cell c is configured for the UE, and the processor 92 is specifically configured to determine, according to the number of elements of the downlink association set $\{k_0, k_1, \ldots, k_{M_c-1}\}$, that the number of bits of the HARQ-ACK information is $M_c$, where $M_c$ is the number of elements of the downlink association set $\{k_0, k_1, \ldots, k_{M_c-1}\}$.

In addition, only one serving cell c is configured for the UE, and the processor 92 is specifically configured to determine the HARQ-ACK bundling subframe set $\{n-k_0, n-k_1, \ldots, n-k_{M_c-1}\}$ according to the downlink association set $\{k_0, k_1, \ldots, k_{M_c-1}\}$, and determine whether the HARQ-ACK bundling subframe set in $\{n-k_0, n-k_1, \ldots, n-k_{M_c-1}\}$ includes a downlink special mini-subframe; when the HARQ-ACK bundling subframe set $\{n-k_0, n-k_1, \ldots, n-k_{M_c-1}\}$ includes no downlink special mini-subframe, the processor 92 determines that the number of bits of the HARQ-ACK information is $M_c$; or when the HARQ-ACK bundling subframe set $\{n-k_0, n-k_1, \ldots, n-k_{M_c-1}\}$ includes a downlink special mini-subframe, the processor 92 determines that the number of bits of the HARQ-ACK information is $M_c-1$, where $M_c$ is the number of elements of the downlink association set $\{k_0, k_1, \ldots, k_{M_c-1}\}$.

In another embodiment, if only one serving cell c is configured for the UE, the processor 92 is specifically configured to determine, after the HARQ-ACK bundling subframe set $\{n-k_0, n-k_1, \ldots, n-k_{M_c-1}\}$ is determined according to the downlink association set $\{k_0, k_1, \ldots, k_{M_c-1}\}$, the number $N_c^{DL}$ of downlink subframes included in the HARQ-ACK bundling subframe set $\{n-k_0, n-k_1, \ldots, n-k_{M_c-1}\}$ according to uplink-downlink configuration information, where $N_c^{DL} \geq 0$, and the uplink-downlink configuration information is information carried on a physical layer channel; and determine, according to the number $N_c^{DL}$ of downlink subframes, that the number of bits of the HARQ-ACK information is $N_c^{DL}$.

Similarly, if only one serving cell c is configured for the UE, the processor 92 is specifically configured to determine, after the HARQ-ACK bundling subframe set $\{n-k_0, n-k_1, \ldots, n-k_{M_c-1}\}$ is determined according to the downlink association set $\{k_0, k_1, \ldots, k_{M_c-1}\}$, the number $N_c^{DL}$ of downlink subframes included in the HARQ-ACK bundling subframe set $\{n-k_0, n-k_1, \ldots, n-k_{M_c-1}\}$ according to uplink-downlink configuration information, and determine whether the HARQ-ACK bundling subframe set $\{n-k_0, n-k_1, \ldots, n-k_{M_c-1}\}$ includes a downlink special mini-subframe, where $N_c^{DL} \geq 0$, and the uplink-downlink configuration information is information carried on a physical layer channel; and when the HARQ-ACK bundling subframe set $\{n-k_0, n-k_1, \ldots, n-k_{M_c-1}\}$ includes no downlink special mini-subframe, the processor 92 determines, according to the number $N_c^{DL}$ of downlink subframes, that the number of bits of the HARQ-ACK information is $N_c^{DL}$; or when the HARQ-ACK bundling subframe set $\{n-k_0, n-k_1, \ldots, n-k_{M_c-1}\}$ includes a downlink special mini-subframe, the processor 92 determines, according to the number $N_c^{DL}$ of downlink subframes, that the number of bits of the HARQ-ACK information is $N_c^{DL}-1$.

Different from the case described above, if $N_{cell}$ serving cells are configured for the UE, where $N_{cell} > 0$, and the $N_{cell}$ serving cells include a serving cell c, the processor 92 is further configured to determine, according to the downlink association set $\{k_0, k_1, \ldots, k_{M_c-1}\}$, the number $B_c^{DL}$ of downlink subframes for which the HARQ-ACK information needs to be fed back on the serving cell c, and determine a transmission mode of the serving cell c. When the transmission mode of the serving cell c supports one transport block or uses spatial HARQ-ACK bundling, the processor 92 determines that the number of bits of the HARQ-ACK information of the serving cell c is $B_c^{DL}$; or when the transmission mode of the serving cell c supports two transport blocks and does not use spatial HARQ-ACK bundling, the processor 92 determines that the number of bits of the HARQ-ACK information of the serving cell c is $2B_c^{DL}$. Further, the processor 92 is specifically configured to determine the HARQ-ACK bundling subframe set $\{n-k_0, n-k_1, \ldots, n-k_{M_c-1}\}$ according to the downlink association set $\{k_0, k_1, \ldots, k_{M_c-1}\}$, and determine whether the HARQ-ACK bundling subframe set $\{n-k_0, n-k_1, \ldots, n-k_{M_c-1}\}$ includes a downlink special mini-subframe; when the HARQ-ACK bundling subframe set $\{n-k_0, n-k_1, \ldots, n-k_{M_c-1}\}$ includes no downlink special mini subframe, the processor 92 determines that $B_c^{DL}$ equals $M_c$; or when the HARQ-ACK bundling subframe set $\{n-k_0, n-k_1, \ldots, n-k_{M_c-1}\}$ includes a downlink special mini-subframe, the processor 92 determines that $B_c^{DL}$ equals $M_c-1$, where $M_c$ is the number of elements of the downlink association set $\{k_0, k_1, \ldots, k_{M_c-1}\}$.

In an exemplary embodiment, if $N_{cell}$ serving cells are configured for the UE, where $N_{cell}>0$, and the $N_{cell}$ serving cells include a serving cell c, the processor 92 is further configured to determine, after determining the HARQ-ACK bundling subframe set $\{n-k_0, n-k_1, \ldots, n-k_{M_c-1}\}$ according to the downlink association set $\{k_0, k_1, \ldots, k_{M_c-1}\}$, the number $N_c^{DL}$ of downlink subframes included in the HARQ-ACK bundling subframe set $\{n-k_0, n-k_1, \ldots, n-k_{M_c-1}\}$ according to uplink-downlink configuration information, where $N_c^{DL} \geq 0$, and the uplink-downlink configuration information is information carried on a physical layer channel; determine, according to $N_c^{DL}$, the number $B_c^{DL}$ of downlink subframes for which the HARQ-ACK information needs to be fed back on the serving cell c; and determine a transmission mode of the serving cell c. When $B_c^{DL}=0$, the processor 92 determines that the number of bits of the HARQ-ACK information of the serving cell c is 0; when $B_c^{DL}>0$ and the transmission mode of the serving cell c supports one transport block or uses spatial HARQ-ACK bundling, the processor 92 determines that the number of bits of the HARQ-ACK information of the serving cell c is $B_c^{DL}$; or when $B_c^{DL}>0$ and the transmission mode of the serving cell c supports two transport blocks and does not use spatial HARQ-ACK bundling, the processor 92 determines that the number of bits of the HARQ-ACK information of the serving cell c is $2B_c^{DL}$. Specifically, the processor 92 is configured to: when $N_c^{DL}=0$, determine that $B_c^{DL}$ equals 0; when the $N_c^{DL}$ downlink subframes include no downlink special mini-subframe, determine that $B_c^{DL}$ equals $M_c$; or when the $N_c^{DL}$ downlink subframes include a downlink special mini-subframe, determine that $B_c^{DL}$ equals $M_c-1$, where $M_c$ is the number of elements of the downlink association set $\{k_0, k_1, \ldots, k_{M_c-1}\}$.

In another embodiment, in the present invention, the HARQ-ACK information may be determined in different steps. For example, the processor 92 is configured to: after determining the HARQ-ACK bundling subframe set $\{n-k_0, n-k_1, \ldots, n-k_{M_c-1}\}$ according to the downlink association set $\{k_0, k_1, \ldots, k_{M_c-1}\}$, determine a first subframe set and a second subframe set according to the subframe n-k' and the set $\{n-k_0, n-k_1, \ldots, n-k_{M_c-1}\}$. Then, the processor 92 determines first HARQ-ACK information according to downlink control information DAI in the UL Grant. At the same time, the processor 92 is configured to determine second HARQ-ACK information. It should be noted that, the HARQ-ACK bundling subframe set $\{n-k_0, n-k_1, \ldots, n-k_{M_c-1}\}$ includes the first subframe set and the second subframe set, the last subframe in the first subframe set is the subframe n-k' or a subframe prior to the subframe n-k', the first subframe in the second subframe set is a subframe after the subframe n-k', the first HARQ-ACK information corresponds to the first subframe set, the second HARQ-ACK information corresponds to the second subframe set, and the HARQ-ACK information includes the first HARQ-ACK information and the second HARQ-ACK information.

For different number s of the serving cells c, if only one serving cell c is configured for the UE, the processor 92 is specifically configured to determine the number $U_{DAI,c}^1$ of downlink assignments DL Assignments received in the first subframe set; determine the number $N_{SPS}^1$ of PDSCHs received in the first subframe set, where the PDSCH has no corresponding DL Assignment; and determine a value $V_{DAI}^{UL,1}$ indicated by the DAI in the UL Grant, so as to determine the first HARQ-ACK information according to $U_{DAI,c}^1$, $N_{SPS}^1$, and $V_{DAI}^{UL,1}$. The processor 92 is specifically configured to conclude, when it is determined that $V_{DAI}^{UL,1} \neq (U_{DAI,c}^1 + N_{SPS}^1 - 1) \bmod 4 + 1$, that the first HARQ-ACK information indicates an NACK indicative of incorrect reception.

As mentioned above, if only one serving cell c is configured for the UE, the processor 92 may be further configured to determine that the number of bits of the first HARQ-ACK information is $V_{DAI}^{UL,1}$, where $V_{DAI}^{UL,1}$ is a value indicated by the DAI in the UL Grant.

Likewise, if $N_{cell}$ serving cells are configured for the UE, where $N_{cell}>0$, and the $N_{cell}$ serving cells include a serving cell c, the processor 92 is further configured to determine, according to the DAI in the UL Grant, the number $B_c^{DL,1}$ of downlink subframes for which the first HARQ-ACK information needs to be fed back on the serving cell c, and determine a transmission mode of the serving cell c. When the transmission mode of the serving cell c supports one transport block or uses spatial HARQ-ACK bundling, the processor 92 determines that the number of bits of the first HARQ-ACK information of the serving cell c is $B_c^{DL,1}$; or when the transmission mode of the serving cell c supports two transport blocks and does not use spatial HARQ-ACK bundling, the processor 92 determines that the number of bits of the first HARQ-ACK information of the serving cell c is $2B_c^{DL,1}$. Specifically, the processor 92 is configured to: when none of the downlink reference configurations of the $N_{cell}$ serving cells is the uplink-downlink configuration 5, determine that $B_c^{DL,1} = \min(W_{DAI}^{UL,1}, M_c^1)$; or when a downlink reference configuration of at least one serving cell among the $N_{cell}$ serving cells is the uplink-downlink configuration 5, determine that $B_c^{DL,1} = \min(W_{DAI}^{UL,1} + 4|(U - W_{DAI}^{UL,1})/4|, M_c^1)$; where min( ) is a function for obtaining a minimum value, $M_c^1$ is the number of subframes in the first subframe set, $W_{DAI}^{UL,1}$ is a value indicated by the DAI in the UL Grant, U is a maximum $U_i$ value of the $N_{cell}$ serving cells, $U_i$ indicates a sum of the number of DL Assignments received in the first subframe set of an $i^{th}$ serving cell and the number of PDSCHs not scheduled by using the DL Assignment, and $0 \leq i < N_{cell}$.

In addition, only one serving cell c is configured for the UE, and the processor 92 may be further configured to determine the second HARQ-ACK information according to a value indicated by a DAI in a downlink assignment DL Assignment received in the second subframe set.

Preferably, only one serving cell c is configured for the UE, and the processor 92 may be further configured to determine that the number of bits of the second HARQ-ACK information is $M_c^2$, where $M_c^2$ is the number of subframes in the second subframe set.

In this embodiment, if $N_{cell}$ serving cells are configured for the UE, where $N_{cell}>0$, and the $N_{cell}$ serving cells include a serving cell c, the processor 92 may be further configured to determine the number $B_c^{DL,2}$ of downlink subframes for which the second HARQ-ACK information needs to be fed back on the serving cell c, and determine a transmission mode of the serving cell c. When the transmission mode of the serving cell c supports one transport block or uses spatial HARQ-ACK bundling, the processor 92 determines that the number of bits of the second HARQ-ACK information of the serving cell c is $B_c^{DL,2}$; or when the transmission mode of the serving cell c supports two transport blocks and does not use spatial HARQ-ACK bundling, the processor 92 determines that the number of bits of the second HARQ-ACK information of the serving cell c is $2B_c^{DL,2}$. The processor 92 is specifically configured to: when the second subframe set includes no downlink special mini-subframe, determine that $B_c^{DL,2} = M_c^2$; or when the second subframe set includes a downlink special mini-subframe, determine that $B_c^{DL,2}=M_c^2-1$; where $M_c^2$ is the number of subframes in the second subframe set.

In addition, the processor 92 may be further configured to determine, according to uplink-downlink configuration information, the number $N_c^{DL,2}$ of downlink subframes included in the second subframe set, where the uplink-downlink configuration information is information carried on a physical layer channel. When the $N_c^{DL,2}$ downlink subframes include no downlink special mini-subframe, the processor 92 determines that $B_c^{DL,2}=N_c^{DL,2}$; when the $N_c^{DL,2}$ downlink subframes include a downlink special mini-subframe, the processor 92 determines that $B_c^{DL,2}=N_c^{DL,2}-1$.

In another embodiment, only one serving cell c is configured for the UE, and the processor 92 is specifically configured to determine a first DL Assignment after determining the HARQ-ACK bundling subframe set $\{n-k_0, n-k_1, \ldots, n-k_{M_c-1}\}$ according to the downlink association set $\{k_0, k_1, \ldots, k_{M_c-1}\}$, where the first DL Assignment is the last DL Assignment detected in the HARQ-ACK bundling subframe set $\{n-k_0, n-k_1, \ldots, n-k_{M_c-1}\}$; and determine the HARQ-ACK information according to a downlink assignment index DAI in the first DL Assignment. Correspondingly, the processor 92 is specifically configured to determine the number $U_{DAI,c}$ of DL Assignments received in the HARQ-ACK bundling subframe set $\{n-k_0, n-k_1, \ldots, n-k_{M_c-1}\}$, and determine a value $V_{DAI,c}^{DL}$ indicated by the DAI in the first DL Assignment, so as to determine the HARQ-ACK information according to $U_{DAI,c}$ and $V_{DAI,c}^{DL}$, where the first DL Assignment is specifically the last DL Assignment among $U_{DAI,c}$ DL Assignments. Further, the processor 92 is further configured to conclude, when it is determined that $U_{DAI,c}>0$ and $V_{DAI,c}^{DL} \neq (U_{DAI,c}-1) \mod 4+1$, that the HARQ-ACK information indicates an NACK indicative of incorrect reception.

For a DL Assignment, in this embodiment, the processor 92 may be further configured to determine the number $U_{DAI,c}$ of DL Assignments received in the HARQ-ACK bundling subframe set $\{n-k_0, n-k_1, \ldots, n-k_{M_c-1}\}$; determine the number $N_{SPS}$ of physical downlink shared channels PDSCHs received in the HARQ-ACK bundling subframe set $\{n-k_0, n-k_1, \ldots, n-k_{M_c-1}\}$, where the PDSCH has no corresponding DL Assignment; determine a value $V_{DAI,c}^{DL}$ indicated by the DAI in the first DL Assignment; and determine a value $V_{DAI}^{UL}$ indicated by the DAI in the UL Grant, so as to determine the HARQ-ACK information according to $U_{DAI,c}$, $N_{SPS}$, $V_{DAI,c}^{DL}$, and $V_{DAI}^{UL}$. Specifically, the processor 92 is configured to conclude, when it is determined that $U_{DAI,c}>0$ and $V_{DAI,c}^{DL} \neq (U_{DAI,c}-1) \mod 4+1$, or when it is determined that $V_{DAI}^{UL} > (U_{DAI}+N_{SPS}-1) \mod 4+1$, that the HARQ-ACK information indicates an NACK indicative of incorrect reception.

During the foregoing process of performing corresponding processing according to the DL Assignment, only one serving cell c is configured for the UE, and the processor 92 is specifically configured to determine that $N_{bundled}=(U_{DAI,c}+N_{SPS})$ after determining the HARQ-ACK information according to the DAI in the first DL Assignment, so as to determine a scrambling sequence according to $N_{bundled}$, where $U_{DAI,c}$ is the number, which is determined by the processor 92, of DL Assignments received in the HARQ-ACK bundling subframe set $\{n-k_0, n-k_1, \ldots, n-k_{M_c-1}\}$, $N_{SPS}$ is the number, which is determined by the processor 92, of physical downlink shared channels PDSCHs received in the HARQ-ACK bundling subframe set $\{N-k_0, n-k_1, \ldots, n-k_{M_c-1}\}$, where the PDSCH has no corresponding DL Assignment, and the scrambling sequence is used to scramble the HARQ-ACK information on which encoding is performed.

It should be specially pointed out that, in an exemplary embodiment, an HARQ-ACK feedback mode of the UE is PUCCH format 1b with channel selection, and two serving cells are configured for the UE, where the two serving cells include a serving cell c, and the processor 92 is specifically configured to: when $M_c=1$ or 2, determine that the number of bits of the HARQ-ACK information is A, where A is 2, 3, or 4; or when $M_c=3$ or 4, determine that the number of bits of the HARQ-ACK information is 4; where $M_c$ is the number of elements of the downlink association set $\{k_0, k_1, \ldots, k_{M_c-1}\}$.

As mentioned above, the processor 92 is configured to determine the HARQ-ACK information according to a DAI in the UL Grant, or the UE determines the HARQ-ACK information according to a DAI in the UL Grant, $M_c$, and $M_d$, where the HARQ-ACK information is carried on the PUSCH, $M_c$ is the number of elements of a downlink association set of a subframe n of the serving cell c, $M_d$ is the number of elements of a downlink association set of a subframe n of the serving cell d, the duplex mode of the serving cell c is FDD, and the duplex mode of the serving cell d is TDD.

In this embodiment, the processor 92 may be further configured to determine an uplink association index k' according to an uplink reference configuration, and determine a downlink association set according to a downlink reference configuration.

When the uplink reference configuration is the uplink-downlink configuration 1 or the uplink-downlink configuration 6, and the downlink reference configuration of the serving cell c is the uplink-downlink configuration 1 or the uplink-downlink configuration 6, the processor 92 determines that the number of bits of the HARQ-ACK information of the serving cell c is $O_c^{ACK}$, and HARQ information bits are $o_{c,0}^{ACK}, o_{c,1}^{ACK}, \ldots, o_{c,O_c^{ACK}-1}^{ACK}$. If a transmission mode of the serving cell c supports one transport block or uses spatial HARQ-ACK bundling, the processor 92 determines that $O_c^{ACK}=B_c^{DL}$; otherwise, the processor 92 determines that $O_c^{ACK}=2B_c^{DL}$. $B_c^{DL}$ is the number of downlink subframes for which the HARQ-ACK information needs to be fed back on the serving cell c. In this embodiment, $B_c^{DL}$ may be determined by using the following two methods:

Method 1: The processor 92 determines that $B_c^{DL}=W_{DAI}^{UL}+1$, where $W_{DAI}^{UL}$ is a value indicated by the DAI in the UL Grant.

Method 2: The processor 92 determines that $B_c^{DL}=W_{DAI}^{UL}+M_c-M_d$, where $M_c$ is the number of elements of the downlink association set of the subframe n of the serving cell c, and $M_d$ is the number of elements of the downlink association set of the subframe n of the serving cell d.

The transmitter 93 is configured to transmit the PUSCH in the subframe n.

Specifically, in the subframe n, the transmitter 93 carries the HARQ-ACK information on the PUSCH, and transmits the PUSCH to a base station.

Figure 10:
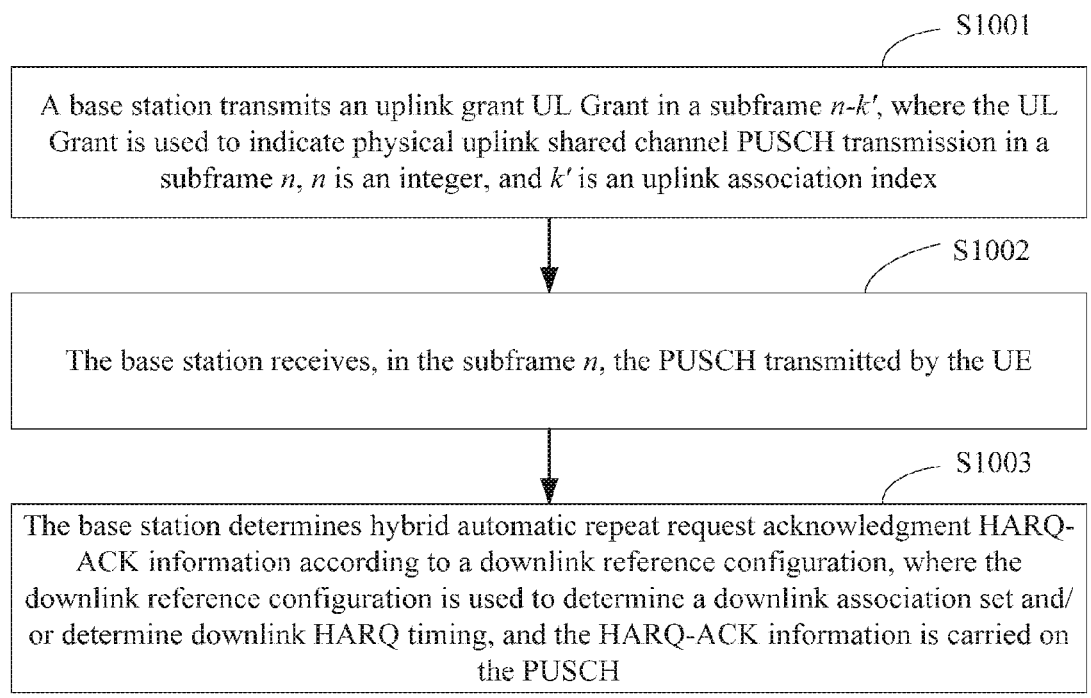
FIG. 10 is a schematic flowchart illustrating a second embodiment of a control information feedback method according to the present invention.

Referring to FIG. 10 with reference to the foregoing UE embodiments, FIG. 10 is a schematic flowchart illustrating a second embodiment of a control information feedback method according to the present invention. It should be noted that, this embodiment mainly describes an implementation process from the perspective of a base station. The control information feedback method according to this embodiment includes but is not limited to the following steps:

Step S1001: The base station transmits an uplink grant UL Grant in a subframe n–k', where the UL Grant is used to indicate physical uplink shared channel PUSCH transmission in a subframe n, n is an integer, and k' is an uplink association index.

Step S1002: The base station receives, in the subframe n, the PUSCH transmitted by a user equipment UE.

Step S1003: The base station determines hybrid automatic repeat request acknowledgment HARQ-ACK information according to a downlink reference configuration, where the downlink reference configuration is used to determine a downlink association set and/or determine downlink HARQ timing, and the HARQ-ACK information is carried on the PUSCH. In this embodiment, the UE determines the downlink association set according to the downlink reference configuration; the downlink reference configuration is an "uplink-downlink configuration" that is referenced by the UE when determining the downlink association set. In this embodiment, the UE determines downlink HARQ timing according to the downlink reference configuration; the downlink reference configuration is an "uplink-downlink configuration" that is referenced by the UE when determining the downlink HARQ timing. The HARQ timing refers to a sequence between a time for transmitting a PDSCH/downlink SPS release signaling and a time for transmitting the HARQ-ACK information.

It should be noted that, in this embodiment, the downlink association set $\{k_0, k_1, \ldots, k_{M_c-1}\}$ or an HARQ-ACK bundling subframe set $\{n-k_0, n-k_1, \ldots, n-k_{M_c-1}\}$ or both are preferably used to determine the HARQ-ACK information. Apparently, if the UL Grant is transmitted in the last subframe of the HARQ-ACK bundling subframe set, the HARQ-ACK information may also be determined according to a DAI in the UL Grant, which is not described in detail in this embodiment.

When the HARQ-ACK information indicates that a particular downlink data or all downlink data in the HARQ-ACK bundling subframe set $\{n-k_0, n-k_1, n-k_{M_c-1}\}$ is an ACK, the base station determines that the UE has correctly received this particular downlink data or all the downlink data in the set. When the HARQ-ACK information indicates that a particular downlink data or all the downlink data in the HARQ-ACK bundling subframe set $\{n-k_0, n-k_1, \ldots, n-k_{M_c-1}\}$ is an NACK, the base station determines that the UE has incorrectly received or has not received this particular downlink data or all the downlink data in the set; further, the base station retransmits this particular downlink data or all the downlink data in the set.

It can be easily understood that, in this embodiment, a downlink reference configuration is used to determine a downlink association set and the like, so that HARQ-ACK information is jointly determined according to the downlink association set and the like. This is different from the prior art in which a UE must determine, when receiving a UL Grant, the HARQ-ACK information according to a value (the total number of PDSCHs and downlink SPS release signaling) indicated by a DAI carried by the UL Grant. The base station according to this embodiment effectively avoids the following technical problem: when the UL Grant is transmitted prior to the last subframe in an HARQ-ACK bundling subframe set, for example, in a scenario in which an uplink-downlink configuration is dynamically configured, the DAI carried by the UL Grant may not indicate the total number of PDSCHs and downlink SPS release signaling that are transmitted in the HARQ-ACK bundling subframe set, thereby causing the UE to feedback incorrect HARQ-ACK information. In addition, the base station according to this embodiment avoids another problem: when an uplink reference configuration is the uplink-downlink configuration 0, the UL Grant does not include a 2-bit DAI; therefore, the UL Grant cannot indicate the total number of PDSCHs and downlink SPS release signaling that are transmitted in the HARQ-ACK bundling subframe set. In this embodiment, the HARQ-ACK information may be determined by selecting and applying different conditions according to different situations, which provides more options in determining the HARQ-ACK information, and can effectively prevent a feedback error.

With reference to different specific embodiments, the following provides a description of determining HARQ-ACK information according to different conditions.

Figure 11:
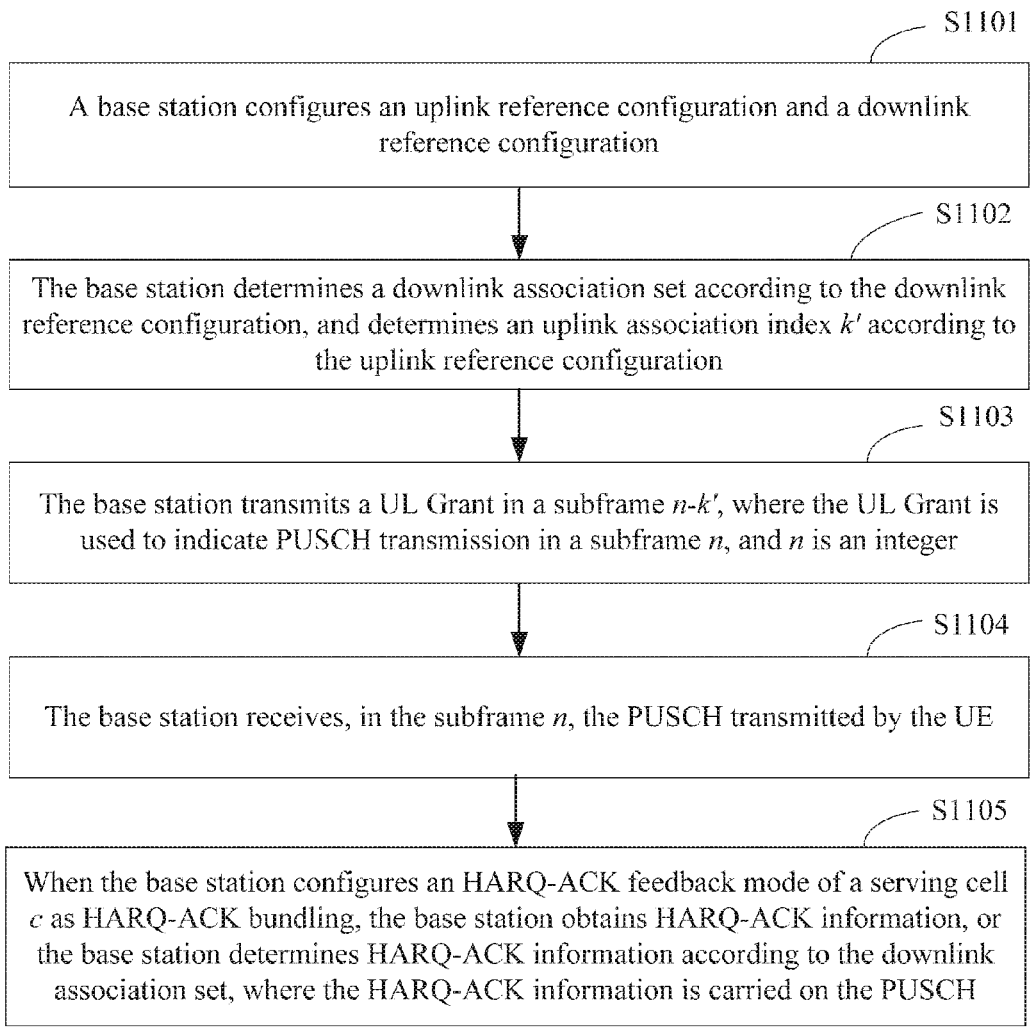
FIG. 11 is a schematic flowchart illustrating a fifth specific embodiment of a control information feedback method according to the present invention.

Referring to FIG. 11, FIG. 11 is a schematic flowchart illustrating a fifth specific embodiment of a control information feedback method according to the present invention. The control information feedback method according to this embodiment includes but is not limited to the following steps:

Step S1101: A base station configures an uplink reference configuration and a downlink reference configuration.

When the base station configures only one serving cell c for the UE, the step in which "a base station configures an uplink reference configuration and a downlink reference configuration" is specifically that "the base station configures the uplink reference configuration and the downlink reference configuration of the serving cell c". When the base station configures multiple serving cells for the UE, the base station needs to configure uplink reference configurations and downlink reference configurations of the multiple serving cells. For example, the base station configures the serving cell c and a serving cell d for the UE; accordingly, the base station further needs to configure an uplink reference configuration and a downlink reference configuration of the serving cell d, in addition to the uplink reference configuration and the downlink reference configuration of the serving cell c.

After configuring the uplink reference configuration and the downlink reference configuration of the serving cell c, the base station may transmit higher-layer signaling to the UE, where the higher-layer signaling indicates the uplink reference configuration and the downlink reference configuration of the serving cell c.

As mentioned above, the downlink reference configuration may be among the 7 uplink-downlink configurations defined in Table 3. Preferably, the downlink reference configuration is a configuration with a large number of downlink subframes, for example, the uplink-downlink configuration 5 or the uplink-downlink configuration 2. Likewise, the uplink reference configuration may be among the 7 uplink-downlink configurations defined in Table 3, that is, the uplink-downlink configurations 0 to 6. Preferably, the uplink reference configuration is a configuration with a large number of uplink subframes, for example, the uplink-downlink configuration 0 or the uplink-downlink configuration 1.

It should be noted that, in an application scenario of a dynamic TDD uplink-downlink configuration, preferably, the base station configures the uplink reference configuration and the downlink reference configuration as different uplink-downlink configurations. For example, the uplink reference configuration is the uplink-downlink configuration 0 or 1, and the downlink reference configuration is the uplink-downlink configuration 5 or 2. When the uplink reference configuration is the uplink-downlink configuration 0, a UL Grant includes no DAI.

Step S1102: The base station determines a downlink association set $\{k_0, k_1, \ldots, k_{M_c-1}\}$ according to the downlink reference configuration, and determines an uplink association index k' according to the uplink reference configuration.

The downlink association set $\{k_0, k_1, \ldots, k_{M_c-1}\}$ is a downlink association set of a subframe n of the serving cell c. Specifically, the base station determines the downlink association set $\{k_0, k_1, \ldots, k_{M_c-1}\}$ of the serving cell c according to the downlink reference configuration of the serving cell c. It should be noted that, when the base station configures multiple serving cells for the UE, the base station needs to determine downlink association sets of the multiple serving cells according to downlink reference configurations of the multiple serving cells. For example, the base station configures the serving cell c and the serving cell d for the UE; accordingly, the base station needs to determine a downlink association set of the serving cell d according to a downlink reference configuration of the serving cell d, in addition to determining a downlink association set of the serving cell c according to the downlink reference configuration of the serving cell c.

Specifically, the base station determines the downlink association set $\{k_0, k_1, \ldots, k_{M_c-1}\}$ or then HARQ-ACK bundling subframe set $\{n-k_0, n-k_1, \ldots, n-k_{M_c-1}\}$ of the subframe n according to the downlink reference configuration. In other words, the base station determines downlink HARQ timing according to the downlink reference configuration. The base station determines the uplink association index k' according to the uplink reference configuration. In other words, the base station determines uplink scheduling timing according to the uplink reference configuration.

Step S1103: The base station transmits a UL Grant in a subframe n-k', where the UL Grant is used to indicate PUSCH transmission in a subframe n, and n is an integer.

The base station transmits downlink data to the UE in a subframe n-k, where the downlink data includes a PDSCH or downlink SPS release signaling, where k∈$\{k_0, k_1, \ldots, k_{M_c-1}\}$, and the downlink association set $\{k_0, k_1, \ldots, k_{M_c-1}\}$ includes $M_c$ elements. Or, in other words, the base station transmits downlink data of the serving cell c in a subframe in the set $\{n-k_0, n-k_1, \ldots, n-k_{M_c-1}\}$, where the downlink data includes the PDSCH or the downlink SPS release signaling.

Step S1104: The base station receives, in the subframe n, the PUSCH transmitted by the UE.

The base station receives the PUSCH in the subframe n, where the PUSCH carries HARQ-ACK information.

Step S1105 may be step S1105 (solution O) or step S1105" (solution P).

Step S1105 (solution O): When the base station configures an HARQ-ACK feedback mode of the serving cell c as HARQ-ACK bundling, obtaining the HARQ-ACK information by the base station specifically includes the following substeps:

Substep Q1: The base station performs blind detection on a scrambling sequence, and determines $N_{bundled}$ according to an index of the scrambling sequence, where the scrambling sequence is used to scramble the HARQ-ACK information on which encoding is performed.

The base station performs blind detection on the scrambling sequence, and obtains the index i of the scrambling sequence; and then determines $N_{bundled}$ according to a formula i=$(N_{bundled}-1)$mod 4. When $N_{bundled}$ is not equal to the total number of PDSCHs and downlink SPS release signaling that are transmitted in the HARQ-ACK bundling subframe set $\{n-k_0, n-k_1, \ldots, n-k_{M_c-1}\}$ by the base station, the base station determines that the UE has a PDSCH and/or downlink SPS release signaling loss in the set, and needs to retransmit all PDSCHs and downlink SPS release signaling in the set.

Substep Q2: The base station obtains the HARQ-ACK information.

The base station performs descrambling by using the scrambling sequence and performs decoding, so as to obtain the HARQ-ACK information carried on the PUSCH, where the HARQ-ACK information is 1 or 2 bits. When at least one bit of the 1 or 2 bits indicates an NACK, the base station needs to retransmit all downlink data corresponding to the NACK.

Alternatively, step S1105" (solution P): The base station determines the HARQ-ACK information according to the downlink association set $\{k_0, k_1, \ldots k_{M_c-1}\}$, where the HARQ-ACK information is carried on the PUSCH.

Before the base station determines the HARQ-ACK information, the base station further needs to configure an HARQ-ACK feedback mode for the UE. If the base station configures $N_{cell}$ serving cells for the UE, the base station may separately configure an HARQ-ACK feedback mode for each serving cell; the HARQ-ACK feedback modes configured by the base station for any two serving cells of the $N_{cell}$ serving cells may be the same or different. In addition, in an application scenario of a dynamic TDD uplink-downlink configuration, because different subframes are exposed to different types of main interference, a loss of the HARQ-ACK information may occur if HARQ-ACK bundling is used, causing performance deterioration. In view of this, in the application scenario of a dynamic TDD uplink-downlink configuration, it is allowed that the base station does not configure the HARQ-ACK bundling.

In step S1105" (solution P), if only one serving cell c is configured for the UE, step S1105" (solution P) may specifically include: the base station determines that the number of bits of the HARQ-ACK information is $M_c$ according to the number of elements of the downlink association set $\{k_0, k_1, \ldots, k_{M_c-1}\}$, where $M_c$ is the number of elements of the downlink association set $\{k_0, k_1, \ldots, k_{M_c-1}\}$. When the HARQ-ACK information which is $M_c$ bits indicates that downlink data in a subframe n-$k_i$ is an ACK, the base station determines that the UE has correctly received the downlink data in the subframe n-$k_i$; conversely, when the HARQ-ACK information which is $M_c$ bits indicates that the downlink data in the subframe n-$k_i$ is an NACK, the base station determines that the UE has incorrectly received the downlink data in the subframe n-$k_i$, and further, the base station retransmits the downlink data in the subframe n-$k_i$, where $k_i$∈$\{k_0, k_1, \ldots, k_{M_c-1}\}$.

In step S1105" (solution P), if only one serving cell c is configured for the UE, the solution P may specifically include: the base station determines the HARQ-ACK bundling subframe set $\{n-k_0, n-k_1, \ldots, n-k_{M_c-1}\}$ according to the downlink association set $\{k_0, k_1, \ldots, k_{M_c-1}\}$, and determines whether the HARQ-ACK bundling subframe set $\{n-k_0, n-k_1, \ldots, n-k_{M_c-1}\}$ includes a downlink special mini-subframe; when the HARQ-ACK bundling subframe set $\{n-k_0, n-k_1, \ldots, n-k_{M_c-1}\}$ includes no downlink special mini-subframe, the base station determines that the number of bits of the HARQ-ACK information is $M_c$; or when the HARQ-ACK bundling subframe set $\{n-k_0, n-k_1, \ldots, n-k_{M_c-1}\}$ includes a downlink special mini-subframe, the base station determines that the number of bits of the HARQ-ACK information is $M_c-1$, where $M_c$ is the number of elements of the downlink association set $\{k_0, k_1, \ldots, k_{M_c-1}\}$. When the HARQ-ACK information which is $M_c$ or $M_c-1$ bits indicates that downlink data in a subframe $n-k_i$ is an ACK, the base station determines that the UE has correctly received the downlink data in the subframe $n-k_i$; conversely, when the HARQ-ACK information which is $M_c$ or $M_c-1$ bits indicates that the downlink data in the subframe $n-k_i$ is an NACK, the base station determines that the UE has incorrectly received the downlink data in the subframe $n-k_i$, and further, the base station retransmits the downlink data in the subframe $n-k_i$, where $k_i \in \{k_0, k_1, \ldots, k_{M_c-1}\}$.

In step S1105" (solution P), if only one serving cell c is configured for the UE, the solution P may specifically include: the base station determines the HARQ-ACK bundling subframe set $\{n-k_0, n-k_1, \ldots, n-k_{M_c-1}\}$ according to the downlink association set $\{k_0, k_1, \ldots, k_{M_c-1}\}$; the base station determines, according to uplink-downlink configuration information, the number $N_c^{DL}$ of downlink subframes included in the HARQ-ACK bundling subframe set $\{n-k_0, n-k_1, \ldots, n-k_{M_c-1}\}$, where $N_c^{DL} \geq 0$, and the uplink-downlink configuration information is information carried on a physical layer channel; and the base station determines, according to the number $N_c^{DL}$ of downlink subframes, that the number of bits of the HARQ-ACK information is $N_c^{DL}$. Preferably, the physical layer channel is a PDCCH/ePDCCH. When $N_c^{DL}=0$, the base station does not need to detect the HARQ-ACK information of the serving cell c in the subframe n. When the HARQ-ACK information which is $N_c^{DL}$ bits indicates that downlink data in a subframe $n-k_i$ is an ACK, the base station determines that the UE has correctly received the downlink data in the subframe $n-k_i$; conversely, when the HARQ-ACK information which is $N_c^{DL}$ bits indicates that the downlink data in the subframe $n-k_i$ is an NACK, the base station determines that the UE has incorrectly received the downlink data, and further, the base station retransmits the downlink data in the subframe $n-k_i$, where the subframe $n-k_i$ is one subframe among the $N_c^{DL}$ downlink subframes.

In step S1105" (solution P), if only one serving cell c is configured for the UE, the solution P may specifically include: the base station determines the HARQ-ACK bundling subframe set $\{n-k_0, n-k_1, \ldots, n-k_{M_c-1}\}$ according to the downlink association set $\{k_0, k_1, \ldots, k_{M_c-1}\}$; the base station determines, according to uplink-downlink configuration information, the number $N_c^{DL}$ of downlink subframes included in the HARQ-ACK bundling subframe set $\{n-k_0, n-k_1, \ldots, n-k_{M_c-1}\}$, and determines whether the HARQ-ACK bundling subframe set $\{n-k_0, n-k_1, \ldots, n-k_{M_c-1}\}$ includes a downlink special mini-subframe, where $N_c^{DL} \geq 0$, and the uplink-downlink configuration information is information carried on a physical layer channel; when the HARQ-ACK bundling subframe set $\{n-k_0, n-k_1, \ldots, n-k_{M_c-1}\}$ includes no downlink special mini-subframe, the base station determines, according to the number $N_c^{DL}$ of downlink subframes, that the number of bits of the HARQ-ACK information is $N_c^{DL}$; or when the HARQ-ACK bundling subframe set $\{n-k_0, n-k_1, \ldots, n-k_{M_c-1}\}$ includes a downlink special mini-subframe, the base station determines, according to the number $N_c^{DL}$ of downlink subframes, that the number of bits of the HARQ-ACK information is $N_c^{DL}-1$. When $N_c^{DL}=0$, the base station does not need to detect the HARQ-ACK information of the serving cell c in the subframe n. When the HARQ-ACK information which is $N_c^{DL}$ or $N_c^{DL}-1$ bits indicates that downlink data in a subframe $n-k_i$ is an ACK, the base station determines that the UE has correctly received the downlink data in the subframe $n-k_i$; conversely, when the HARQ-ACK information which is $N_c^{DL}$ or $N_c^{DL}-1$ bits indicates that the downlink data in the subframe $n-k_i$ is an NACK, the base station determines that the UE has incorrectly received the downlink data, and further, the base station retransmits the downlink data in the subframe $n-k_i$, where the subframe $n-k_i$ is one subframe among the $N_c^{DL}$ downlink subframes (or one subframe, except the downlink special mini-subframe, among the $N_c^{DL}$ downlink subframes).

If the base station configures only one serving cell for the UE, and configures the HARQ-ACK feedback mode of the UE in the serving cell c as HARQ-ACK bundling or HARQ-ACK multiplexing, the UE may execute the foregoing solution.

In step S1105" (solution P), if $N_{cell}$ serving cells are configured for the UE, where $N_{cell}>0$, and the $N_{cell}$ serving cells include the serving cell c, the solution P may specifically include: the base station determines, according to the downlink association set $\{k_0, k_1, \ldots, k_{M_c-1}\}$, the number $B_c^{DL}$ of downlink subframes for which the HARQ-ACK information needs to be fed back on the serving cell c, and determines a transmission mode of the serving cell c. When the transmission mode of the serving cell c supports one transport block or uses spatial HARQ-ACK bundling, the base station determines that the number of bits of the HARQ-ACK information of the serving cell c is $B_c^{DL}$; or when the transmission mode of the serving cell c supports two transport blocks and does not use spatial HARQ-ACK bundling, the base station determines that the number of bits of the HARQ-ACK information of the serving cell c is $2B_c^{DL}$. In addition, when the base station transmits no PDSCH or downlink SPS release signaling in any subframe in the HARQ-ACK bundling subframe set $\{n-k_0, n-k_1, \ldots, n-k_{M_c-1}\}$, the base station does not need to detect the HARQ-ACK information of the serving cell c in the subframe n. When the HARQ-ACK information which is $B_c^{DL}$ or $2B_c^{DL}$ bits indicates that downlink data in a subframe $n-k_i$ or downlink data corresponding to a codeword in the subframe $n-k_i$ is an ACK, the base station determines that the UE has correctly received the downlink data; conversely, when the HARQ-ACK information which is $B_c^{DL}$ or $2B_c^{DL}$ bits indicates that the downlink data in the subframe $n-k_i$ or the downlink data corresponding to a codeword in the subframe $n-k_i$ is an NACK, the base station determines that the UE has incorrectly received the downlink data, and further, the base station retransmits the downlink data, where the subframe $n-k_i$ is one subframe among the $B_c^{DL}$ downlink subframes.

Further, during a process in which the base station determines, according to the downlink association set $\{k_0, k_1, \ldots, k_{M_c-1}\}$, the number $B_c^{DL}$ of downlink subframes for which the HARQ-ACK information needs to be fed back on the serving cell c, the base station determines that $B_c^{DL}$ equals $M_c$, or the following may be further specifically included: the base station determines the HARQ-ACK bundling subframe set $\{n-k_0, n-k_1, \ldots, n-k_{M_c-1}\}$ according to the downlink association set $\{k_0, k_1, \ldots, k_{M_c-1}\}$, and determines whether the HARQ-ACK bundling subframe set $\{n-k_0, n-k_1, \ldots, n-k_{M_c-1}\}$ includes a downlink special mini-subframe; when the HARQ-ACK bundling subframe set $\{n-k_0, n-k_1, \ldots, n-k_{M_c-1}\}$ includes no downlink special mini-subframe, the base station determines that $B_c^{DL}$ equals $M_c$; or when the HARQ-ACK bundling subframe set $\{n-k_0, n-k_1, \ldots, n-k_{M_c-1}\}$ includes a downlink special mini-subframe, the base station determines that $B_c^{DL}$ equals $M_c-1$, where $M_c$ is the number of elements of the downlink association set $\{k_0, k_1, \ldots, k_{M_c-1}\}$.

In step S1105" (solution P), if $N_{cell}$ serving cells are configured for the UE, where $N_{cell}>0$, and the $N_{cell}$ serving cells include the serving cell c, the solution P may specifically include: the base station determines the HARQ-ACK bundling subframe set $\{n-k_0, n-k_1, \ldots, n-k_{M_c-1}\}$ according to the downlink association set $\{k_0, k_1, \ldots, k_{M_c-1}\}$; the base station determines, according to uplink-downlink configuration information, the number $N_c^{DL}$ of downlink subframes included in the HARQ-ACK bundling subframe set $\{n-k_0, n-k_1, \ldots, n-k_{M_c-1}\}$, where $N_c^{DL} \geq 0$, and the uplink-downlink configuration information is information carried on a physical layer channel; the base station determines, according to $N_c^{DL}$, the number $B_c^{DL}$ of downlink subframes for which the HARQ-ACK information needs to be fed back on the serving cell c, and determines a transmission mode of the serving cell c; and when $B_c^{DL}=0$, the base station determines that the number of bits of the HARQ-ACK information of the serving cell c is 0; when $B_c^{DL}>0$ and the transmission mode of the serving cell c supports one transport block or uses spatial HARQ-ACK bundling, the base station determines that the number of bits of the HARQ-ACK information of the serving cell c is $B_c^{DL}$; or when $B_c^{DL}>0$ and the transmission mode of the serving cell c supports two transport blocks and does not use spatial HARQ-ACK bundling, the base station determines that the number of bits of the HARQ-ACK information of the serving cell c is $2B_c^{DL}$. When the HARQ-ACK information which is $B_c^{DL}$ or $2B_c^{DL}$ bits indicates that downlink data in a subframe $n-k_i$ or downlink data corresponding to a codeword in the subframe $n-k_i$ is an ACK, the base station determines that the UE has correctly received the downlink data; conversely, when the HARQ-ACK information which is $B_c^{DL}$ or $2B_c^{DL}$ bits indicates that the downlink data in the subframe $n-k_i$ or the downlink data corresponding to a codeword in the subframe $n-k_i$ is an NACK, the base station determines that the UE has incorrectly received the downlink data, and further, the base station retransmits the downlink data, where the subframe $n-k_i$ is one subframe among the downlink subframes.

Specifically, during a process in which the base station determines, according to $N_c^{DL}$, the number $B_c^{DL}$ of downlink subframes for which the HARQ-ACK information needs to be fed back on the serving cell c, when $N_c^{DL}=0$, the base station determines that $B_c^{DL}$ equals 0; when the $N_c^{DL}$ downlink subframes include no downlink special mini-subframe, the base station determines $B_c^{DL}$ equals $N_c^{DL}$; or when the $N_c^{DL}$ downlink subframes include a downlink special mini-subframe, the base station determines that $B_c^{DL}=N_c^{DL}-1$.

If the base station configures $N_{cell}$ serving cells for the UE, and configures an HARQ-ACK feedback mode of the UE on the serving cell c as PUCCH format 3, the UE may execute the foregoing solution.

In step S1105" (solution P), the process in which the base station determines the HARQ-ACK information according to the downlink association set $\{k_0, k_1, \ldots, k_{M_c-1}\}$ may specifically include the following:

Substep P1: The base station determines the HARQ-ACK bundling subframe set $\{n-k_0, n-k_1, \ldots, n-k_{M_c-1}\}$ according to the downlink association set $\{k_0, k_1, \ldots, k_{M_c-1}\}$.

Substep P2: The base station determines a first subframe set and a second subframe set according to the subframe n-k' and the HARQ-ACK bundling subframe set $\{n-k_0, n-k_1, \ldots, n-k_{M_c-1}\}$, where the HARQ-ACK bundling subframe set $\{n-k_0, n-k_1, \ldots, n-k_{M_c-1}\}$ includes the first subframe set and the second subframe set, the last subframe in the first subframe set is the subframe n-k' or a subframe prior to the subframe n-k' (that is, no subframe in the first subframe set is later than the subframe n-k'), and the first subframe in the second subframe set is a subframe after the subframe n-k' (that is, all subframes in the second subframe set are later than the subframe n-k').

Substep P3: When the base station configures the HARQ-ACK feedback mode of the serving cell c as HARQ-ACK bundling, the base station determines that the first HARQ-ACK information is 1 or 2 bits; and when at least one bit of the first HARQ-ACK information indicates an NACK, the base station retransmits downlink data corresponding to at least one codeword in the first subframe set.

Alternatively, substep P3: The base station determines first HARQ-ACK information according to downlink control information DAI in the UL Grant, where the first HARQ-ACK information corresponds to the first subframe set.

Substep P3 may be further specifically that: the base station determines that the number of bits of the first HARQ-ACK information is $V_{DAI}^{UL,1}$, where $V_{DAI}^{UL,1}$ is a value indicated by the DAI in the UL Grant. Preferably, the base station configures the HARQ-ACK feedback mode of the UE on the serving cell c as HARQ-ACK multiplexing or HARQ-ACK bundling. When the first HARQ-ACK information which is $V_{DAI}^{UL,1}$ bits indicates that downlink data in a subframe $n-k_i$ is an ACK, the base station determines that the UE has correctly received the downlink data; conversely, when the first HARQ-ACK information which is $V_{DAI}^{UL,1}$ bits indicates that the downlink data in the subframe $n-k_i$ is an NACK, the base station determines that the UE has incorrectly received the downlink data, and further, the base station retransmits the downlink data, where the subframe $n-k_i$ is one subframe among the $V_{DAI}^{UL,1}$ downlink subframes.

In substep P3, if $N_{cell}$ serving cells are configured for the UE, where $N_{cell}>0$, and the $N_{cell}$ serving cells include the serving cell c, the substep P3 may specifically be: the base station determines, according to the DAI in the UL Grant, the number $B_c^{DL,1}$ of downlink subframes for which first HARQ-ACK information needs to be fed back on the serving cell c, and determines a transmission mode of the serving cell c; and when the transmission mode of the serving cell c supports one transport block or uses spatial HARQ-ACK bundling, the base station determines that the number of bits of the first HARQ-ACK information of the serving cell c is $B_c^{DL,1}$; or when the transmission mode of the serving cell c supports two transport blocks and does not use spatial HARQ-ACK bundling, the base station determines that the number of bits of the first HARQ-ACK information of the serving cell c is $2B_c^{DL,1}$. Preferably, the base station configures the HARQ-ACK feedback mode of the UE on the serving cell c as PUCCH format 3. When the first HARQ-ACK information which is $B_c^{DL,1}$ or $2B_c^{DL,1}$ bits indicates that downlink data in a subframe $n-k_i$ or downlink data corresponding to a codeword in the subframe $n-k_i$ is an ACK, the base station determines that the UE has correctly received the downlink data; conversely, when the first HARQ-ACK information which is $B_c^{DL,1}$ or $2B_c^{DL,1}$ bits indicates that the downlink data in the subframe $n-k_i$ or the downlink data corresponding to a codeword in the subframe $n-k_i$ is an NACK, the base station determines that the UE has incorrectly received the downlink data, and further, the base station retransmits the downlink data, where the subframe $n-k_i$ is one subframe among the $B_c^{DL,1}$ downlink subframes.

The process in which the base station determines $B_c^{DL,1}$ according to the DAI in the UL Grant includes the following:

Scenario 1: The $N_{cell}$ serving cells have a same downlink reference configuration, or uplink-downlink configuration information carried on a physical layer channel indicates that the $N_{cell}$ serving cells have a same uplink-downlink configuration.

When the downlink reference configuration is the uplink-downlink configuration 1, 2, 3, 4, or 6, or the uplink-downlink configuration information carried on a physical layer channel indicates the uplink-downlink configuration 1, 2, 3, 4, or 6, the base station determines that $B_c^{DL,1} = W_{DAI}^{UL,1}$; or when the downlink reference configuration is the uplink-downlink configuration 5 or the uplink-downlink configuration information carried on a physical layer channel indicates the uplink-downlink configuration 5, the base station determines that $B_c^{DL,1} = W_{DAI}^{UL,1} + 4\lfloor (U - W_{DAI}^{UL,1})/4 \rfloor$, where $W_{DAI}^{UL,1}$ is a value indicated by the DAI in the UL Grant.

Scenario 2: At least two serving cells of the $N_{cell}$ serving cells have different downlink reference configurations, or uplink-downlink configuration information carried on a physical layer channel indicates that at least two serving cells have different uplink-downlink configurations.

When none of downlink reference configurations of the $N_{cell}$ serving cells is the uplink-downlink configuration 5 or none of uplink-downlink configurations indicated by the uplink-downlink configuration information carried on a physical layer channel is the uplink-downlink configuration 5, the base station determines that $B_c^{DL,1} = \min(W_{DAI}^{UL,1}, M_c^1)$; or when a downlink reference configuration of at least one serving cell among the $N_{cell}$ serving cells is the uplink-downlink configuration 5 or the uplink-downlink configuration information carried on a physical layer channel indicates the uplink-downlink configuration 5, the base station determines that $B_c^{DL,1} = \min(W_{DAI}^{UL,1} + 4\lfloor (U - W_{DAI}^{UL,1})/4 \rfloor, M_c^1)$, where $\min(\ )$ is a function for obtaining a minimum value, $M_c^1$ is the number of subframes in the first subframe set, $W_{DAI}^{UL,1}$ is a value indicated by the DAI in the UL Grant, U is a maximum $U_i$ value of the $N_{cell}$ serving cells, $U_i$ indicates a sum of the number of DL Assignments received in the first subframe set of an $i^{th}$ serving cell and the number of PDSCHs not scheduled by using the DL Assignment, and $0 \le i < N_{cell}$.

Substep P4: The base station determines second HARQ-ACK information, where the second HARQ-ACK information corresponds to the second subframe set, and the HARQ-ACK information includes the first HARQ-ACK information and the second HARQ-ACK information.

In substep P4, when the base station configures the HARQ-ACK feedback mode of the serving cell c as HARQ-ACK bundling, the base station determines that the second HARQ-ACK information is 1 or 2 bits. When at least one bit of the 1 or 2 bits indicates an NACK, the base station needs to retransmit all downlink data corresponding to the NACK.

In substep P4, if only one serving cell c is configured for the UE, the substep P4 may specifically include: the base station determines the second HARQ-ACK information according to a value indicated by a DAI in a downlink assignment DL Assignment transmitted in the second subframe set.

In substep P4, if only one serving cell c is configured for the UE, the substep P4 may specifically include: the base station determines that the number of bits of the second HARQ-ACK information is $M_c^2$, where $M_c^2$ is the number of subframes in the second subframe set. When the second HARQ-ACK information which is $M_c^2$ bits indicates that downlink data in a subframe $n - k_i$ is an ACK, the base station determines that the UE has correctly received the downlink data in the subframe $n - k_i$; conversely, when the second HARQ-ACK information which is $M_c^2$ bits indicates that the downlink data in the subframe $n - k_i$ is an NACK, the base station determines that the UE has incorrectly received the downlink data in the subframe $n - k_i$, and further, the base station retransmits the downlink data in the subframe $n - k_i$, where the subframe $n - k_i$ is one subframe among the $M_c^2$ downlink subframes.

In substep P4, if $N_{cell}$ serving cells are configured for the UE, where $N_{cell} > 0$, and the $N_{cell}$ serving cells include the serving cell c, the substep P4 may specifically include: the base station determines the number $B_c^{DL,2}$ of downlink subframes for which the second HARQ-ACK information needs to be fed back on the serving cell c, and determines a transmission mode of the serving cell c; and when the transmission mode of the serving cell c supports one transport block or uses spatial HARQ-ACK bundling, the base station determines that the number of bits of the second HARQ-ACK information of the serving cell c is $B_c^{DL,2}$; or when the transmission mode of the serving cell c supports two transport blocks and does not use spatial HARQ-ACK bundling, the base station determines that the number of bits of the second HARQ-ACK information of the serving cell c is $2B_c^{DL,2}$. When the HARQ-ACK information which is $B_c^{DL,2}$ or $2B_c^{DL,2}$ bits indicates that downlink data in a subframe $n - k_i$ or downlink data corresponding to a codeword in the subframe $n - k_i$ is an ACK, the base station determines that the UE has correctly received the downlink data; conversely, when the HARQ-ACK information which is $B_c^{DL,2}$ or $2B_c^{DL,2}$ bits indicates that the downlink data in the subframe $n - k_i$ or the downlink data corresponding to a codeword in the subframe $n - k_i$ is an NACK, the base station determines that the UE has incorrectly received the downlink data, and further, the base station retransmits the downlink data, where the subframe $n - k_i$ is one subframe among the $B_c^{DL,2}$ downlink subframes.

When the second subframe set includes no downlink special mini-subframe, the base station determines that $B_c^{DL,2} = M_c^2$; or when the second subframe set includes a downlink special mini-subframe, the base station determines that $B_c^{DL,2} = M_c^2 - 1$, where $M_c^2$ is the number of subframes in the second subframe set.

Alternatively, the base station determines, according to uplink-downlink configuration information, the number $N_c^{DL,2}$ of downlink subframes included in the second subframe set, where the uplink-downlink configuration information is information carried on a physical layer channel; when the $N_c^{DL,2}$ downlink subframes include no downlink special mini-subframe, the base station determines that $B_c^{DL,2} = N_c^{DL,2}$; or when the $N_c^{DL,2}$ downlink subframes include a downlink special mini-subframe, the base station determines that $B_c^{DL,2} = N_c^{DL,2} - 1$.

In substep S1105" (solution P), the HARQ-ACK feedback mode of the UE is PUCCH format 1b with channel selection, and two serving cells are configured for the UE, where the two serving cells include the serving cell c and a serving cell d, and the substep S1105" (solution P) may specifically be:

the base station determines, according to the number of elements of the downlink association set $\{k_0, k_1, \ldots, k_{M_c-1}\}$, that the number of bits of the HARQ-ACK information is $M_c$.

There are two solutions for the base station to determine the number of bits of the HARQ-ACK information according to $M_c$.

(1) Solution 1

Scenario 1: When downlink reference configurations of the two serving cells are the same, an operation is performed according to the following method:

when $M_c=1$ or 2, the base station determines that the number of bits of the HARQ-ACK information is A, where A is 2, 3, or 4; or when $M_c=3$ or 4, the base station determines that the number of bits of the HARQ-ACK information is 4; where $M_c$ is the number of elements of the downlink association set $\{k_0, k_1, \ldots, k_{M_c-1}\}$.

Scenario 2: When downlink reference configurations of the two serving cells are different, an operation is performed according to the following method:

when M=1 or 2, the base station determines that the number of bits of the HARQ-ACK information is A, where A is 2, 3, or 4; or when M=3 or 4, the base station determines that the number of bits of the HARQ-ACK information is 4.

$M=\max(M_c, M_d)$, $M_d$ is the number of elements of a downlink association set of a subframe n of the serving cell d, and $M_c$ is the number of elements in a downlink association set of a subframe n of the serving cell c.

(2) Solution 2

Scenario 1: When downlink reference configurations of the two serving cells are the same, an operation is performed according to the following method:

when $N_c^{DL}=1$ or 2, the UE determines that the number of bits of the HARQ-ACK information is A, where A is 2, 3, or 4; or when $N_c^{DL}=3$ or 4, the UE determines that the number of bits of the HARQ-ACK information is 4.

Scenario 2: When downlink reference configurations of the two serving cells are different, an operation is performed according to the following method:

when $N^{DL}=1$ or 2, the UE determines that the number of bits of the HARQ-ACK information is A, where A is 2, 3, or 4; or when $N^{DL}=3$ or 4, the UE determines that the number of bits of the HARQ-ACK information is 4.

$N^{DL}=\max(N_c^{DL}, N_d^{DL})$, $N_d^{DL}$ is the number of downlink subframes in an HARQ-ACK bundling subframe set of a subframe n of the serving cell d, and $N_c^{DL}$ is the number of downlink subframes in an HARQ-ACK bundling subframe set of a subframe n of the serving cell c. The base station determines the HARQ-ACK bundling subframe set of the subframe n of the serving cell c or d according to the downlink reference configuration of the serving cell c or d. The base station determines the number of downlink subframes in the HARQ-ACK bundling subframe set of the subframe n of the serving cell c/d according to the first/second uplink-downlink configuration information, where the first uplink-downlink configuration information and the second uplink-downlink configuration information are information carried on a same physical layer channel or different physical layer channels.

It is worth noting that, in an application scenario of a dynamic TDD uplink-downlink configuration, uplink-downlink configuration information carried on a PDCCH or ePDCCH is a current uplink-downlink configuration used to indicate uplink and subframe assignment. The base station carries the uplink-downlink configuration information on the PDCCH/ePDCCH, and transmits the PDCCH/ePDCCH to the UE. The base station instructs, by using the uplink-downlink configuration information, the UE to detect the PDCCH/ePDCCH in a downlink subframe indicated by the uplink-downlink configuration information.

Figure 12:
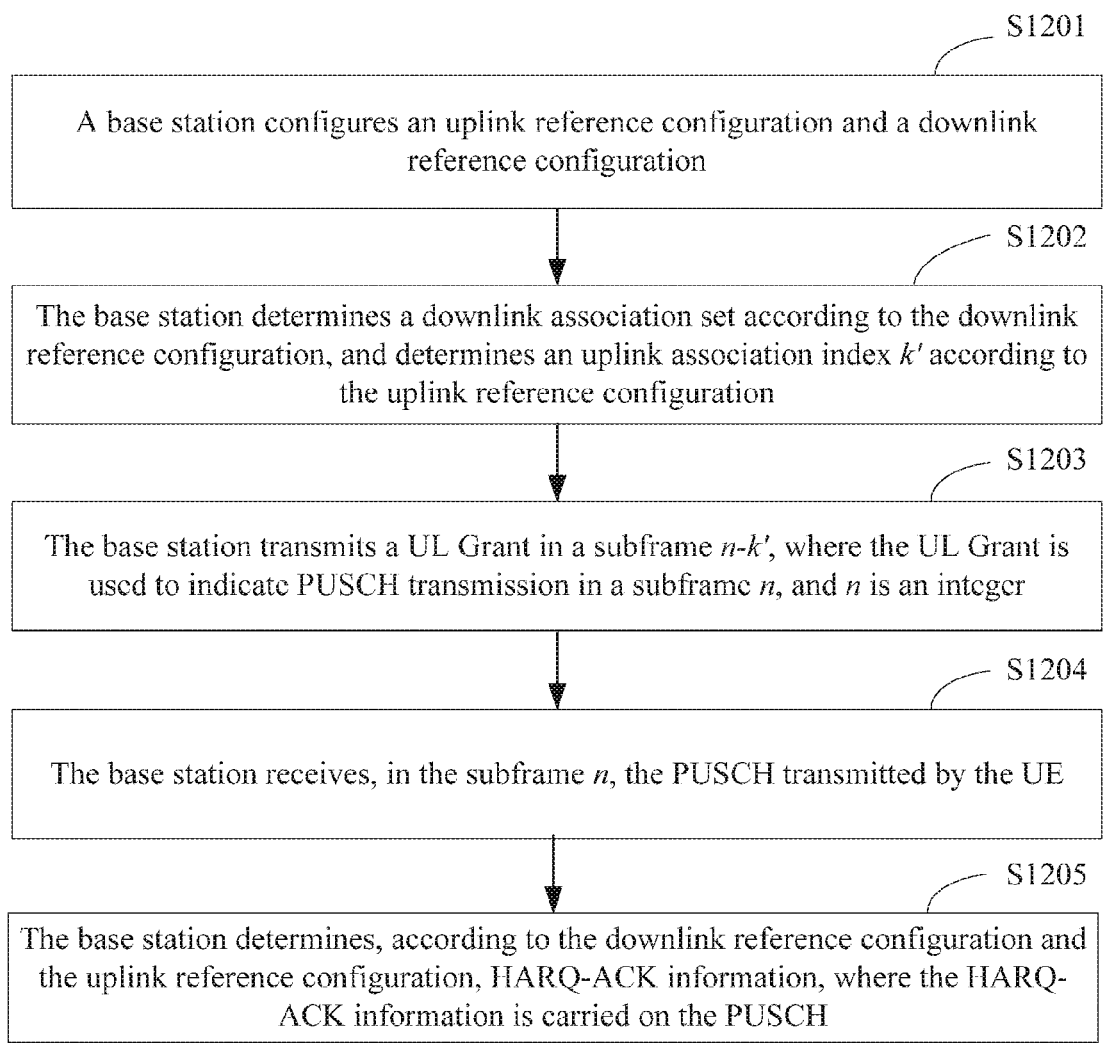
FIG. 12 is a schematic flowchart illustrating a sixth specific embodiment of a control information feedback method according to the present invention.

Referring to FIG. 12 with reference to the foregoing embodiments. FIG. 12 is a schematic flowchart illustrating a sixth specific embodiment of a control information feedback method according to the present invention. The control information feedback method according to this embodiment includes but is not limited to the following steps:

Step S1201: A base station configures an uplink reference configuration and a downlink reference configuration.

In step S1201, preferably, the uplink reference configuration is different from the downlink reference configuration. For a specific implementation principle and effect of step S1201, refer to the related description of step S1101, and details are not repeatedly described herein.

Step S1202: The base station determines a downlink association set $\{k_0, k_1, \ldots, k_{M_c-1}\}$ according to the downlink reference configuration, and determines an uplink association index k' according to the uplink reference configuration.

Likewise, for a specific implementation principle and effect of step S1202, refer to the related description of step S1102, and details are not repeatedly described herein.

Step S1203: The base station transmits a UL Grant in a subframe n−k', where the UL Grant is used to indicate PUSCH transmission in a subframe n, and n is an integer.

For a specific implementation principle and effect of step S1203 in this embodiment, refer to the related description of step S1103, and details are not repeatedly described herein.

Step S1204: The base station receives, in the subframe n, the PUSCH transmitted by the UE.

The base station receives the PUSCH in the subframe n, where the PUSCH carries HARQ-ACK information.

Step S1205: The base station determines, according to the downlink reference configuration and the uplink reference configuration, the HARQ-ACK information, where the HARQ-ACK information is carried on the PUSCH.

It should be noted that, step S1205 may specifically include the following substeps:

Substep M1: The base station determines that the uplink reference configuration is the uplink-downlink configuration 1 and the downlink reference configuration is the uplink-downlink configuration 2 or 5, or the base station determines that the uplink reference configuration is the uplink-downlink configuration 6 and the downlink reference configuration is the uplink-downlink configuration 1, 2, 3, 4, or 5. Preferably, the base station determines the uplink reference configuration as the uplink-downlink configuration 0 (in this case, the UL Grant includes no DAI).

Substep M2: The base station determines the downlink association set $\{k_0, k_1, \ldots, k_{M_c-1}\}$ of the subframe n according to the downlink reference configuration.

Substep M3: The base station determines the HARQ-ACK information according to the downlink association set $\{k_0, k_1, \ldots, k_{M_c-1}\}$.

For a specific implementation principle and effect of substep M3, refer to all the related description of the solution P in step S1105", and details are not repeatedly described herein.

Alternatively, substep M3: When the base station configures an HARQ-ACK feedback mode of the serving cell c as HARQ-ACK bundling, the base station obtains the HARQ-ACK information. For a specific implementation principle and effect, refer to all the related description of the solution O in step S1105, and details are not repeatedly described herein.

In addition, when the base station determines that the uplink reference configuration and the downlink reference configuration are not among the combinations listed in substep M1, the base station determines the HARQ-ACK information according to the DAI in the UL Grant.

Figure 13:
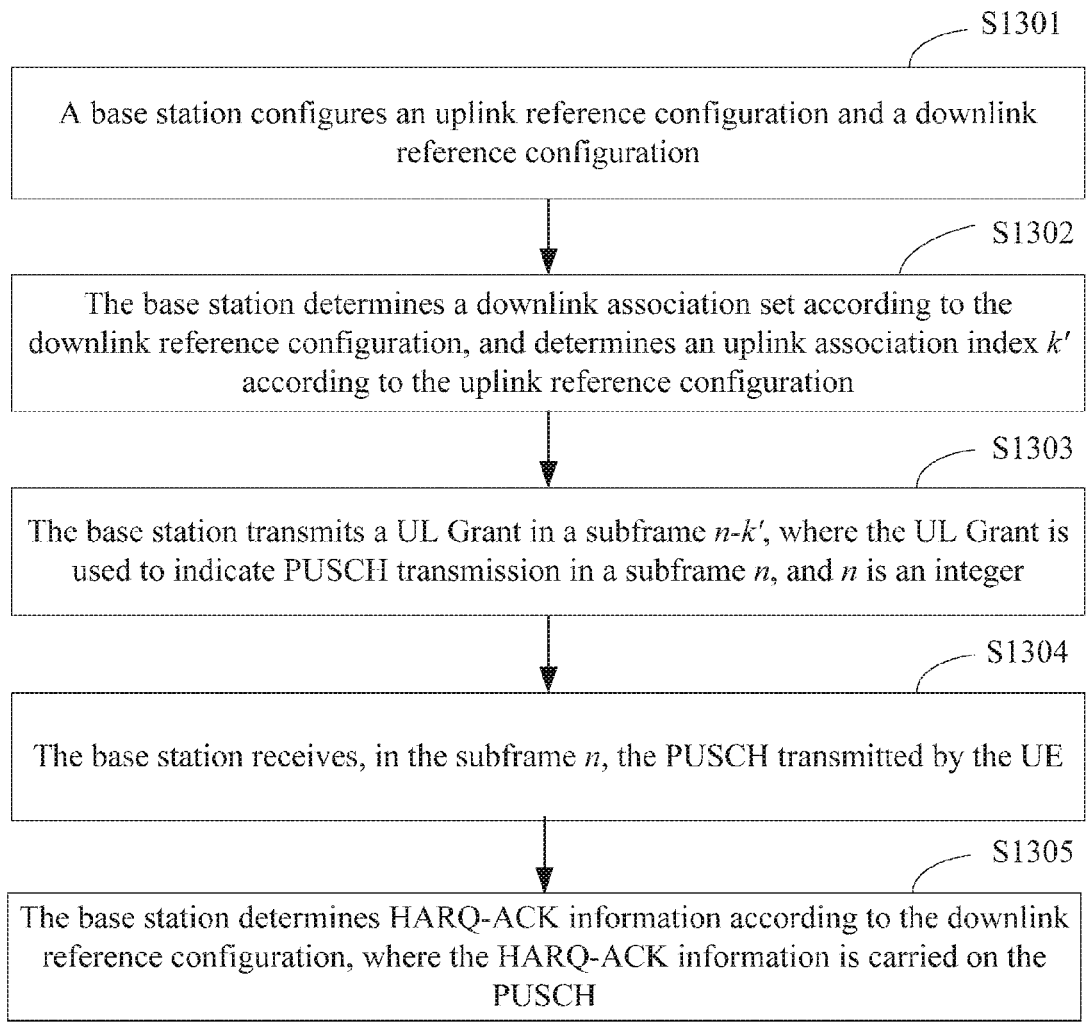
FIG. 13 is a schematic flowchart illustrating a seventh specific embodiment of a control information feedback method according to the present invention.

Referring to FIG. 13, FIG. 13 is a schematic flowchart illustrating a seventh specific embodiment of a control information feedback method according to the present invention. The control information feedback method according to this embodiment includes but is not limited to the following steps:

Step S1301: A base station configures an uplink reference configuration and a downlink reference configuration.

In step S1301, preferably, the uplink reference configuration is different from the downlink reference configuration. For a specific implementation principle and effect of step S1301, refer to the related description of step S1101, and details are not repeatedly described herein.

Step S1302: The base station determines a downlink association set $\{k_0, k_1, \ldots, k_{M_c-1}\}$ according to the downlink reference configuration, and determines an uplink association index k' according to the uplink reference configuration.

Likewise, for a specific implementation principle and effect of step S1302, refer to the related description of step S1102, and details are not repeatedly described herein.

Step S1303: The base station transmits a UL Grant in a subframe n–k', where the UL Grant is used to indicate PUSCH transmission in a subframe n, and n is an integer.

For a specific implementation principle and effect of step S1303 in this embodiment, refer to the related description of step S1103, and details are not repeatedly described herein.

Step S1304: The base station receives, in the subframe n, the PUSCH transmitted by the UE.

The base station receives the PUSCH in the subframe n, where the PUSCH carries HARQ-ACK information.

Step S1305: The base station determines HARQ-ACK information according to the downlink reference configuration, where the HARQ-ACK information is carried on the PUSCH.

A difference from the foregoing embodiments lies in that, in this embodiment, step S1305 may specifically include the following sub steps:

Substep T1: The base station determines the downlink association set $\{k_0, k_1, \ldots, k_{M_c-1}\}$ of the subframe n according to the downlink reference configuration.

Substep T2: The base station determines an HARQ-ACK bundling subframe set $\{n-k_0, n-k_1, \ldots, n-k_{M_c-1}\}$ according to the downlink association set $\{k_0, k_1, \ldots, k_{M_c-1}\}$.

Substep T3: The base station determines a timing relationship between the subframe n–k' and subframes in the HARQ-ACK bundling subframe set $\{n-k_0, n-k_1, \ldots, n-k_{M_c-1}\}$.

Substep T4: The base station determines the HARQ-ACK information according to the timing relationship.

Substep T4 includes the following two cases:

Case 1: If the timing relationship determined by the base station indicates that the subframe n–k' is the subframe $n-k_{M_c-1}$ or the subframe n–k' is a subframe after the subframe $n-k_{M_c-1}$, the base station determines the HARQ-ACK information according to a downlink assignment index DAI in the UL Grant, where the subframe $n-k_{M_c-1}$ is the last subframe in the HARQ-ACK bundling subframe set $\{n-k_0, n-k_1, \ldots, n-k_{M_c-1}\}$.

Case 2: If the timing relationship determined by the base station indicates that the subframe n–k' is a subframe prior to the subframe $n-k_{M_c-1}$, the base station determines the HARQ-ACK information according to the downlink association set $\{k_0, k_1, \ldots, k_{M_c-1}\}$. For a specific implementation principle and effect of the step in which "the base station determines the HARQ-ACK information according to the downlink association set $\{k_0, k_1, \ldots, k_{M_c-1}\}$", refer to all the related description of the solution P in step S1105", and details are not repeatedly described herein.

Alternatively, case 2: If the timing relationship determined by the base station indicates that the subframe n–k' is a subframe prior to the subframe $n-k_{M_c-1}$, and when the base station configures the HARQ-ACK feedback mode of the serving cell c as HARQ-ACK bundling, the base station obtains the HARQ-ACK information. For a specific implementation principle and effect, refer to all the related description of the solution O in step S1105, and details are not repeatedly described herein.

Figure 14:
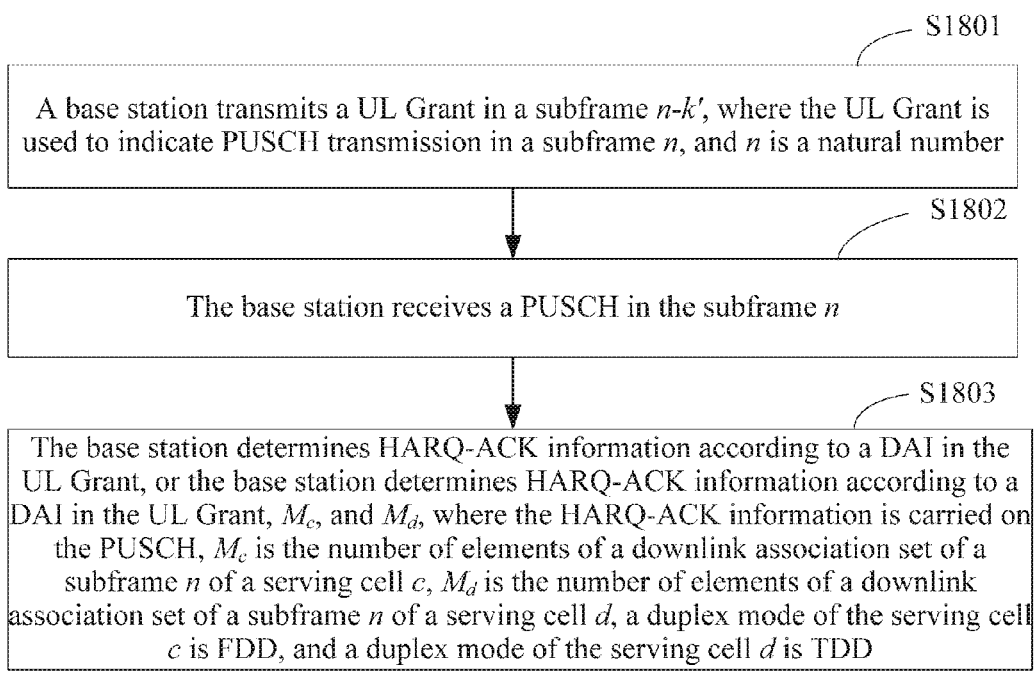
FIG. 14 is a schematic flowchart illustrating an eighth specific embodiment of a control information feedback method according to the present invention.

In addition to the foregoing embodiments of a control information feedback method on a base station side, the present invention may further include an eighth specific embodiment of a control information feedback method. It should be noted that, in a TDD-FDD CA system, a serving cell c is a secondary cell and a duplex mode of the serving cell c is FDD, and a serving cell d is a primary cell and a duplex mode of the serving cell d is TDD. When HARQ-ACK information of the serving cell c is carried on a PUSCH of the serving cell d, refer to FIG. 14. FIG. 14 is a schematic flowchart illustrating the eighth embodiment of the control information feedback method according to the present invention. A base station may determine the HARQ-ACK information according to this specific eighth embodiment.

Step S1801: The base station transmits a UL Grant in a subframe n–k', where the UL Grant is used to indicate PUSCH transmission in a subframe n, and n is a natural number.

Step S1802: The base station receives the PUSCH in the subframe n.

As mentioned above, on the UE side, the UE carries, in the subframe n, the HARQ-ACK information on the PUSCH, and transmits the PUSCH to the base station.

Step S1803: The base station determines the HARQ-ACK information according to a DAI in the UL Grant, or the base station determines the HARQ-ACK information according to a DAI in the UL Grant, $M_c$, and $M_d$, where the HARQ-ACK information is carried on the PUSCH, $M_c$ is the number of elements of a downlink association set of a subframe n of the serving cell c, $M_d$ is the number of elements of a downlink association set of a subframe n of the serving cell d, the duplex mode of the serving cell c is FDD, and the duplex mode of the serving cell d is TDD.

In this embodiment, the base station determines an uplink association index k' according to an uplink reference configuration, and determines a downlink association set according to a downlink reference configuration.

When the uplink reference configuration is the uplink-downlink configuration 1 or the uplink-downlink configuration 6, and the downlink reference configuration of the serving cell c is the uplink-downlink configuration 1 or the uplink-downlink configuration 6, the base station determines that the number of bits of the HARQ-ACK information of the serving cell c is $O_c^{ACK}$, and HARQ information bits are $o_{c,0}^{ACK} o_{c,1}^{ACK}, \ldots, o_{c,O_c^{ACK}-1}^{ACK}$. If a transmission mode of the serving cell c supports one transport block or uses spatial HARQ-ACK bundling, the base station determines that $O_c^{ACK}=B_c^{DL}$; otherwise, the base station determines that $O_c^{ACK}=2B_c^{DL}$. $B_c^{DL}$ is the number of downlink subframes for which the HARQ-ACK information needs to be fed back on the serving cell c. In this embodiment, $B_c^{DL}$ may be determined by using the following two methods:

Method 1: The base station determines that $B_c^{DL}=W_{DAI}^{UL}+1$, where $W_{DAI}^{UL}$ is a value indicated by the DAI in the UL Grant.

Method 2: The base station determines that $B_c^{DL}=W_{DAI}^{UL}+M_c-M_d$, where $M_c$ is the number of elements of the downlink association set of the subframe n of the serving cell c, and $M_d$ is the number of elements of the downlink association set of the subframe n of the serving cell d.

Figure 15:
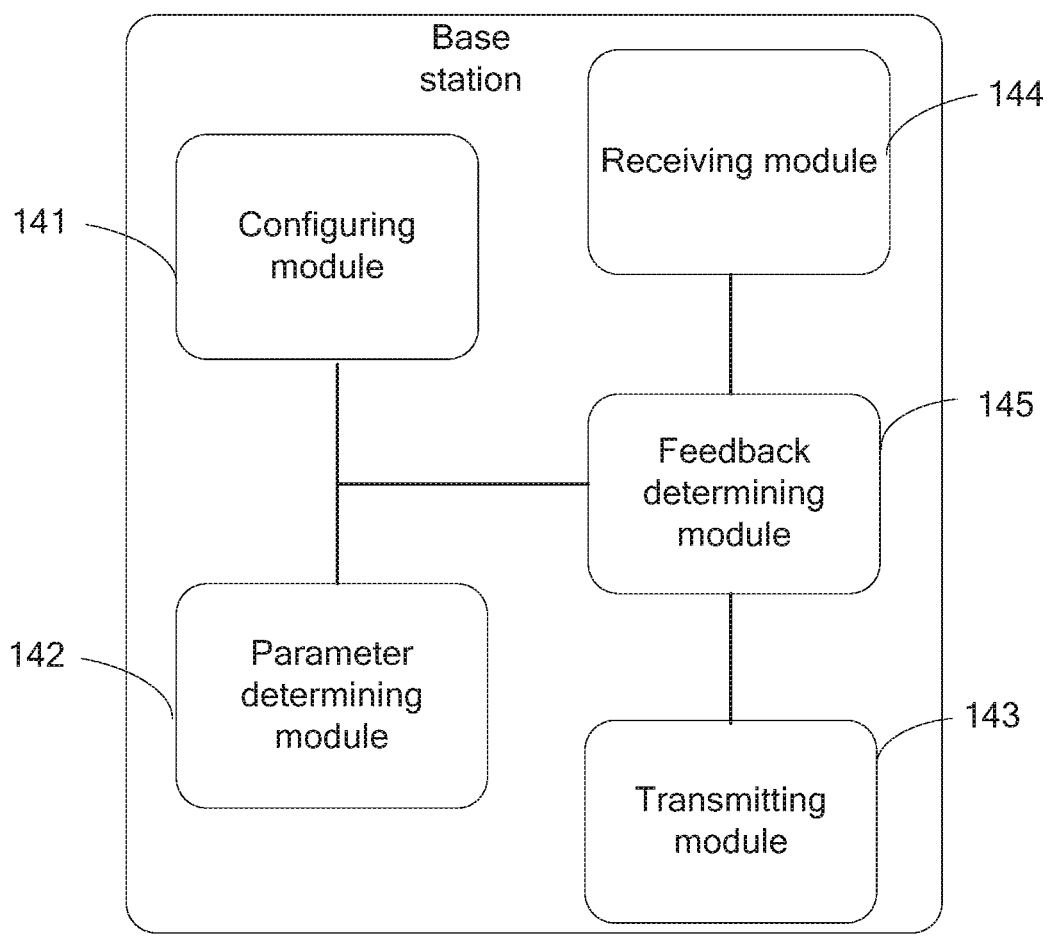
FIG. 15 is a block diagram illustrating modules of a first embodiment of a base station according to the present invention.

Referring to FIG. 15, FIG. 15 is a block diagram illustrating modules of a first embodiment of a base station according to the present invention. The base station according to this embodiment includes but is not limited to a configuring module 141, a parameter determining module 142, a transmitting module 143, a receiving module 144, and a feedback determining module 145.

The configuring module 141 is configured to configure an uplink reference configuration and a downlink reference configuration.

When the base station configures only one serving cell c for a UE, that the configuring module 141 configures an uplink reference configuration and a downlink reference configuration is specifically that "the configuring module 141 configures an uplink reference configuration and a downlink reference configuration of the serving cell c". When the base station configures multiple serving cells for the UE, the configuring module 141 needs to configure uplink reference configurations and downlink reference configurations of the multiple serving cells. For example, the base station configures the serving cell c and a serving cell d for the UE; accordingly, the configuring module 141 further needs to configure an uplink reference configuration and a downlink reference configuration of the serving cell d, in addition to the uplink reference configuration and the downlink reference configuration of the serving cell c.

After the configuring module 141 configures the uplink reference configuration and the downlink reference configuration of the serving cell c, the base station may transmit higher-layer signaling to the UE, where the higher-layer signaling indicates the uplink reference configuration and the downlink reference configuration of the serving cell c.

As mentioned above, the downlink reference configuration may be among the 7 uplink-downlink configurations defined in Table 3. Preferably, the downlink reference configuration is a configuration with a large number of downlink subframes, for example, the uplink-downlink configuration 5 or the uplink-downlink configuration 2. Likewise, the uplink reference configuration may be among the 7 uplink-downlink configurations defined in Table 3, that is, the uplink-downlink configurations 0 to 6. Preferably, the uplink reference configuration is a configuration with a large number of uplink subframes, for example, the uplink-downlink configuration 0 or the uplink-downlink configuration 1.

It should be noted that, in an application scenario of a dynamic TDD uplink-downlink configuration, preferably, the base station configures the uplink reference configuration and the downlink reference configuration as different uplink-downlink configurations. For example, the uplink reference configuration is the uplink-downlink configuration 0 or 1, and the downlink reference configuration is the uplink-downlink configuration 5 or 2. When the uplink reference configuration is the uplink-downlink configuration 0, a UL Grant includes no DAI.

The parameter determining module 142 is configured to determine an uplink association index k' according to the uplink reference configuration.

The transmitting module 143 is configured to transmit the UL Grant in a subframe n−k', where the UL Grant is used to indicate PUSCH transmission in a subframe n, and n is an integer.

The transmitting module 143 transmits downlink data to the UE in a subframe n−k, where the downlink data includes a PDSCH or downlink SPS release signaling, where k∈{$k_0$, $k_1$, . . . , $k_{M_c-1}$}, and the downlink association set {$k_0$, $k_1$, . . . , $k_{M_c-1}$} includes $M_c$ elements. Or, in other words, the transmitting module 143 transmits downlink data of the serving cell c in a subframe in the set {n−$k_0$, n−$k_1$, . . . , n−$k_{M_c-1}$}, where the downlink data includes a PDSCH or downlink SPS release signaling.

The receiving module 144 is configured to receive, in the subframe n, the PUSCH transmitted by the UE.

The receiving module 144 receives the PUSCH in the subframe n, where the PUSCH carries HARQ-ACK information.

Apparently, in another embodiment, when the base station configures an HARQ-ACK feedback mode of the serving cell c as HARQ-ACK bundling, the feedback determining module 145 is configured to determine the HARQ-ACK information, on the base station side, includes the following process:

The feedback determining module 145 performs blind detection on a scrambling sequence, and determines $N_{bundled}$ according to an index of the scrambling sequence, where the scrambling sequence is used to scramble the HARQ-ACK information on which encoding is performed.

The feedback determining module 145 performs the blind detection on the scrambling sequence, and obtains the index i of the scrambling sequence; and then determines $N_{bundled}$ according to a formula i=($N_{bundled}$−1)mod 4. When $N_{bundled}$ is not equal to the total number of PDSCHs and downlink SPS release signaling that are transmitted in the HARQ-ACK bundling subframe set {n−$k_0$, n−$k_1$, . . . , n−$k_{M_c-1}$} by the base station, the feedback determining module 145 determines that the UE has a PDSCH and/or downlink SPS release signaling loss in the set, and needs to retransmit all PDSCHs and downlink SPS release signaling in the set.

The feedback determining module 145 obtains the HARQ-ACK information.

The feedback determining module 145 performs descrambling by using the scrambling sequence and performs decoding, so as to obtain the HARQ-ACK information carried on the PUSCH, where the HARQ-ACK information is 1 or 2 bits. When at least one bit of the 1 or 2 bits indicates an NACK, the base station needs to retransmit all downlink data corresponding to the NACK.

The feedback determining module 145 is configured to determine the HARQ-ACK information according to the downlink association set {$k_0$, $k_1$, . . . , $k_{M_c-1}$}, where the HARQ-ACK information is carried on the PUSCH, and the feedback determining module 145 may determine the downlink association set {$k_0$, $k_1$, . . . , $k_{M_c-1}$} according to the downlink reference configuration and determine the HARQ-ACK bundling subframe set {n−$k_0$, n−$k_1$, . . . , n−$k_{M_c-1}$} according to the downlink association set {$k_0$, $k_1$, . . . , $k_{M_c-1}$}, where $M_c$ is a natural number greater than or equal to 1.

Before the feedback determining module 145 determines the HARQ-ACK information, the base station further needs to configure an HARQ-ACK feedback mode for the UE. If the base station configures $N_{cell}$ serving cells for the UE, the base station may separately configure an HARQ-ACK feedback mode for each serving cell; the HARQ-ACK feedback modes configured by the base station for any two serving cells of the $N_{cell}$ serving cells may be the same or different. In addition, in an application scenario of a dynamic TDD uplink-downlink configuration, because different subframes are exposed to different types of main interference, a loss of the HARQ-ACK information may occur if HARQ-ACK bundling is used, causing performance deterioration. In view of this, in the application scenario of dynamic TDD uplink-downlink configuration, it is allowed that the base station does not configure the HARQ-ACK bundling.

Figure 16:
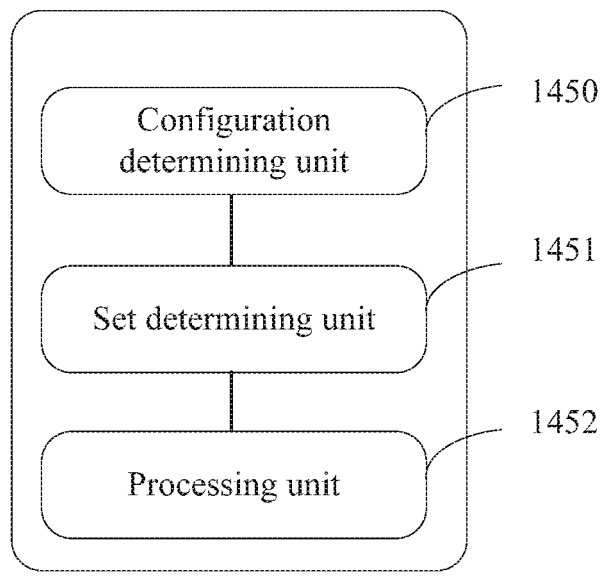
FIG. 16 is a detailed structural block diagram illustrating an embodiment of a feedback determining module shown in FIG. 15.

As shown in FIG. 16, the feedback determining module 145 may include a configuration determining unit 1450, a set determining unit 1451, and a processing unit 1452. The processing unit 1452 may determine the HARQ-ACK information according to the downlink association set $\{k_0, k_1, \ldots, k_{M_c-1}\}$.

During a process in which the processing unit 1452 determines the HARQ-ACK information according to the downlink association set $\{k_0, k_1, \ldots, k_{M_c-1}\}$, if only one serving cell c is configured for the UE, the processing unit 1452 determines, according to the number of elements of the downlink association set $\{k_0, k_1, \ldots, k_{M_c-1}\}$, that the number of bits of the HARQ-ACK information is $M_c$, where $M_c$ is the number of elements of the downlink association set $\{k_0, k_1, \ldots, k_{M_c-1}\}$. When the HARQ-ACK information which is $M_c$ bits indicates that downlink data in a subframe $n-k_i$ is an ACK, the processing unit 1452 determines that the UE has correctly received the downlink data in the subframe $n-k_i$; conversely, when the HARQ-ACK information which is $M_c$ bits indicates that the downlink data in the subframe $n-k_i$ is an NACK, the processing unit 1452 determines that the UE has incorrectly received the downlink data in the subframe $n-k_i$, and further, the base station retransmits the downlink data in the subframe $n-k_i$, where $k_i \in \{k_0, k_1, \ldots, k_{M_c-1}\}$.

If the base station configures only one serving cell for the UE, and configures the HARQ-ACK feedback mode of the UE on the serving cell c as HARQ-ACK bundling or HARQ-ACK multiplexing, the UE may execute the foregoing solution.

Specifically, during a process in which the processing unit 1452 determines, according to $N_c^{DL}$, the number $B_c^{DL}$ of downlink subframes for which the HARQ-ACK information needs to be fed back on the serving cell c, when $N_c^{DL}=0$, the processing unit 1452 determines that $B_c^{DL}$ equals 0; when the $N_c^{DL}$ downlink subframes include no downlink special mini-subframe, the processing unit 1452 determines that $B_c^{DL}$ equals $N_c^{DL}$; or when the $N_c^{DL}$ downlink subframes include a downlink special mini-subframe, the processing unit 1452 determines that $B_c^{DL}=N_c^{DL}-1$.

If the base station configures $N_{cell}$ serving cells for the UE, and configures an HARQ-ACK feedback mode of the UE on the serving cell c as PUCCH format 3, the UE may execute the foregoing solution.

The processing unit 1452 may, during a process of determining the HARQ-ACK information according to the downlink association set $\{k_0, k_1, \ldots, k_{M_c-1}\}$, specifically include a subframe determining unit, a first processing unit, and a second processing unit.

After the set determining unit 1451 determines the HARQ-ACK bundling subframe set $\{n-k_0, n-k_1, \ldots, n-k_{M_c-1}\}$ according to the downlink association set $\{k_0, k_1, \ldots, k_{M_c-1}\}$, the subframe determining unit is configured to determine a first subframe set and a second subframe set according to the subframe n-k' and the HARQ-ACK bundling subframe set $\{n-k_0, n-k_1, \ldots, n-k_{M_c-1}\}$, where the HARQ-ACK bundling subframe set $\{n-k_0, n-k_1, \ldots, n-k_{M_c-1}\}$ includes the first subframe set and the second subframe set, the last subframe in the first subframe set is the subframe n-k' or a subframe prior to the subframe n-k' (that is, no subframe in the first subframe set is later than the subframe n-k'), and the first subframe in the second subframe set is a subframe after the subframe n-k' (that is, all subframes in the second subframe set are later than the subframe n-k').

The first processing unit is configured to determine, when the base station configures the HARQ-ACK feedback mode on the serving cell c as HARQ-ACK bundling, that first HARQ-ACK information is 1 or 2 bits. When at least one bit of the first HARQ-ACK information indicates an NACK, the base station retransmits downlink data corresponding to at least one codeword in the first subframe set.

Alternatively, the first processing unit is configured to determine first HARQ-ACK information according to downlink control information DAI in the UL Grant, where the first HARQ-ACK information corresponds to the first subframe set.

The first processing unit is specifically configured to determine the number $U_{DAI,c}^1$ of downlink assignments DL Assignments transmitted in the first subframe set; the base station determines the number $N_{SPS}^1$ of physical downlink shared channels PDSCHs received in the first subframe set, where the PDSCH has no corresponding DL Assignment; the base station determines a value $V_{DAI}^{UL,1}$ indicated by the DAI in the UL Grant; and the base station determines the first HARQ-ACK information according to $U_{DAI,c}^1$, $N_{SPS}^1$, and $V_{DAI}^{UL,1}$. If it is determined that $V_{DAI}^{UL,1} \neq (U_{DAI,c}^1 + N_{SPS}^1 - 1) \bmod 4 + 1$, the base station concludes that the first HARQ-ACK information indicates a non-acknowledgment NACK.

The first processing unit is specifically configured to determine that the number of bits of the first HARQ-ACK information is $V_{DAI}^{UL,1}$, where $V_{DAI}^{UL,1}$ is a value indicated by the DAI in the UL Grant. Preferably, the base station configures the HARQ-ACK feedback mode of the UE on the serving cell c as HARQ-ACK multiplexing or HARQ-ACK bundling. When the HARQ-ACK information which is $V_{DAI}^{UL,1}$ bits indicates that downlink data in a subframe $n-k_i$ is an ACK, the first processing unit determines that the UE has correctly received the downlink data; conversely, when the HARQ-ACK information which is $V_{DAI}^{UL,1}$ bits indicates that the downlink data in the subframe $n-k_i$ is an NACK, the first processing unit determines that the UE has incorrectly received the downlink data, and further, the base station retransmits the downlink data, where the subframe $n-k_i$ is one subframe among the $V_{DAI}^{UL,1}$ downlink subframes.

If $N_{cell}$ serving cells are configured for the UE, where $N_{cell} > 0$, and the $N_{cell}$ serving cells include a serving cell c, the first processing unit is specifically configured to determine, according to the DAI in the UL Grant, the number $B_c^{DL,1}$ of downlink subframes for which the first HARQ-ACK information needs to be fed back on the serving cell c, and determine a transmission mode of the serving cell c; and when the transmission mode of the serving cell c supports one transport block or uses spatial HARQ-ACK bundling, determine that the number of bits of the first HARQ-ACK information of the serving cell c is $B_c^{DL,1}$; or when the transmission mode of the serving cell c supports two transport blocks and does not use spatial HARQ-ACK bundling, determine that the number of bits of the first HARQ-ACK information of the serving cell c is $2B_c^{DL,1}$. Preferably, the base station configures the HARQ-ACK feedback mode of the UE on the serving cell c as PUCCH format 3. When the HARQ-ACK information which is $B_c^{DL,1}$ or $2B_c^{DL,1}$ bits indicates that downlink data in a subframe $n-k_i$ or downlink data corresponding to a codeword in the subframe $n-k_i$ is an ACK, the first processing unit determines that the UE has correctly received the downlink data; conversely, when the HARQ-ACK information which is $B_c^{DL,1}$ or $2B_c^{DL,1}$ bits indicates that the downlink data in the subframe $n-k_i$ or the downlink data corresponding to a codeword in the subframe $n-k_i$ is an NACK, the first processing unit determines that the UE has incorrectly received the downlink data, and further, the base station retransmits the downlink data, where the subframe $n-k_i$ is one subframe among the $B_c^{DL,1}$ downlink subframes.

The process in which the first processing unit determines $B_c^{DL,1}$ according to the DAI in the UL Grant includes the following:

Scenario 1: The $N_{cell}$ serving cells have a same downlink reference configuration, or uplink-downlink configuration information carried on a physical layer channel indicates that the $N_{cell}$ serving cells have a same uplink-downlink configuration.

When the downlink reference configuration is the uplink-downlink configuration 1, 2, 3, 4, or 6, or the uplink-downlink configuration information carried on a physical layer channel indicates the uplink-downlink configuration 1, 2, 3, 4, or 6, the first processing unit determines that $B_c^{DL,1}=W_{DAI}^{UL,1}$; or when the downlink reference configuration is the uplink-downlink configuration 5 or the uplink-downlink configuration information carried on a physical layer channel indicates the uplink-downlink configuration 5, the first processing unit determines that $B_c^{DL,1}=W_{DAI}^{UL,1}+4\lfloor(U-W_{DAI}^{UL,1})/4\rfloor$, where $W_{DAI}^{UL,1}$ is a value indicated by the DAI in the UL Grant.

Scenario 2: At least two serving cells of the $N_{cell}$ serving cells have different downlink reference configurations, or uplink-downlink configuration information carried on a physical layer channel indicates that at least two serving cells have different uplink-downlink configurations.

When none of downlink reference configurations of the $N_{cell}$ serving cells is the uplink-downlink configuration 5 or none of uplink-downlink configurations indicated by the uplink-downlink configuration information carried on a physical layer channel is the uplink-downlink configuration 5, the first processing unit determines that $B_c^{DL,1}=\min(W_{DAI}^{UL,1}, M_c^1)$; or when a downlink reference configuration of at least one serving cell among the $N_{cell}$ serving cells is the uplink-downlink configuration 5 or the uplink-downlink configuration information carried on a physical layer channel indicates the uplink-downlink configuration 5, the first processing unit determines that $B_c^{DL,1}=\min(W_{DAI}^{UL,1}+4\lfloor(U-W_{DAI}^{UL,1})/4\rfloor, M_c^1)$, where $\min(\,)$ is a function for obtaining a minimum value, $M_c^1$ is the number of subframes in the first subframe set, $W_{DAI}^{UL,1}$ is a value indicated by the DAI in the UL Grant, U is a maximum $U_i$ value of the $N_{cell}$ serving cells, $U_i$ indicates a sum of the number of DL Assignments received in the first subframe set of an $i^{th}$ serving cell and the number of PDSCHs not scheduled by using the DL Assignment, and $0 \leq i < N_{cell}$.

The second processing unit is configured to determine second HARQ-ACK information, where the second HARQ-ACK information corresponds to the second subframe set, and the HARQ-ACK information includes the first HARQ-ACK information and the second HARQ-ACK information. When the base station configures the HARQ-ACK feedback mode of the serving cell c as HARQ-ACK bundling, the second processing unit determines that the second HARQ-ACK information is 1 or 2 bits. When at least one bit of the 1 or 2 bits indicates an NACK, the base station needs to retransmit all downlink data corresponding to the NACK.

If only one serving cell c is configured for the UE, the second processing unit may be specifically configured to determine the second HARQ-ACK information according to a value indicated by a DAI in a downlink assignment DL Assignment transmitted in the second subframe set.

If only one serving cell c is configured for the UE, the second processing unit may be specifically configured to determine that the number of bits of the second HARQ-ACK information is $M_c^2$, where $M_c^2$ is the number of subframes in the second subframe set. When the HARQ-ACK information which is $M_c^2$ bits indicates that downlink data in a subframe $n-k_i$ is an ACK, the second processing unit determines that the UE has correctly received the downlink data in the subframe $n-k_i$; conversely, when the HARQ-ACK information which is $M_c^2$ bits indicates that the downlink data in the subframe $n-k_i$ is an NACK, the second processing unit determines that the UE has incorrectly received the downlink data in the subframe $n-k_i$, and further, the base station retransmits the downlink data in the subframe $n-k_i$, where the subframe $n-k_i$ is one subframe among the $M_c^2$ downlink subframes.

If $N_{cell}$ serving cells are configured for the UE, where $N_{cell}>0$, and the $N_{cell}$ serving cells include a serving cell c, the second processing unit may be specifically configured to determine the number $B_c^{DL,2}$ of downlink subframes for which the second HARQ-ACK information needs to be fed back on the serving cell c, and determine a transmission mode of the serving cell c; and when the transmission mode of the serving cell c supports one transport block or uses spatial HARQ-ACK bundling, determine that the number of bits of the second HARQ-ACK information of the serving cell c is $B_c^{DL,2}$; or when the transmission mode of the serving cell c supports two transport blocks and does not use spatial HARQ-ACK bundling, determine that the number of bits of the second HARQ-ACK information of the serving cell c is $2B_c^{DL,2}$. When the HARQ-ACK information which is $B_c^{DL,2}$ or $2B_c^{DL,2}$ bits indicates that downlink data in a subframe $n-k_i$ or downlink data corresponding to a codeword in the subframe $n-k_i$ is an ACK, the second processing unit determines that the UE has correctly received the downlink data; conversely, when the HARQ-ACK information which is $B_c^{DL,2}$ or $2B_c^{DL,2}$ bits indicates that the downlink data in the subframe $n-k_i$ or the downlink data corresponding to a codeword in the subframe $n-k_i$ is an NACK, the second processing unit determines that the UE has incorrectly received the downlink data, and further, the base station retransmits the downlink data, where the subframe $n-k_i$ is one subframe among the $B_c^{DL,2}$ downlink subframes.

When the second subframe set includes no downlink special mini-subframe, the second processing unit determines that $B_c^{DL,2}=M_c^2$; or when the second subframe set includes a downlink special mini-subframe, the second processing unit determines that $B_c^{DL,2}=M_c^2-1$; and where $M_c^2$ is the number of subframes in the second subframe set.

Alternatively, the second processing unit determines, according to uplink-downlink configuration information, the number $N_c^{DL,2}$ of downlink subframes included in the second subframe set, where the uplink-downlink configuration information is information carried on a physical layer channel; when the $N_c^{DL,2}$ downlink subframes include no downlink special mini-subframe, the second processing unit determines that $B_c^{DL,2}=N_c^{DL,2}$; or when the $N_c^{DL,2}$ downlink subframes include a downlink special mini-subframe, the second processing unit determines that $B_c^{DL,2}=N_c^{DL,2}-1$.

It should be noted that, the HARQ-ACK feedback mode of the UE is PUCCH format 1b with channel selection, and two serving cells are configured for the UE, where the two serving cells include a serving cell c and a serving cell d, and the processing unit 1452 may be specifically configured to:

determine, according to the number of elements of the downlink association set $\{k_0, k_1, \ldots, k_{M_c-1}\}$, that the number of bits of the HARQ-ACK information is $M_c$, and determine the number of bits of the HARQ-ACK information according to $M_c$, which includes a solution 1 and a solution 2.

(1) Solution 1

Scenario 1: When downlink reference configurations of the two serving cells are the same, an operation is performed according to the following method:

when $M_c=1$ or 2, the processing unit 1452 determines that the number of bits of the HARQ-ACK information is A, where A is 2, 3, or 4; or when $M_c=3$ or 4, the processing unit 1452 determines that the number of bits of the HARQ-ACK information is 4; where $M_c$ is the number of elements of the downlink association set $\{k_0, k_1, \ldots, k_{M_c-1}\}$.

Scenario 2: When downlink reference configurations of the two serving cells are different, an operation is performed according to the following method:

when M=1 or 2, the processing unit 1452 determines that the number of bits of the HARQ-ACK information is A, where A is 2, 3, or 4; or when M=3 or 4, the processing unit 1452 determines that the number of bits of the HARQ-ACK information is 4.

$M=\max(M_c, M_d)$, $M_d$ is the number of elements of a downlink association set of a subframe n of the serving cell d, and $M_c$ is the number of elements of a downlink association set of a subframe n of the serving cell c.

(2) Solution 2

Scenario 1: When downlink reference configurations of the two serving cells are the same, an operation is performed according to the following method:

when $N_c^{DL}=1$ or 2, the UE determines that the number of bits of the HARQ-ACK information is A, where A is 2, 3, or 4; or when $N_c^{DL}=3$ or 4, the UE determines that the number of bits of the HARQ-ACK information is 4.

Scenario 2: When downlink reference configurations of the two serving cells are different, an operation is performed according to the following method:

when $N^{DL}=1$ or 2, the UE determines that the number of bits of the HARQ-ACK information is A, where A is 2, 3, or 4; or when $N^{DL}=3$ or 4, the UE determines that the number of bits of the HARQ-ACK information is 4.

$N^{DL}=\max(N_c^{DL}, N_d^{DL})$, $N_d^{DL}$ is the number of downlink subframes in an HARQ-ACK bundling subframe set of a subframe n of a serving cell d, and $N_c^{DL}$ is the number of downlink subframes in an HARQ-ACK bundling subframe set of a subframe n of the serving cell c. The processing unit 1452 determines the HARQ-ACK bundling subframe set of the subframe n of the serving cell c or d according to the downlink reference configuration of the serving cell c or d. The processing unit 1452 determines the number of downlink subframes in the HARQ-ACK bundling subframe set of the subframe n of the serving cell c/d according to the first/second uplink-downlink configuration information, where the first uplink-downlink configuration information and the second uplink-downlink configuration information are information carried on a same physical layer channel or different physical layer channels.

It is worth noting that, in an application scenario of a dynamic TDD uplink-downlink configuration, uplink-downlink configuration information carried on a PDCCH or ePDCCH is a current uplink-downlink configuration used to indicate uplink and downlink subframe assignment. The base station carries the uplink-downlink configuration information on the PDCCH/ePDCCH, and transmits the PDCCH/ePDCCH to the UE. The base station instructs, by using the uplink-downlink configuration information, the UE to detect the PDCCH/ePDCCH in a downlink subframe indicated by the uplink-downlink configuration information.

In another embodiment, the feedback determining module 145 is further configured to determine, according to the downlink reference configuration and the uplink reference configuration, the HARQ-ACK information.

Accordingly, the configuration determining unit 1450 is configured to determine that the uplink reference configuration is the uplink-downlink configuration 1 and the downlink reference configuration is the uplink-downlink configuration 2 or 5, or the configuration determining unit 1450 determines that the uplink reference configuration is the uplink-downlink configuration 6 and the downlink reference configuration is the uplink-downlink configuration 1, 2, 3, 4, or 5.

The set determining unit 1451 is configured to determine the downlink association set $\{k_0, k_1, \ldots, k_{M_c-1}\}$ of the subframe n according to the downlink reference configuration.

The processing unit 1452 is configured to determine the HARQ-ACK information according to the downlink association set $\{k_0, k_1, \ldots, k_{M_c-1}\}$. For a specific working process in which the processing unit 1452 determines the HARQ-ACK information according to the downlink association set $\{k_0, k_1, \ldots k_{M_c-1}\}$, refer to the related description provided above, which is within a scope of understanding by a person skilled in the art and is not repeatedly described. Alternatively, when the base station configures an HARQ-ACK feedback mode of the serving cell c as HARQ-ACK bundling, the processing unit 1452 obtains the HARQ-ACK information. For a specific implementation principle and effect, refer to all the related description of the foregoing embodiments, and details are not repeatedly described herein.

In addition, when the processing unit 1452 concludes that the uplink reference configuration and the downlink reference configuration are not among the combinations listed by the configuration determining unit 1450, the processing unit 1452 determines the HARQ-ACK information according to a DAI in the UL Grant.

Figure 17:
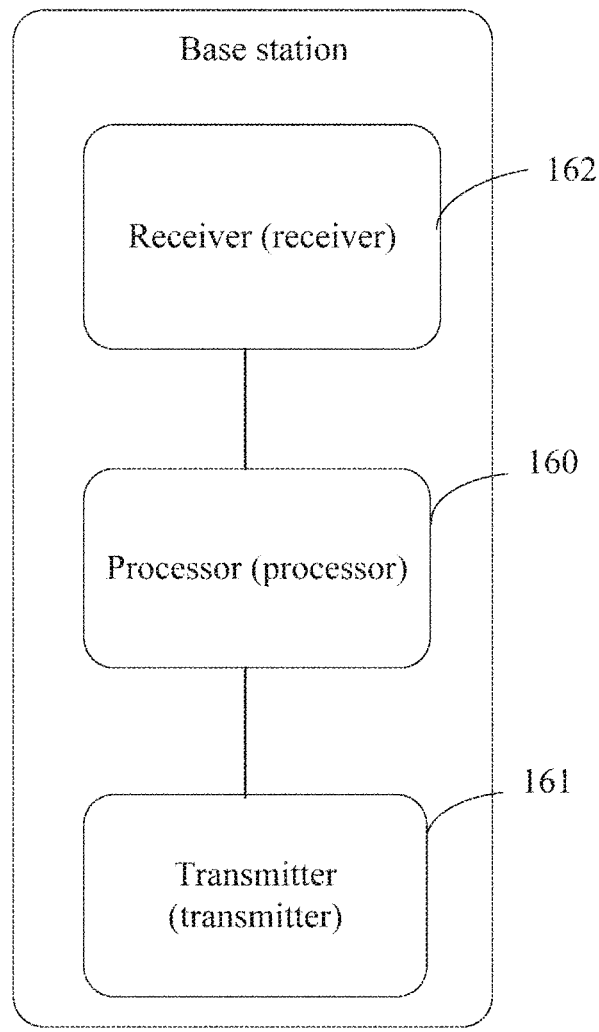
FIG. 17 is a block diagram illustrating modules of a second embodiment of a base station according to the present invention.

Referring to FIG. 17, FIG. 17 is a block diagram illustrating modules of a second embodiment of a base station according to the present invention. The base station according to this embodiment includes but is not limited to a processor 160, a transmitter 161, and a receiver 162.

The processor 160 is configured to configure an uplink reference configuration and a downlink reference configuration. When the base station configures only one serving cell c for a UE, that the processor 160 configures an uplink reference configuration and a downlink reference configuration is specifically that "the processor 160 configures an uplink reference configuration and a downlink reference configuration of the serving cell c". When the base station configures multiple serving cells for the UE, the processor 160 needs to configure uplink reference configurations and downlink reference configurations of the multiple serving cells. For example, the base station configures the serving cell c and a serving cell d for the UE; accordingly, the processor 160 further needs to configure an uplink reference configuration and a downlink reference configuration of the serving cell d, in addition to the uplink reference configuration and the downlink reference configuration of the serving cell c.

The downlink reference configuration is used to determine a downlink association set $\{k_0, k_1, \ldots, k_{M_c-1}\}$ and/or downlink HARQ timing of a subframe n. The downlink association set $\{k_0, k_1, \ldots, k_{M_c-1}\}$ is a downlink association set of a subframe n of the serving cell c. Specifically, the processor 160 determines the downlink association set $\{k_0, k_1, \ldots, k_{M_c-1}\}$ of the serving cell c according to the downlink reference configuration of the serving cell c. It should be noted that, when the base station configures multiple serving cells for the UE, the processor 160 needs to determine downlink association sets of the multiple serving cells according to downlink reference configurations of the multiple serving cells. For example, the base station configures the serving cell c and the serving cell d for the UE; accordingly, the processor 160 needs to determine a downlink association set of the serving cell d according to the downlink reference configuration of the serving cell d, in addition to determining the downlink association set of the serving cell c according to the downlink reference configuration of the serving cell c.

After the processor 160 configures the uplink reference configuration and the downlink reference configuration of the serving cell c, the base station may transmit higher-layer signaling to the UE, where the higher-layer signaling indicates the uplink reference configuration and the downlink reference configuration of the serving cell c.

As mentioned above, the downlink reference configuration may be among the 7 uplink-downlink configurations defined in Table 3. Preferably, the downlink reference configuration is a configuration with a large number of downlink subframes, for example, the uplink-downlink configuration 5 or the uplink-downlink configuration 2. Likewise, the uplink reference configuration may be among the 7 uplink-downlink configurations defined in Table 3, that is, the uplink-downlink configurations 0 to 6. Preferably, the uplink reference configuration is a configuration with a large number of uplink subframes, for example, the uplink-downlink configuration 0 or the uplink-downlink configuration 1.

It should be noted that, in an application scenario of a dynamic TDD uplink-downlink configuration, preferably, the base station configures the uplink reference configuration and the downlink reference configuration as different uplink-downlink configurations. For example, the uplink reference configuration is the uplink-downlink configuration 0 or 1, and the downlink reference configuration is the uplink-downlink configuration 5 or 2. When the uplink reference configuration is the uplink-downlink configuration 0, a UL Grant includes no DAI.

The processor 160 is further configured to determine an uplink association index k' according to the uplink reference configuration.

The transmitter 161 is configured to transmit a UL Grant in a subframe n–k', where the UL Grant is used to indicate PUSCH transmission in a subframe n, and n is an integer.

It should be noted that, the transmitter 161 transmits downlink data to the UE in a subframe n–k, where the downlink data includes a PDSCH or downlink SPS release signaling, where $k \in \{k_0, k_1, \ldots, k_{M_c-1}\}$, and the downlink association set $\{k_0, k_1, \ldots, k_{M_c-1}\}$ includes $M_c$ elements. Or, in other words, the transmitter 161 transmits downlink data of the serving cell c in a subframe in the set $\{n-k_0, n-k_1, \ldots, n-k_{M_c-1}\}$, where the downlink data includes a PDSCH or downlink SPS release signaling.

The receiver 162 is configured to receive, in the subframe n, the PUSCH transmitted by the UE.

The receiver 162 receives the PUSCH in the subframe n, where the PUSCH carries HARQ-ACK information.

Apparently, in another embodiment, when the base station configures an HARQ-ACK feedback mode of the serving cell c as HARQ-ACK bundling, and the processor 160 is configured to determine the HARQ-ACK information, on the base station side, the following process is specifically included:

The processor 160 performs blind detection on a scrambling sequence, and determines $N_{bundled}$ according to an index of the scrambling sequence, where the scrambling sequence is used to scramble the HARQ-ACK information on which encoding is performed.

The processor 160 performs the blind detection on the scrambling sequence, and obtains the index i of the scrambling sequence; and then determines $N_{bundled}$ according to a formula $i=(N_{bundled}-1) \bmod 4$. When $N_{bundled}$ is not equal to the total number of PDSCHs and downlink SPS release signaling that are transmitted in an HARQ-ACK bundling subframe set $\{n-k_0, n-k_1, \ldots, n-k_{M_c-1}\}$ by the base station, the processor 160 determines that the UE has a PDSCH and/or downlink SPS release signaling loss in the set, and needs to retransmit all PDSCHs and downlink SPS release signaling in the set.

The processor 160 obtains the HARQ-ACK information.

The processor 160 performs descrambling by using the scrambling sequence and performs decoding, so as to obtain the HARQ-ACK information carried on the PUSCH, where the HARQ-ACK information is 1 or 2 bits. When at least one bit of the 1 or 2 bits indicates an NACK, the base station needs to retransmit all downlink data corresponding to the NACK.

In this embodiment of the present invention, the processor 160 is configured to determine the HARQ-ACK information according to the downlink association set $\{k_0, k_1, \ldots, k_{M_c-1}\}$, where the HARQ-ACK information is carried on the PUSCH, and the processor 160 may determine the downlink association set $\{k_0, k_1, \ldots, k_{M_c-1}\}$ according to the downlink reference configuration and determine the HARQ-ACK bundling subframe set $\{n-k_0, n-k_1, \ldots, n-k_{M_c-1}\}$ according to the downlink association set $\{k_0, k_1, \ldots, k_{M_c-1}\}$, where $M_c$ is a natural number greater than or equal to 1.

Before the processor 160 determines the HARQ-ACK information, the base station further needs to configure an HARQ-ACK feedback mode for the UE. If the base station configures $N_{cell}$ serving cells for the UE, the base station may separately configure an HARQ-ACK feedback mode for each serving cell; the HARQ-ACK feedback modes configured by the base station for any two serving cells of the $N_{cell}$ serving cells may be the same or different. In addition, in an application scenario of a dynamic TDD uplink-downlink configuration, because different subframes are exposed to different types of main interference, a loss of the HARQ-ACK information may occur if HARQ-ACK bundling is used, causing performance deterioration. In view of this, in the application scenario of dynamic TDD uplink-downlink configuration, it is allowed that the base station does not configure the HARQ-ACK bundling.

The processor 160 may determine the HARQ-ACK information according to the downlink association set $\{k_0, k_1, \ldots, k_{M_c-1}\}$.

During a process in which the processor 160 determines the HARQ-ACK information according to the downlink association set $\{k_0, k_1, \ldots, k_{M_c-1}\}$, if only one serving cell c is configured for the UE, the processor 160 determines, according to the number of elements of the downlink association set $\{k_0, k_1, \ldots, k_{M_c-1}\}$, that the number of bits of the HARQ-ACK information is $M_c$, where $M_c$ is the number of elements of the downlink association set $\{k_0, k_1, \ldots, k_{M_c-1}\}$. When the HARQ-ACK information which is $M_c$ bits indicates that downlink data in a subframe $n-k_i$ is an ACK, the processor 160 determines that the UE has correctly received the downlink data in the subframe $n-k_i$; conversely, when the HARQ-ACK information which is $M_c$ bits indicates that the downlink data in the subframe $n-k_i$ is an NACK, the processor 160 determines that the UE has incorrectly received the downlink data in the subframe $n-k_i$, and further, the base station retransmits the downlink data in the subframe $n-k_i$, where $k_i \in \{k_0, k_1, \ldots, k_{M_c-1}\}$.

During a process in which the processor 160 determines the HARQ-ACK information according to the downlink association set $\{k_0, k_1, \ldots, k_{M_c-1}\}$, if only one serving cell c is configured for the UE, the processor 160 determines the HARQ-ACK bundling subframe set $\{n-k_0, n-k_1, \ldots, n-k_{M_c-1}\}$ according to the downlink association set $\{k_0, k_1, \ldots, k_{M_c-1}\}$, and determines whether the HARQ-ACK bundling subframe set $\{n-k_0, n-k_1, \ldots, n-k_{M_c-1}\}$ includes a downlink special mini-subframe; when the HARQ-ACK bundling subframe set $\{n-k_0, n-k_1, \ldots, n-k_{M_c-1}\}$ includes no downlink special mini-subframe, the processor 160 determines that the number of bits of the HARQ-ACK information is $M_c$; or when the HARQ-ACK bundling subframe set $\{n-k_0, n-k_1, \ldots, n-k_{M_c-1}\}$ includes a downlink special mini-subframe, the processor 160 determines that the number of bits of the HARQ-ACK information is $M_c-1$, where $M_c$ is the number of elements of the downlink association set $\{k_0, k_1, \ldots, k_{M_c-1}\}$. When the HARQ-ACK information which is $M_c$ or $M_c-1$ bits indicates that downlink data in a subframe $n-k_i$ is an ACK, the processor 160 determines that the UE has correctly received the downlink data in the subframe $n-k_i$; conversely, when the HARQ-ACK information which is $M_c$ or $M_c-1$ bits indicates that the downlink data in the subframe $n-k_i$ is an NACK, the processor 160 determines that the UE has incorrectly received the downlink data in the subframe $n-k_i$, and further, the base station retransmits the downlink data in the subframe $n-k_i$, where $k_i \in \{k_0, k_1, \ldots, k_{M_c-1}\}$.

During a process in which the processor 160 determines the HARQ-ACK information according to the downlink association set $\{k_0, k_1, \ldots, k_{M_c-1}\}$, if only one serving cell c is configured for the UE, the processor 160 determines the HARQ-ACK bundling subframe set $\{n-k_0, n-k_1, \ldots, n-k_{M_c-1}\}$ according to the downlink association set; the processor 160 determines, according to uplink-downlink configuration information, the number $N_c^{DL}$ of downlink subframes included in the HARQ-ACK bundling subframe set $\{n-k_0, n-k_1, \ldots, n-k_{M_c-1}\}$, where $N_c^{DL} \geq 0$, and the uplink-downlink configuration information is information carried on a physical layer channel; and the processor 160 determines, according to the number $N_c^{DL}$ of downlink subframes, that the number of bits of the HARQ-ACK information is $N_c^{DL}$. Preferably, the physical layer channel is a PDCCH/ePDCCH. When $N_c^{DL}=0$, the processor 160 does not need to detect the HARQ-ACK information of the serving cell c in the subframe n. When the HARQ-ACK information which is $N_c^{DL}$ bits indicates that downlink data in a subframe $n-k_i$ is an ACK, the processor 160 determines that the UE has correctly received the downlink data; conversely, when the HARQ-ACK information which is $N_c^{DL}$ bits indicates that the downlink data in the subframe $n-k_i$ is an NACK, the processor 160 determines that the UE has incorrectly received the downlink data, and further, the base station retransmits the downlink data in the subframe $n-k_i$, where the subframe $n-k_i$ is one subframe among the $N_c^{DL}$ downlink subframes.

During a process in which the processor 160 determines the HARQ-ACK information according to the downlink association set $\{k_0, k_1, \ldots, k_{M_c-1}\}$, if only one serving cell c is configured for the UE, the processor 160 determines the HARQ-ACK bundling subframe set $\{n-k_0, n-k_1, \ldots, n-k_{M_c-1}\}$ according to the downlink association set $\{k_0, k_1, \ldots, k_{M_c-1}\}$; the processor 160 determines, according to uplink-downlink configuration information, the number $N_c^{DL}$ of downlink subframes included in the HARQ-ACK bundling subframe set $\{n-k_0, n-k_1, \ldots, n-k_{M_c-1}\}$, and determines whether the HARQ-ACK bundling subframe set $\{n-k_0, n-k_1, \ldots, n-k_{M_c-1}\}$ includes a downlink special mini-subframe, where $N_c^{DL} \geq 0$, and the uplink-downlink configuration information is information carried on a physical layer channel; and when the HARQ-ACK bundling subframe set $\{n-k_0, n-k_1, \ldots, n-k_{M_c-1}\}$ includes no downlink special mini-subframe, the processor 160 determines, according to the number $N_c^{DL}$ of downlink subframes, that the number of bits of the HARQ-ACK information is $N_c^{DL}$; or when the HARQ-ACK bundling subframe set $\{n-k_0, n-k_1, \ldots, n-k_{M_c-1}\}$ includes a downlink special mini-subframe, the processor 160 determines, according to the number $N_c^{DL}$ of downlink subframes, that the number of bits of the HARQ-ACK information is $N_c^{DL}-1$. When $N_c^{DL}=0$, the processor 160 does not need to detect the HARQ-ACK information of the serving cell c in the subframe n. When the HARQ-ACK information which is $N_c^{DL}$ or $N_c^{DL}-1$ bits indicates that downlink data in a subframe $n-k_i$ is an ACK, the processor 160 determines that the UE has correctly received the downlink data; conversely, when the HARQ-ACK information which is $N_c^{DL}$ or $N_c^{DL}-1$ bits indicates that the downlink data in the subframe $n-k_i$ is an NACK, the processor 160 determines that the UE has incorrectly received the downlink data, and further, the base station retransmits the downlink data in the subframe $n-k_i$, where the subframe $n-k_i$ is one subframe among the $N_c^{DL}$ downlink subframes (or among the $N_c^{DL}$ downlink subframes except the downlink special mini-subframe).

If the base station configures only one serving cell for the UE, and configures the HARQ-ACK feedback mode of the UE on the serving cell c as HARQ-ACK bundling or HARQ-ACK multiplexing, the UE may execute the foregoing solution.

During a process in which the processor 160 determines the HARQ-ACK information according to the downlink association set $\{k_0, k_1, \ldots, k_{M_c-1}\}$, if $N_{cell}$ serving cells are configured for the UE, where $N_{cell} > 0$, and the $N_{cell}$ serving cells include a serving cell c, the processor 160 determines, according to the downlink association set $\{k_0, k_1, \ldots, k_{M_c-1}\}$, the number $B_c^{DL}$ of downlink subframes for which the HARQ-ACK information needs to be fed back on the serving cell c, and determine a transmission mode of the serving cell c; when the transmission mode of the serving cell c supports one transport block or uses spatial HARQ-ACK bundling, the processor 160 determines that the number of bits of the HARQ-ACK information of the serving cell c is $B_c^{DL}$; or when the transmission mode of the serving cell c supports two transport blocks and does not use spatial HARQ-ACK bundling, the processor 160 determines that the number of bits of the HARQ-ACK information of the serving cell c is $2B_c^{DL}$. In addition, when the base station transmits no PDSCH or downlink SPS release signaling in any subframe in the HARQ-ACK bundling subframe set $\{n-k_0, n-k_1, \ldots, n-k_{M_c-1}\}$, the processor 160 does not need to detect the HARQ-ACK information of the serving cell c in the subframe n. When the HARQ-ACK information which is $B_c^{DL}$ or $2B_c^{DL}$ bits indicates that downlink data in a subframe $n-k_i$ or downlink data corresponding to a codeword in the subframe n−$k_i$ is an ACK, the processor 160 determines that the UE has correctly received the downlink data; conversely, when the HARQ-ACK information which is $B_c^{DL}$ or $2B_c^{DL}$ bits indicates that the downlink data in the subframe n−$k_i$ or the downlink data corresponding to a codeword in the subframe n−$k_i$ is an NACK, the processor 160 determines that the UE has incorrectly received the downlink data, and further, the base station retransmits the downlink data, where the subframe n−$k_i$ is one subframe among the $B_c^{DL}$ downlink subframes.

Further, during a process in which the processor 160 determines, according to the downlink association set $\{k_0, k_1, \ldots, k_{M_c-1}\}$, the number $B_c^{DL}$ of downlink subframes for which the HARQ-ACK information needs to be fed back on the serving cell c, the processor 160 determines that $B_c^{DL}$ equals $M_c$, or the following may be further specifically included: the processor 160 determines, after determining the HARQ-ACK bundling subframe set $\{n-k_0, n-k_1, \ldots, n-k_{M_c-1}\}$ according to the downlink association set $\{k_0, k_1, \ldots, k_{M_c-1}\}$, whether the HARQ-ACK bundling subframe set $\{n-k_0, n-k_1, \ldots, n-k_{M_c-1}\}$ includes a downlink special mini-subframe; when the HARQ-ACK bundling subframe set $\{n-k_0, n-k_1, \ldots, n-k_{M_c-1}\}$ includes no downlink special mini-subframe, the processor 160 determines that $B_c^{DL}$ equals $M_c$; or when the HARQ-ACK bundling subframe set $\{n-k_0, n-k_1, \ldots, n-k_{M_c-1}\}$ includes a downlink special mini-subframe, the processor 160 determines that $B_c^{DL}$ equals $M_c-1$, where $M_c$ is the number of elements of the downlink association set $\{k_0, k_1, \ldots, k_{M_c-1}\}$.

During a process in which the processor 160 determines the HARQ-ACK information according to the downlink association set $\{k_0, k_1, \ldots, k_{M_c-1}\}$, if $N_{cell}$ serving cells are configured for the UE, where $N_{cell}>0$, and the $N_{cell}$ serving cells include a serving cell c, the processor 160 determines the HARQ-ACK bundling subframe set $\{n-k_0, n-k_1, \ldots, n-k_{M_c-1}\}$ according to the downlink association set $\{k_0, k_1, \ldots, k_{M_c-1}\}$, and determines, according to uplink-downlink configuration information, the number $N_c^{DL}$ of downlink subframes included in the HARQ-ACK bundling subframe set $\{n-k_0, n-k_1, \ldots, n-k_{M_c-1}\}$, where $N_c^{DL} \geq 0$, and the uplink-downlink configuration information is information carried on a physical layer channel; and the processor 160 determines, according to $N_c^{DL}$, the number $B_c^{DL}$ of downlink subframes for which the HARQ-ACK information needs to be fed back on the serving cell c, and determines a transmission mode of the serving cell c; and when $B_c^{DL}=0$, the processor 160 determines that the number of bits of the HARQ-ACK information of the serving cell c is 0; when $B_c^{DL}>0$ and the transmission mode of the serving cell c supports one transport block or uses spatial HARQ-ACK bundling, the processor 160 determines that the number of bits of the HARQ-ACK information of the serving cell c is $B_c^{DL}$; or when $B_c^{DL}>0$ and the transmission mode of the serving cell c supports two transport blocks and does not use spatial HARQ-ACK bundling, the processor 160 determines that the number of bits of the HARQ-ACK information of the serving cell c is $2B_c^{DL}$. When the HARQ-ACK information which is $B_c^{DL}$ or $2B_c^{DL}$ bits indicates that downlink data in a subframe n−$k_i$ or downlink data corresponding to a codeword in the subframe n−$k_i$ is an ACK, the processor 160 determines that the UE has correctly received the downlink data; conversely, when the HARQ-ACK information which is $B_c^{DL}$ or $2B_c^{DL}$ bits indicates that the downlink data in the subframe n−$k_i$ or the downlink data corresponding to a codeword in the subframe n−$k_i$ is an NACK, the processor 160 determines that the UE has incorrectly received the downlink data, and further, the base station retransmits the downlink data, where the subframe n−$k_i$ is one subframe among the $B_c^{DL}$ downlink subframes.

Specifically, during a process in which the processor 160 determines, according to $N_c^{DL}$, the number $B_c^{DL}$ of downlink subframes for which the HARQ-ACK information needs to be fed back on the serving cell c, when $N_c^{DL}=0$, the processor 160 determines that $B_c^{DL}$ equals 0; when the $N_c^{DL}$ downlink subframes include no downlink special mini-subframe, the processor 160 determines that $B_c^{DL}$ equals $N_c^{DL}$; or when the $N_c^{DL}$ downlink subframes include a downlink special mini-subframe, the processor 160 determines that $B_c^{DL}=N_c^{DL}-1$.

If the base station configures $N_{cell}$ serving cells for the UE, and configures an HARQ-ACK feedback mode of the UE on the serving cell c as PUCCH format 3, the UE may execute the foregoing solution.

After the processor 160 determines the HARQ-ACK bundling subframe set $\{n-k_0, n-k_1, \ldots, n-k_{M_c-1}\}$ according to the downlink association set $\{k_0, k_1, \ldots, k_{M_c-1}\}$, the processor 160 is configured to determine a first subframe set and a second subframe set according to the subframe n−k' and the HARQ-ACK bundling subframe set $\{n-k_0, n-k_1, \ldots, n-k_{M_c-1}\}$, where the HARQ-ACK bundling subframe set $\{n-k_0, n-k_1, \ldots, n-k_{M_c-1}\}$ includes the first subframe set and the second subframe set, the last subframe in the first subframe set is the subframe n−k' or a subframe prior to the subframe n−k' (that is, no subframe in the first subframe set is later than the subframe n−k'), and the first subframe in the second subframe set is a subframe after the subframe n−k' (that is, all subframes in the second subframe set are later than the subframe n−k').

The processor 160 is configured to determine, when the base station configures the HARQ-ACK feedback mode of the serving cell c as HARQ-ACK bundling, that first HARQ-ACK information is 1 or 2 bits. When at least one bit of the first HARQ-ACK information indicates an NACK, the base station retransmits downlink data corresponding to at least one codeword in the first subframe set.

Alternatively, the processor 160 is configured to determine first HARQ-ACK information according to downlink control information DAI in the UL Grant, where the first HARQ-ACK information corresponds to the first subframe set.

The processor 160 is specifically configured to determine the number $U_{DAI,c}^1$ of downlink assignments DL Assignments transmitted in the first subframe set; the base station determines the number $N_{SPS}^1$ of physical downlink shared channels PDSCHs received in the first subframe set, where the PDSCH has no corresponding DL Assignment; the base station determines a value $B_{DAI}^{UL,1}$ indicated by the DAI in the UL Grant; and the base station determines the first HARQ-ACK information according to $U_{DAI,c}^1$, $N_{SPS}^1$, and $V_{DAI}^{UL,1}$. If it is determined that $V_{DAI}^{UL,1} \neq (U_{DAI,c}^1+N_{SPS}^1-1) \mod 4+1$, the base station concludes that the first HARQ-ACK information indicates a non-acknowledgment NACK.

The processor 160 is specifically configured to determine that the number of bits of the first HARQ-ACK information is $V_{DAI}^{UL,1}$, where $V_{DAI}^{UL,1}$ is a value indicated by the DAI in the UL Grant. Preferably, the base station configures the HARQ-ACK feedback mode of the UE on the serving cell c as HARQ-ACK multiplexing or HARQ-ACK bundling. When the HARQ-ACK information which is $V_{DAI}^{UL,1}$ bits indicates that downlink data in a subframe n−$k_i$ is an ACK, the processor 160 determines that the UE has correctly received the downlink data; conversely, when the HARQ-ACK information which is $V_{DAI}^{UL,1}$ bits indicates that the downlink data in the subframe n−$k_i$ is an NACK, the processor 160 determines that the UE has incorrectly received the downlink data, and further, the base station retransmits the downlink data, where the subframe $n-k_i$ is one subframe among the $V_{DAI}^{UL,1}$ downlink subframes.

If $N_{cell}$ serving cells are configured for the UE, where $N_{cell}>0$, and the $N_{cell}$ serving cells include a serving cell C, the processor 160 is specifically configured to determine, according to the DAI in the UL Grant, the number $B_c^{DL,1}$ of downlink subframes for which the first HARQ-ACK information needs to be fed back on the serving cell c, and determine a transmission mode of the serving cell c; and when the transmission mode of the serving cell c supports one transport block or uses spatial HARQ-ACK bundling, determine that the number of bits of the first HARQ-ACK information of the serving cell c is $B_c^{DL,1}$; or when the transmission mode of the serving cell c supports two transport blocks and does not use spatial HARQ-ACK bundling, determine that the number of bits of the first HARQ-ACK information of the serving cell c is $2B_c^{DL,1}$. Preferably, the base station configures the HARQ-ACK feedback mode of the UE on the serving cell c as PUCCH format 3. When the HARQ-ACK information which is $B_c^{DL,1}$ or $2B_c^{DL,1}$ bits indicates that downlink data in a subframe $n-k_i$ or downlink data corresponding to a codeword in the subframe $n-k_i$ is an ACK, the processor 160 determines that the UE has correctly received the downlink data; conversely, when the HARQ-ACK information which is $B_c^{DL,1}$ or $2B_c^{DL,1}$ bits indicates that the downlink data in the subframe $n-k_i$ or the downlink data corresponding to a codeword in the subframe $n-k_i$ is an NACK, the processor 160 determines that the UE has incorrectly received the downlink data, and further, the base station retransmits the downlink data, where the subframe $n-k_i$ is one subframe among the $B_c^{DL,1}$ downlink subframes.

The process in which the processor 160 determines $B_c^{DL,1}$ according to the DAI in the UL Grant includes the following:

Scenario 1: The $N_{cell}$ serving cells have a same downlink reference configuration, or uplink-downlink configuration information carried on a physical layer channel indicates that the $N_{cell}$ serving cells have a same uplink-downlink configuration.

When the downlink reference configuration is the uplink-downlink configuration 1, 2, 3, 4, or 6, or the uplink-downlink configuration information carried on a physical layer channel indicates the uplink-downlink configuration 1, 2, 3, 4, or 6, the processor 160 determines that $B_c^{DL,1}=W_{DAI}^{UL,1}$; or when the downlink reference configuration is the uplink-downlink configuration 5 or the uplink-downlink configuration information carried on a physical layer channel indicates the uplink-downlink configuration 5, the processor 160 determines that $B_c^{DL,1}=W_{DAI}^{UL,1}+4|(U-W_{DAI}^{UL,1})/4|$, where $W_{DAI}^{UL,1}$ is a value indicated by the DAI in the UL Grant.

Scenario 2: At least two serving cells of the $N_{cell}$ serving cells have different downlink reference configurations, or uplink-downlink configuration information carried on a physical layer channel indicates that at least two serving cells have different uplink-downlink configurations.

When none of downlink reference configurations of the $N_{cell}$ serving cells is the uplink-downlink configuration 5 or none of uplink-downlink configurations indicated by the uplink-downlink configuration information carried on a physical layer channel is the uplink-downlink configuration 5, the processor 160 determines that $B_c^{DL,1}=\min(W_{DAI}^{UL,1}, M_c^1)$; or when a downlink reference configuration of at least one serving cell among the $N_{cell}$ serving cells is the uplink-downlink configuration 5 or the uplink-downlink configuration information carried on a physical layer channel indicates the uplink-downlink configuration 5, the processor 160 determines that $B_c^{DL,1}=\min(W_{DAI}^{UL,1}+4|(U-W_{DAI}^{UL,1})/4|, M_c^1)$, where $\min()$ is a function for obtaining a minimum value, $M_c^1$ is the number of subframes in the first subframe set, $W_{DAI}^{UL,1}$ is a value indicated by the DAI in the UL Grant, U is a maximum $U_i$ value of the $N_{cell}$ serving cells, $U_i$ indicates a sum of the number of DL Assignments received in the first subframe set of an $i^{th}$ serving cell and the number of PDSCHs not scheduled by using the DL Assignment, and $0 \le i < N_{cell}$.

The processor 160 is configured to determine second HARQ-ACK information, where the second HARQ-ACK information corresponds to the second subframe set, and the HARQ-ACK information includes the first HARQ-ACK information and the second HARQ-ACK information. When the base station configures the HARQ-ACK feedback mode of the serving cell c as HARQ-ACK bundling, the processor 160 determines that the second HARQ-ACK information is 1 or 2 bits. When at least one bit of the 1 or 2 bits indicates an NACK, the base station needs to retransmit all downlink data corresponding to the NACK.

If only one serving cell c is configured for the UE, the processor 160 may be specifically configured to determine the second HARQ-ACK information according to a value indicated by a DAI in a downlink assignment DL Assignment transmitted in the second subframe set.

If only one serving cell c is configured for the UE, the processor 160 may be specifically configured to determine that the number of bits of the second HARQ-ACK information is $M_c^2$, where $M_c^2$ is the number of subframes in the second subframe set. When the HARQ-ACK information which is $M_c^2$ bits indicates that downlink data in a subframe $n-k_i$ is an ACK, the processor 160 determines that the UE has correctly received the downlink data in the subframe $n-k_i$; conversely, when the HARQ-ACK information which is $M_c^2$ bits indicates that the downlink data in the subframe $n-k_i$ is an NACK, the processor 160 determines that the UE has incorrectly received the downlink data in the subframe $n-k_i$, and further, the base station retransmits the downlink data in the subframe $n-k_i$, where the subframe $n-k_i$ is one subframe among the $M_c^2$ downlink subframes.

If $N_{cell}$ serving cells are configured for the UE, where $N_{cell}>0$, and the $N_{cell}$ serving cells include a serving cell c, the processor 160 may be specifically configured to determine the number $B_c^{DL,2}$ of downlink subframes for which the second HARQ-ACK information needs to be fed back on the serving cell c, and determine a transmission mode of the serving cell c; and when the transmission mode of the serving cell c supports one transport block or uses spatial HARQ-ACK bundling, determine that the number of bits of the second HARQ-ACK information of the serving cell c is $B_c^{DL,2}$; or when the transmission mode of the serving cell c supports two transport blocks and does not use spatial HARQ-ACK bundling, determine that the number of bits of the second HARQ-ACK information of the serving cell c is $2B_c^{DL,2}$. When the HARQ-ACK information which is $B_c^{DL,2}$ or $2B_c^{DL,2}$ bits indicates that downlink data in a subframe $n-k_i$ or downlink data corresponding to a codeword in the subframe $n-k_i$ is an ACK, the processor 160 determines that the UE has correctly received the downlink data; conversely, when the HARQ-ACK information which is $B_c^{DL,2}$ or $2B_c^{DL,2}$ bits indicates that the downlink data in the subframe $n-k_i$ or the downlink data corresponding to a codeword in the subframe $n-k_i$ is an NACK, the processor 160 determines that the UE has incorrectly received the downlink data, and further, the base station retransmits the downlink data, where the subframe $n-k_i$ is one subframe among the $B_c^{DL,2}$ downlink subframes.

When the second subframe set includes no downlink special mini-subframe, the processor 160 determines that $B_c^{DL,2}=M_c^2$; or when the second subframe set includes a downlink special mini-subframe, the processor 160 determines that $B_c^{DL,2}=M_c^2-1$; where $M_c^2$ is the number of subframes in the second subframe set.

Alternatively, the processor 160 determines, according to uplink-downlink configuration information, the number $N_c^{DL,2}$ of downlink subframes included in the second subframe set, where the uplink-downlink configuration information is information carried on a physical layer channel; when the $N_c^{DL,2}$ downlink subframes include no downlink special mini-subframe, the processor 160 determines that $B_c^{DL,2}=N_c^{DL,2}$; or when the $N_c^{DL,2}$ downlink subframes include a downlink special mini-subframe, the processor 160 determines that $B_c^{DL,2}=N_c^{DL,2}-1$.

It should be noted that, the HARQ-ACK feedback mode of the UE is PUCCH format 1b with channel selection, and two serving cells are configured for the UE, where the two serving cells include a serving cell c and a serving cell c, and the processor 160 may be specifically configured to: determine, according to the number of elements of the downlink association set $\{k_0, k_1, \ldots, k_{M_c-1}\}$, that the number of bits of the HARQ-ACK information is $M_c$, and determine the number of bits of the HARQ-ACK information according to $M_c$, which includes a solution 1 and a solution 2.

(1) Solution 1

Scenario 1: when downlink reference configurations of the two serving cells are the same, an operation is performed according to the following method:

when $M_c=1$ or 2, the processor 160 determines that the number of bits of the HARQ-ACK information is A, where A is 2, 3, or 4; or when $M_c=3$ or 4, the processor 160 determines that the number of bits of the HARQ-ACK information is 4; where $M_c$ is the number of elements of the downlink association set $\{k_0, k_1, \ldots, k_{M_c-1}\}$.

Scenario 2: when downlink reference configurations of the two serving cells are different, an operation is performed according to the following method:

when M=1 or 2, the processor 160 determines that the number of bits of the HARQ-ACK information is A, where A is 2, 3, or 4; or when M=3 or 4, the processor 160 determines that the number of bits of the HARQ-ACK information is 4.

$M=\max(M_c, M_d)$, $M_d$ is the number of elements of a downlink association set of a subframe n of the serving cell d, and $M_c$ is the number of elements in a downlink association set of a subframe n of the serving cell c.

(2) Solution 2

Scenario 1: When downlink reference configurations of the two serving cells are the same, an operation is performed according to the following method:

when $N_c^{DL}=1$ or 2, the UE determines that the number of bits of the HARQ-ACK information is A, where A is 2, 3, or 4; or when $N_c^{DL}=3$ or 4, the UE determines that the number of bits of the HARQ-ACK information is 4.

Scenario 2: When downlink reference configurations of the two serving cells are different, an operation is performed according to the following method:

when $N^{DL}=1$ or 2, the UE determines that the number of bits of the HARQ-ACK information is A, where A is 2, 3, or 4; or when $N^{DL}=3$ or 4, the UE determines that the number of bits of the HARQ-ACK information is 4.

$N^{DL}=\max(N_c^{DL}, N_d^{DL})$, $N_d^{DL}$ is the number of downlink subframes in an HARQ-ACK bundling subframe set of a subframe n of the serving cell d, and $N_c^{DL}$ is the number of downlink subframes in an HARQ-ACK bundling subframe set of a subframe n of the serving cell c. The processor 160 determines the HARQ-ACK bundling subframe set of the subframe n of the serving cell c or d according to the downlink reference configuration of the serving cell c or d. The processor 160 determines the number of downlink subframes in the HARQ-ACK bundling subframe set of the subframe n of the serving cell c/d according to the first/second uplink-downlink configuration information, where the first uplink-downlink configuration information and the second uplink-downlink configuration information are information carried on a same physical layer channel or different physical layer channels.

It is worth noting that, in an application scenario of a dynamic TDD uplink-downlink configuration, uplink-downlink configuration information carried on a PDCCH or ePDCCH is a current uplink-downlink configuration used to indicate uplink and downlink subframe assignment. The base station carries the uplink-downlink configuration information on the PDCCH/ePDCCH, and transmits the PDCCH/ePDCCH to the UE. The base station instructs, by using the uplink-downlink configuration information, the UE to detect the PDCCH/ePDCCH in a downlink subframe indicated by the uplink-downlink configuration information.

In another embodiment, the processor 160 is further configured to determine, according to the downlink reference configuration and the uplink reference configuration, the HARQ-ACK information.

Correspondingly, the processor 160 determines that the uplink reference configuration is the uplink-downlink configuration 1 and the downlink reference configuration is the uplink-downlink configuration 2 or 5, or the base station determines that the uplink reference configuration is the uplink-downlink configuration 6 and the downlink reference configuration is the uplink-downlink configuration 1, 2, 3, 4, or 5.

The processor 160 is configured to determine a downlink association set $\{k_0, k_1, \ldots, k_{M_c-1}\}$ of the subframe n according to the downlink reference configuration.

The processor 160 is configured to determine the HARQ-ACK information according to the downlink association set $\{k_0, k_1, \ldots, k_{M_c-1}\}$. For a specific working process in which the processor 160 determines the HARQ-ACK information according to the downlink association set $\{k_0, k_1, \ldots, k_{M_c-1}\}$, refer to the related description provided above, which is within a scope of understanding by a person skilled in the art and is not repeatedly described. Alternatively, when the base station configures an HARQ-ACK feedback mode of the serving cell c as HARQ-ACK bundling, the processor 160 obtains the HARQ-ACK information. For a specific implementation principle and effect, refer to all the related description of the foregoing embodiments, and details are not repeatedly described herein.

In addition, the processor 160 determines the HARQ-ACK information according to a DAI in the UL Grant when concluding that the uplink reference configuration and the downlink reference configuration are not among the combinations listed above.

In this embodiment of the present invention, a downlink reference configuration is used to determine a downlink association set $\{k_0, k_1, \ldots, k_{M_c-1}\}$ and the like, so that HARQ-ACK information is determined according to the downlink association set $\{k_0, k_1, \ldots, k_{M_c-1}\}$ and the like. This is different from the prior art in which a UE must determine, when receiving a UL Grant, HARQ-ACK information according to a value (the total number of PDSCHs and downlink SPS release signaling) indicated by a DAI carried by the UL Grant. The base station according to this embodiment effectively avoids the following technical problem: when the UL Grant is transmitted prior to the last subframe in an HARQ-ACK bundling subframe set, for example, in a scenario in which an uplink-downlink configuration is dynamically configured, the DAI carried by the UL Grant may not indicate the total number of PDSCHs and downlink SPS release signaling that are transmitted in the HARQ-ACK bundling subframe set, thereby causing a UE to feedback incorrect HARQ-ACK information. In addition, the base station according to this embodiment avoids another problem: when an uplink reference configuration is the uplink-downlink configuration 0, the UL Grant does not include a 2-bit DAI; therefore, the UL Grant cannot indicate the total number of PDSCHs and downlink SPS release signaling that are transmitted in the HARQ-ACK bundling subframe set. In this embodiment, the HARQ-ACK information may be determined by selecting and applying different conditions according to different situations, which provides more options in determining the HARQ-ACK information, and can effectively prevent a feedback error.

In the several embodiments provided in the present invention, it should be understood that the disclosed system, apparatus, and method may be implemented in other manners. For example, the described apparatus embodiment is merely exemplary. For example, the module or unit division is merely logical function division and may be other division in an actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes any medium that can store program code, such as a USB flash drive, a removable hard disk, a read-only memory (Read-Only Memory, ROM), a random access memory (Random Access Memory, RAM), a magnetic disc, or an optical disc.

The foregoing descriptions are merely embodiments of the present invention, and the protection scope of the present invention is not limited thereto. Any equivalent structure or process changes made according to the content of this specification and accompanying drawings in the present invention, or by directly or indirectly applying the present invention in other related technical fields, shall fall within the protection scope of the present invention.

What is claimed is:

1. A control information feedback method, the method comprising:
   determining, by an apparatus, an uplink association index k' according to an uplink reference configuration;
   receiving, by the apparatus, an uplink grant (UL Grant) of a serving cell c in a subframe n–k', wherein the UL Grant is used to indicate a physical uplink shared channel (PUSCH) transmission in a subframe n, n being an integer and k' being the uplink association index;
   determining, by the apparatus, a hybrid automatic repeat request acknowledgment (HARQ-ACK) feedback mode, wherein the HARQ-ACK feedback mode does not include HARQ-ACK bundling;
   determining, by the apparatus, HARQ-ACK information according to a downlink reference configuration of the serving cell c and the HARQ-ACK feedback mode, wherein the downlink reference configuration is used to determine a downlink association set $\{k_0, k_1, \ldots, k_{M_c-1}\}$ and Mc is an integer greater than 0; and
   transmitting, by the apparatus, the HARQ-ACK information by a PUSCH in the subframe n, wherein transmitting the HARQ-ACK information comprises transmitting the HARQ-ACK information by the PUSCH according to the HARQ-ACK feedback mode in the subframe n; and
   wherein the apparatus is configured with a dynamic time division duplexing (TDD) uplink-downlink configuration, and wherein the uplink reference configuration of the serving sell c is different from the downlink reference configuration.

2. The method according to claim 1, wherein the HARQ-ACK feedback mode determined by the apparatus is a PUCCH format 1b with channel selection or a PUCCH format 3.

3. The method according to claim 1, wherein the downlink reference configuration is a uplink-downlink configuration 5, a uplink-downlink configuration 2 or a uplink-downlink configuration 4, and wherein the uplink reference configuration is a uplink-downlink configuration 0, a uplink-downlink configuration 1 or a uplink-downlink configuration 6.

4. The method according to claim 1, wherein the downlink reference configuration is a uplink-downlink configuration 5 or a uplink-downlink configuration 2, and wherein the uplink reference configuration is a uplink-downlink configuration 0 or a uplink-downlink configuration 1; or wherein the downlink reference configuration is the uplink-downlink configuration 2 or a uplink-downlink configuration 4 or the uplink-downlink configuration 5, and wherein the uplink reference configuration is a uplink-downlink configuration 6.

5. The method according to claim 1, wherein determining the HARQ-ACK information according to the downlink reference configuration comprises:

determining the downlink association set $\{k_0, k_1, \ldots, k_{M_c-1}\}$ of the subframe n according to the downlink reference configuration; and determining the HARQ-ACK information according to the downlink association set $\{k_0, k_1, \ldots, k_{M_c-1}\}$.

6. The method according to claim 5, wherein only the serving cell c is configured for the terminal device apparatus, and wherein determining the HARQ-ACK information according to the downlink association set $\{k_0, k_1, \ldots, k_{M_c-1}\}$ comprises determining, according to a number of elements of the downlink association set $\{k_0, k_1, \ldots, k_{M_c-1}\}$, that a number of bits of the HARQ-ACK information is $M_c$, and wherein $M_c$ is a number of elements of the downlink association set $\{k_0, k_1, \ldots, k_{M_c-1}\}$.

7. The method according to claim 5, wherein $N_{cell}$ serving cells are configured for the apparatus, wherein $N_{cell}>0$, the $N_{cell}$ serving cells comprising the serving cell c, and wherein determining the HARQ-ACK information according to the downlink association set $\{k_0, k_1, \ldots, k_{M_c-1}\}$ comprises:

determining, according to the downlink association set $\{k_0, k_1, \ldots, k_{M_c-1}\}$, a number $B_c^{DL}$ of downlink subframes for which HARQ-ACK information needs to be fed back on the serving cell c;

determining a transmission mode of the serving cell c; and when the transmission mode of the serving cell c supports one transport block or uses a spatial HARQ-ACK bundling, determining that a number of bits of the HARQ-ACK information of the serving cell c is $B_c^{DL}$; or when the transmission mode of the serving cell c supports two transport blocks and does not use the spatial HARQ-ACK bundling, determining that the number of bits of the HARQ-ACK information of the serving cell c is $2B_c^{DL}$.

8. An apparatus comprising:

a transmitter;

a receiver; and a processor communicatively connected to the transmitter and the receiver, wherein the processor is configured to:

determine an uplink association index k' according to an uplink reference configuration;

detect an uplink grant (UL Grant) of a serving cell c received by the receiver in a subframe n–k', wherein the UL Grant is used to indicate a physical uplink shared channel (PUSCH) transmission in a subframe n, n being an integer and k' being the uplink association index; and determine hybrid automatic repeat request acknowledgment (HARQ-ACK) information according to a downlink reference configuration of the serving cell c and a HARQ-ACK feedback mode excluding HARQ-ACK bundling, wherein the downlink reference configuration is used to determine a downlink association set $\{k_0, k_1, \ldots, k_{M_c-1}\}$, Mc is an integer greater than 0; and wherein the transmitter is configured to transmit, to a base station, the HARQ-ACK information by a PUSCH in the subframe n according to the HARQ-ACK feedback mode, and wherein the apparatus is configured with a dynamic time division duplexing (TDD) uplink-downlink configuration, and the uplink reference configuration of the serving sell c is different from the downlink reference configuration.

9. The apparatus according to claim 8, wherein the receiver is configured to receive HARQ-ACK feedback mode information before the HARQ-ACK information is determined, and wherein the HARQ-ACK feedback mode information indicates the HARQ-ACK feedback mode".

10. The apparatus according to claim 9, wherein the HARQ-ACK feedback mode is a PUCCH format 1b with channel selection or a PUCCH format 3.

11. The apparatus according to claim 8, wherein the downlink reference configuration is a uplink-downlink configuration 5, a uplink-downlink configuration 2 or a uplink-downlink configuration 4, and wherein the uplink reference configuration is a uplink-downlink configuration 0, a uplink-downlink configuration 1 or a uplink-downlink configuration 6.

12. The apparatus according to claim 8, wherein the downlink reference configuration is a uplink-downlink configuration 5 or a uplink-downlink configuration 2, and wherein the uplink reference configuration is a uplink-downlink configuration 0 or a uplink-downlink configuration 1; or wherein the downlink reference configuration is the uplink-downlink configuration 2 or a uplink-downlink configuration 4 or the uplink-downlink configuration 5, and wherein the uplink reference configuration is a uplink-downlink configuration 6.

13. The apparatus according to claim 8, wherein the processor is configured to determine the HARQ-ACK information by:

determining the downlink association set $\{k_0, k_1, \ldots, k_{M_c-1}\}$ of the subframe n according to the downlink reference configuration; and determining the HARQ-ACK information according to the downlink association set $\{k_0, k_1, \ldots, k_{M_c-1}\}$.

14. The apparatus according to claim 13, wherein only the serving cell c is configured for the apparatus, wherein the processor is configured to determine the HARQ-ACK information according to the downlink association set $\{k_0, k_1, \ldots, k_{M_c-1}\}$ as follows: determining, according to a number of elements of the downlink association set $\{k_0, k_1, \ldots, k_{M_c-1}\}$, that a number of bits of the HARQ-ACK information is $M_c$, wherein $M_c$ is the number of elements of the downlink association set $\{k_0, k_1, \ldots, k_{M_c-1}\}$.

15. The apparatus according to claim 14, wherein $N_{cell}$ serving cells are configured for the apparatus, wherein $N_{cell}>0$, the $N_{cell}$ serving cells comprise the serving cell c, wherein the processor is configured to determine the HARQ-ACK information according to the downlink association set $\{k_0, k_1, \ldots, k_{M_c-1}\}$ as follows:

determining, according to the downlink association set $\{k_0, k_1, \ldots, k_{M_c-1}\}$, a number $B_c^{DL}$ of downlink subframes for which HARQ-ACK information needs to be fed back on the serving cell c; and determining a transmission mode of the serving cell c;

when the transmission mode of the serving cell c supports one transport block or uses a spatial HARQ-ACK bundling, determining that a number of bits of the HARQ-ACK information of the serving cell c is $B_c^{DL}$; or when the transmission mode of the serving cell c supports two transport blocks and does not use the spatial HARQ-ACK bundling, determining that the number of bits of the HARQ-ACK information of the serving cell c is $2B_c^{DL}$.

16. An apparatus comprising:

a processor; and non-transitory computer readable storage medium storing a program to be executed by the processor, the program including instructions for:

determining an uplink association index k' according to an uplink reference configuration;

receiving an uplink grant (UL Grant) of a serving cell c in a subframe n–k', wherein the UL Grant is used to indicate a physical uplink shared channel (PUSCH) transmission in a subframe n, n being an integer and k' being the uplink association index;

determining hybrid automatic repeat request acknowledgment (HARQ-ACK) information according to a downlink reference configuration of the serving cell c and a HARQ-ACK feedback mode excluding HARQ-ACK bundling, wherein the downlink reference configuration is used to determine a downlink association set $\{k_0, k_1, \ldots, k_{M_c-1}\}$, and wherein Mc is an integer greater than 0; and transmitting the HARQ-ACK information by a PUSCH in the subframe n according to the HARQ-ACK feedback mode, wherein the apparatus is configured with a dynamic time division duplexing (TDD) uplink-downlink configuration, and wherein the uplink reference configuration is different from the downlink reference configuration.

17. The apparatus according to claim 16, further comprising instructions for, before determining the HARQ-ACK information, receiving HARQ-ACK feedback mode information, wherein the HARQ-ACK feedback mode information indicates the HARQ-ACK feedback mode.

18. The apparatus according to claim 17, wherein the HARQ-ACK feedback mode is a PUCCH format 1b with channel selection or a PUCCH format 3.

19. The apparatus according to claim 16, wherein the downlink reference configuration is a uplink-downlink configuration 5, a uplink-downlink configuration 2 or a uplink-downlink configuration 4, and the uplink reference configuration is a uplink-downlink configuration 0, a uplink-downlink configuration 1 or a uplink-downlink configuration 6.

20. The apparatus according to claim 16, wherein the downlink reference configuration is a uplink-downlink configuration 5 or a uplink-downlink configuration 2, and wherein the uplink reference configuration is a uplink-downlink configuration 0 or a uplink-downlink configuration 1; or wherein the downlink reference configuration is the uplink-downlink configuration 2 or a uplink-downlink configuration 4 or the uplink-downlink configuration 5, and wherein the uplink reference configuration is a uplink-downlink configuration 6.

* * * * *